(12) United States Patent
Muramatsu

(10) Patent No.: US 6,972,865 B1
(45) Date of Patent: Dec. 6, 2005

(54) IMAGE PROCESSING APPARATUS AND METHOD, AND STORAGE MEDIUM

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/516,969

(22) Filed: Feb. 29, 2000

(30) Foreign Application Priority Data

| Mar. 1, 1999 | (JP) | ................................. 11-053375 |
| Jul. 29, 1999 | (JP) | ................................. 11-215744 |
| Nov. 18, 1999 | (JP) | ................................. 11-328487 |

(51) Int. Cl.$^7$ .................. G06F 13/00; G06F 15/00
(52) U.S. Cl. ................. 358/1.2; 382/299; 382/300
(58) Field of Search ................. 358/1.14, 3.28, 358/1.12, 451, 525, 1.2; 382/240, 100, 232; 380/201, 203; 283/902, 72, 113; 399/366; 713/176, 161

(56) References Cited

U.S. PATENT DOCUMENTS

| 4,800,379 A | * | 1/1989 | Yeomans ..................... 345/661 |
| 5,893,101 A | * | 4/1999 | Balogh et al. ............... 707/100 |
| 6,529,285 B2 | * | 3/2003 | Bobrow et al. ............. 358/1.12 |
| 6,631,239 B1 | * | 10/2003 | Hamada ....................... 386/52 |
| 2001/0048771 A1 | * | 12/2001 | Sasaki ......................... 382/260 |
| 2002/0037091 A1 | * | 3/2002 | Terasaki ...................... 382/100 |

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

This invention relates to an image processing apparatus and method for controlling output of a specific image, and a storage medium.

For example, image data which is open to the public on the Internet may be printed out without permission by an ill-disposed person, even if it has a copyright.

In this invention, when information indicating the presence of a copyright is stored in extended property information of image data, which complies with a hierarchical data format that hierarchically stores image data of a plurality of resolution, original image data, i.e., the image data of interest is controlled not to be output at a high resolution, thereby preventing original image data from being printed out without permission of the copyright holder.

4 Claims, 50 Drawing Sheets

FIG. 8

| P(1,1) | P(2,1) | ----- | P(N,1) |
| P(1,2) | P(2,2) | ----- | P(N,2) |
| ----- | ----- | | ----- |
| P(1,M) | P(2,M) | ----- | P(N,M) |

FIG. 43

| INPUT | OUTPUT |
|-------|--------|
| 0 | 255 |
| 1 | 254 |
| 2 | 253 |
| 3 | 252 |
| 4 | 251 |
| 5 | 250 |
| 6 | 249 |
|   |   |
| 249 | 6 |
| 250 | 5 |
| 251 | 4 |
| 252 | 3 |
| 253 | 2 |
| 254 | 1 |
| 255 | 0 |

FIG. 49

| PROPERTY NAME | ID CODE | TYPE |
|---|---|---|
| NUMBER OF RESOLUTIONS | 0x01000000 | VT_UI4 |
| HIGHEST RESOLUTION WIDTH | 0x01000002 | VT_UI4 |
| HIGHEST RESOLUTION HEIGHT | 0x01000003 | VT_UI4 |
| DEFAULT DISPLAY HEIGHT | 0x01000004 | VT_R4 |
| DEFAULT DISPLAY WIDTH | 0x01000005 | VT_R4 |
| DISPLAY HEIGHT/WIDTH UNITS | 0x01000006 | VT_UI4 |

| PROPERTY NAME | ID CODE | TYPE |
|---|---|---|
| SUBIMAGE WIDTH | 0x02ij0000 | VT_UI4 |
| SUBIMAGE HEIGHT | 0x02ij0001 | VT_UI4 |
| SUBIMAGE COLOR | 0x02ij0002 | VT_BLOB |
| SUBIMAGE NUMERICAL FORMAT | 0x02ij0003 | VT_UI4|VT_VECTOR |
| DECIMATION METHOD | 0x02ij0004 | VT_I4 |
| DECIMATION PREFILTER WIDTH | 0x02ij0005 | VT_R4 |
| SUBIMAGE ICC PROFILE | 0x02ij007 | VT_UI2|VT_VECTOR |

| PROPERTY NAME | ID CODE | TYPE |
|---|---|---|
| JPEG TABLES | 0x03ij0001 | VT_BLOB |
| MAXIMUM JPEG TABLE INDEX | 0x03000002 | VT_UI4 |

FIG. 50

| FIELD NAME | LENGTH | BYTE(S) |
|---|---|---|
| LENGTH OF HEADER STREAM HEADER | 4 | 0-3 |
| IMAGE WIDTH | 4 | 4-7 |
| IMAGE HEIGHT | 4 | 8-11 |
| NUMBER OF TILES | 4 | 12-15 |
| TILE WIDTH | 4 | 16-19 |
| TILE HEIGHT | 4 | 20-23 |
| NUMBER OF CHANNELS | 4 | 24-27 |
| OFFSET TO TILE HEADER TABLE | 4 | 28-31 |
| LENGTH OF TILE HEADER ENTRY | 4 | 32-35 |
| TILE HEADER TABLE | VARIABLE | VARIABLE |

FIG. 51

| IMAGE HEADER FIELD | IMAGE FORMAT IDENTIFIER |
| --- | --- |
| | FILE SIZE |
| | NUMBER OF X-PIXELS (WIDTH) |
| | NUMBER OF Y-PIXELS (HEIGHT) |
| | DEPTH SIZE |
| | PRESENCE/ABSENCE OF COMPRESSION |
| | RESOLUTION |
| | OFFSET TO BITMAP |
| | COLOR PALLET SIZE |
| | COLOR PALLET DATA |
| IMAGE DATA FIELD | BIT MAP |

IMAGE PROCESSING APPARATUS AND METHOD, AND STORAGE MEDIUM

FIELD OF THE INVENTION

This invention relates to an image processing apparatus and method, and a storage medium and, more particularly, to an image processing apparatus and method for controlling output of a specific image, and a storage medium.

BACKGROUND OF THE INVENTION

As output apparatuses for a computer, information recording apparatuses using electrophotography such as a laser beam printer (to be abbreviated as an "LBP" hereinafter) and the like have prevailed. These information recording apparatuses have promoted quick proliferation of desktop publishing (DTP). Furthermore, along with improvement of performance of a host computer, a controller as an image generation unit of a printer, and the like, a color image can be easily processed as an object to be processed. Hence, an electrophotographic color printer has been developed, and not only conventional monochrome image printing but also color image printing have prevailed.

Also, the number of types of devices that output image data (e.g., a photo image input from an image scanner, digital camera, or the like is output to a color printer or is displayed on a monitor) is increasing.

In this manner, since image data are used in various applications, a hierarchical data format that handles image data having a plurality of resolutions in a hierarchical structure is prevalent. As such hierarchical data format, for example, FlashPix (tradename of Eastman Kodak Company) is known.

By utilizing features of the hierarchical data format, image data sensed by the user himself or herself can be disclosed to the public on the Internet. Another user who reviewed that image can display low-resolution image data on a display device such as a monitor and output high-resolution image data to an output apparatus such as a color printer or the like. In this manner, image data can be selectively output.

However, even an ill-disposed person can use copyrighted image data without permission via the Internet.

SUMMARY OF THE INVENTION

Accordingly, it is an object of the present invention to provide an image processing apparatus and method, which print out specific image data, which is inhibited from being output without permission, at a low-resolution.

According to the present invention, the foregoing object is attained by providing an image processing apparatus comprising: input means for inputting image data having a hierarchical structure; determination means for determining if the image data is a specific image; and output means for selecting and outputting a layer to be output of the image data on the basis of a determination result of the determination means.

In accordance with the present invention as described above, the resolution of an output image can be selected in accordance with whether or not image data is a specific image.

It is another object of the present invention to provide an image processing apparatus and method, which print out specific image data, which is inhibited from being output without permission, at a high resolution, if its output is permitted.

According to the present invention, the foregoing object is attained by providing an image processing apparatus comprising: input means for inputting image data; determination means for determining if the image data is a specific image; output permission detection means for obtaining output permission information of the image data; and image processing means for executing an image process that improves image quality of the image data in accordance with a determination result of the determination means and the output permission information.

In accordance with the present invention as described above, a specific image, output of which is permitted, can be printed out with high image quality.

It is another object of the present invention to provide an image processing apparatus and method, which print out specific image data, which is inhibited from being output without permission, by adding noise.

According to the present invention, the foregoing object is attained by providing an image processing apparatus comprising: input means for inputting image data having a hierarchical structure; determination means for determining if the image data is a specific image; and noise addition means for adding noise to the image data on the basis of a determination result of the determination means.

In accordance with the present invention as described above, if image data is a specific image, noise can be added to an output image.

It is another object of the present invention to provide an image processing apparatus and method, which print out specific image data, which is inhibited from being output without permission, by adding noise.

According to the present invention, the foregoing object is attained by providing an image processing apparatus comprising: input means for inputting image data having a hierarchical structure; determination means for determining if the image data is a specific image; and pseudo halftone means for executing a pseudo halftone process of the image data on the basis of a determination result of the determination means.

In accordance with the present invention as described above, a pseudo halftone process can be done in accordance with whether or not image data is a specific image.

It is another object of the present invention to provide an image processing apparatus and method, which convert an output color of specific image data, which is inhibited from being output without permission.

According to the present invention, the foregoing object is attained by providing an image processing apparatus comprising: input means for inputting image data having a hierarchical structure; determination means for determining if the image data is a specific image; and color conversion means for executing a color conversion process for the image data on the basis of a determination result of the determination means.

In accordance with the present invention as described above, a color conversion process can be done in accordance with whether or not image data is a specific image.

The invention is particularly advantageous since specific image data, which is inhibited from being output without permission can be prevented from being printed out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view for explaining the operation of an averaging device;

FIG. 43 is a table showing the input/output relationship of a look-up table in the 12th embodiment;

FIG. 49 is a table showing the logic structure of an Image Contents Property Set of the FlashPix image file;

FIG. 50 is a table showing the logic structure of a Subimage Header of the FlashPix image file; and FIG. 51 shows an example of an image data format without any hierarchical structure.

DETAILED DESCRIPTION OF THE PREFERRED

Preferred embodiments of the present invention will now be described in detail in accordance with the accompanying drawings.

In the following description, the present invention is applied to a 600-dpi color LBP. However, the present invention is not limited to such specific printer, and can be applied to any other image processing apparatuses such as color printers, color facsimile apparatuses, and the like having arbitrary recording resolutions without departing from the scope of the invention.

FlashPix (tradename of Eastman Kodak Company), that is receiving a lot of attention recently, will be explained below as an example of image data having the hierarchical structure (hierarchical data format) in the present invention. The FlashPix file format will be explained in comparison with a general image format without any hierarchical structure.

[General Image Format]

FIG. 51 shows an example of a general image format without any hierarchical structure. As shown in FIG. 51, a conventional image file is roughly classified into an image header field and image data field. In general, the header field stores information required for reading data from that image file, and additional information that explains the contents of an image. In the example shown in FIG. 51, the header field stores an image format identifier indicating a format name in the image file, file size, image width, height, and depth, presence/absence of compression, color pallet information, resolution, offset to the storage location of image data, and the like. On the other hand, the image data field stores actual image data in turn.

As typical examples of such image format, the BMP format of Microsoft Corp., the GIF format of Compuserve Corp., and the like have prevailed.

[FlashPix Format]

In the FlashPix format to be described below, the image attribute information stored in the image header field in the aforementioned conventional image format, and image data are further structured and stored in an image file.

Figure 45:
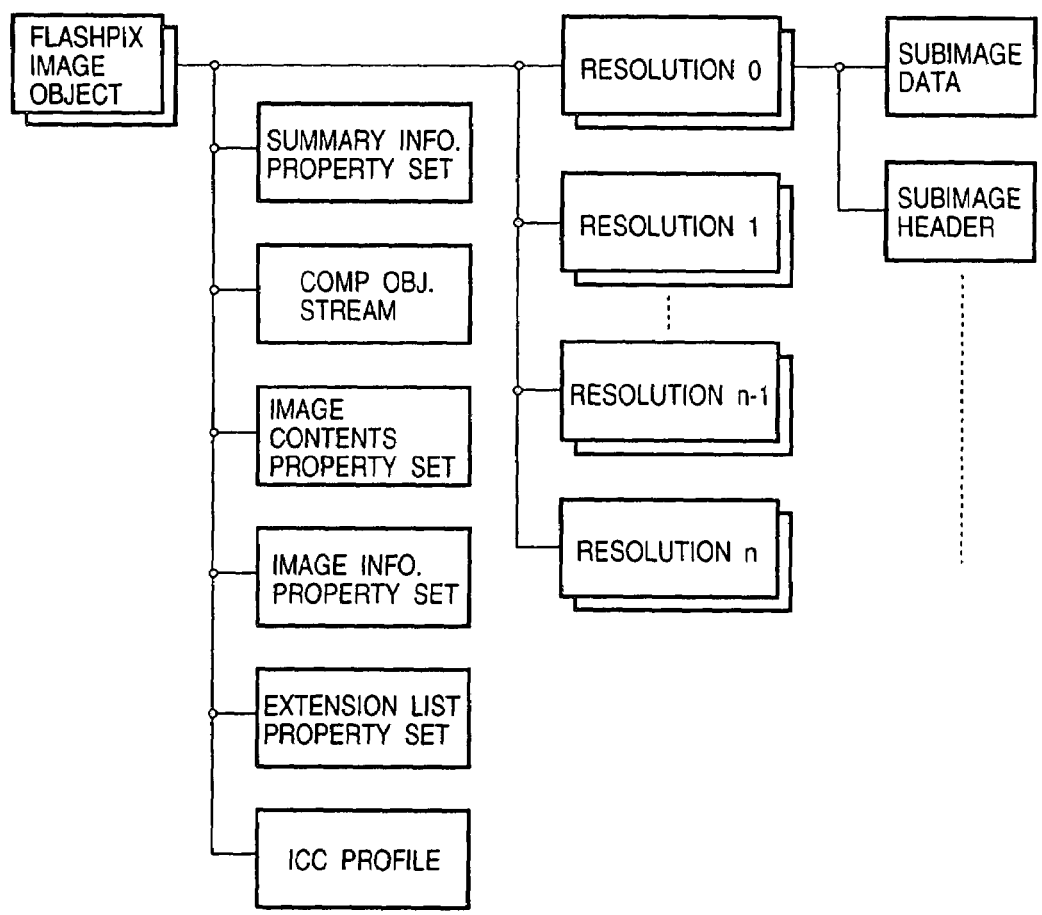
FIG. 45 shows the logic structure of a FlashPix image file.
Figure 46:
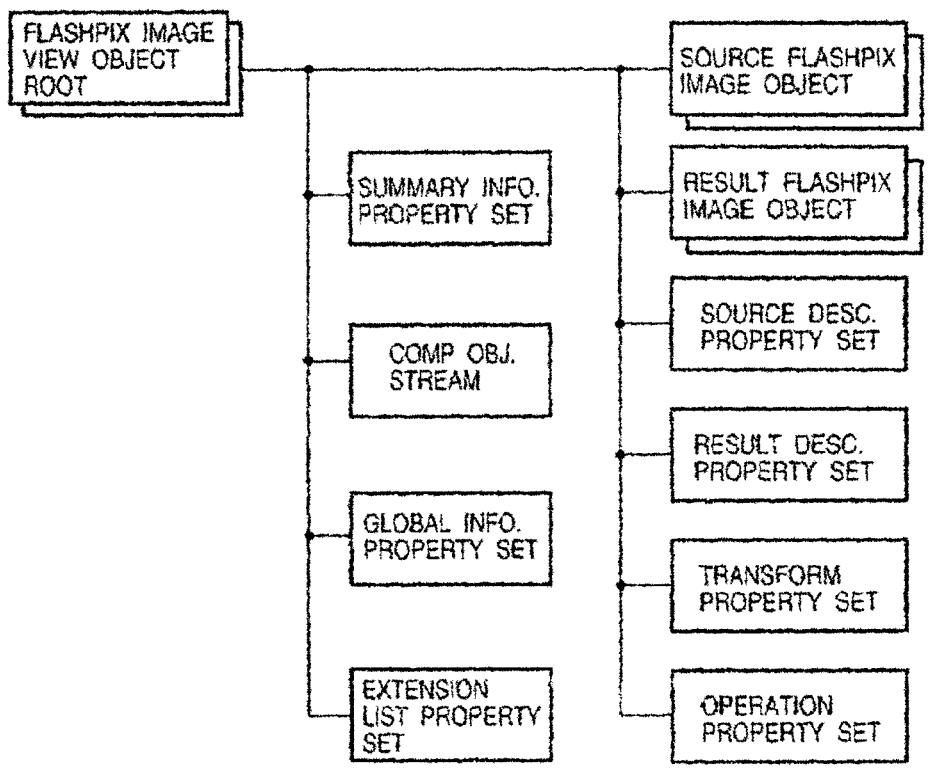
FIG. 46 shows the logic structure of a FlashPix image file.

FIGS. 45 and 46 show the logic structure of the FlashPix format. Referring to FIGS. 45 and 46, properties and image data in an image file are accessed using "storages" and "streams" corresponding to MS-DOS directories and files. In FIGS. 45 and 46, blocks bounded by double lines are "storages" and blocks bounded by single lines are "streams". Image data and image attribute information are stored in streams.

Image data are hierarchically stored to have different resolutions, and images of the respective resolutions called Subimages are indicated by Resolutions 0, 1, . . . in FIG. 45. For an image of each resolution, information required for reading out that image is stored in a Subimage header, and image data itself is stored in Subimage data.

Property Sets in FlashPix categorize and define various kinds of attribute information in correspondence with their use purposes and contents, and include Summary Info. Property Set, Image Info. Property Set, Image Contents Property Set, and Extension List Property Set, as shown in FIG. 45. These Property Sets will be explained below.

Summary info. Property Set is not unique to FlashPix, but is mandatory for "structured storage" of Microsoft Corp., and stores information such as a title, comment, author, thumbnail image, and the like of that image file.

Image Contents Property Set is an attribute that describes the storage method of image data, and FIG. 49 shows an example of this Property Set. This attribute describes the number of layers of image data, the width and height of an image of a maximum resolution, the widths, heights, and color depths of images of the respective resolutions, or definitions of a quantization table/Huffman table upon using JPEG.

Image Info. Property Set stores a variety of information that can be used upon using an image, e.g., information indicating the way the image was captured, the way the image can be used, and so forth. Examples of information that can be stored as Image Info. Property Set are listed below.

information (File Source) that pertains to the method digital data was captured/generated information (Intellectual property) that pertains to copyrights information (Content description) that pertains to the contents of an image (person, location, and the like in an image)

information (Camera information) that pertains to a camera used in image sensing information (Per Picture camera settings) of camera setting upon image sensing (exposure value, shutter speed, focal length, presence/absence of use of an electronic flash, and the like)

information (Digital camera characterization) that pertains to resolution unique to a digital camera and a mosaic filter information (Film description) of the manufacturer name, product name, type (positive/negative, color/monochrome), and the like of film information (Scan device) that pertains to a scanner and software used, and the operator of the scanner in case of a scan image.

Extension list Property Set is a field used when information which is not included in the basic specifications of FlashPix is to be added.

FlashPix Image View Object shown in FIG. 46 is an image file which stores a combination of viewing parameters used upon displaying an image, and image data. The viewing parameters are a set of processing coefficients stored upon applying image rotation, enlargement/reduction, movement, color conversion, and filtering in image display.

Source/Result FlashPix Image Object is an entity of a FlashPix image. Source FlashPix Image Object is mandatory, and Result FlashPix Image Object is optional. Source FlashPix Image Object stores original image data, and Result FlashPix Image Object stores an image obtained as a result of an image process using the viewing parameters.

Source/Result desc. Property set is a property set for identifying the image data, and stores information such as an image ID, a change inhibition property set, a last update date, and the like.

Transform Property Set stores information such as Affine transform coefficients for rotation, enlargement/reduction, and movement, color conversion matrix, contrast adjustment value, filtering coefficients, and the like.

Handling of image data hierarchically stored in the FlashPix format will be explained below.

Figure 47:
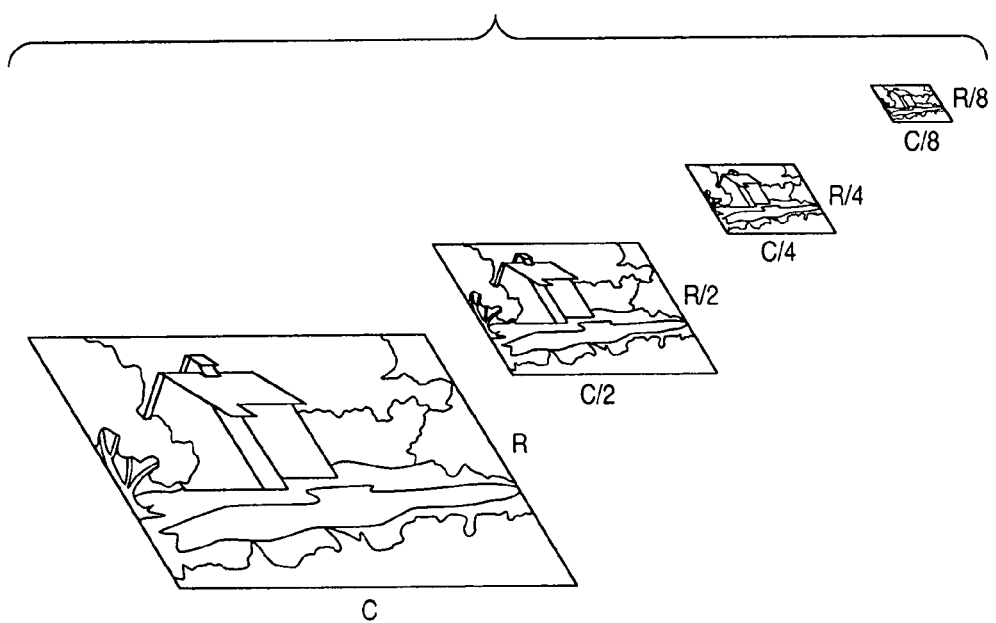
FIG. 47 shows an example of hierarchical images that construct the FlashPix image file.

The FlashPix image format includes images of a plurality of resolutions, each of which is segmented into a tile pattern. FIG. 47 shows an example of an image file including a plurality of images having different resolutions. In FIG. 47, an image having a maximum resolution has a size of X0×Y0 (column×row), and the next largest image has a size of X0/2×Y0/2. Likewise, the column and row sizes repeatedly reduce to ½ until they become equal to or smaller than 64 pixels.

As a result of such hierarchizing, "the number of layers per image file", and the header information and image data that have been explained in the paragraphs of the general image format are required as attribute information of an image of each layer. Image Contents property Set shown in FIG. 49 describes information that pertains to the number of layers per image file, the width and height of an image having a maximum resolution, or the widths, heights, color depths, compression format, and the like of images of the respective resolutions.

Figure 48:
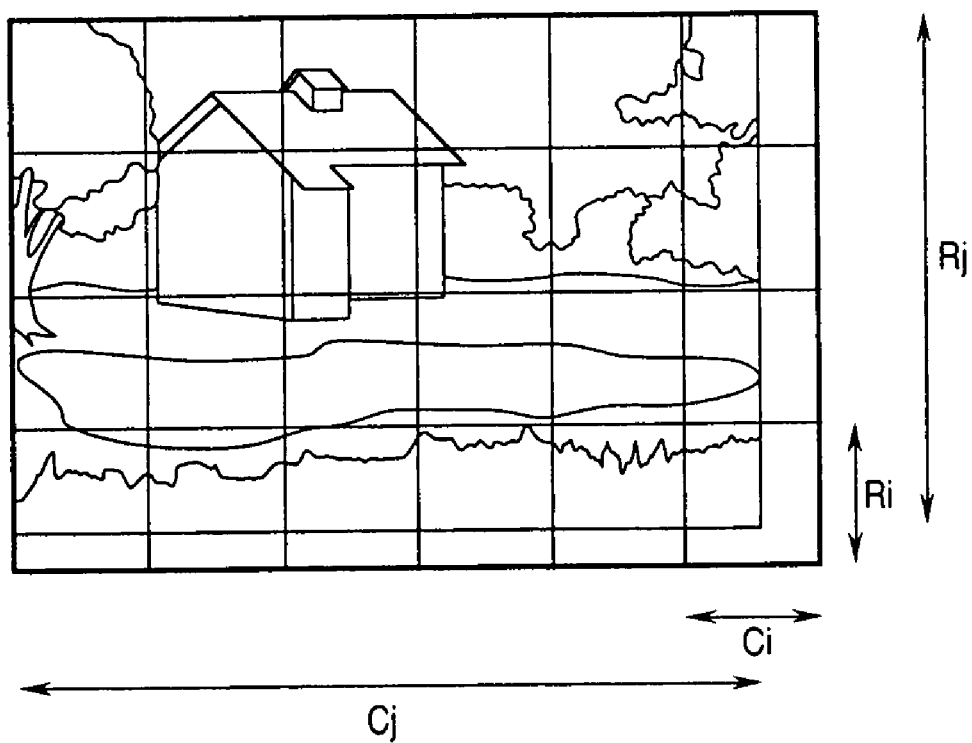
FIG. 48 is a view for explaining tile segmentation of a subimage of the FlashPix image file.

Furthermore, an image of each resolution is segmented into 64×64 (pixel) tiles, as shown in FIG. 48. When an image is segmented into 64×64 (pixel) tiles in turn from its upper left portion, some images may have some blank tiles at the right and lower ends. In such case, 64×64 (pixel) tiles are constructed by repetitively inserting the rightmost or lowermost end images. In FlashPix, an image in each tile is stored by one of JPEG compression, single-color compression, and non-compression. Note that JPEG compression is a scheme internationally standardized by ISO/IEC JTC1/SC29, and a description of the scheme itself will be omitted here. Also, single-color compression is a scheme for expressing the color of a given tile by one color without recording individual pixel values only when the tile is formed by an identical color. This scheme is particularly effective for an image generated by computer graphics.

These tiled image data are stored in a Subimage data stream, and the total number of tiles, individual tile sizes, data start positions, and compression schemes are stored in a Subimage header. FIG. 50 shows an example of the Subimage header.

First Embodiment

Figure 1:
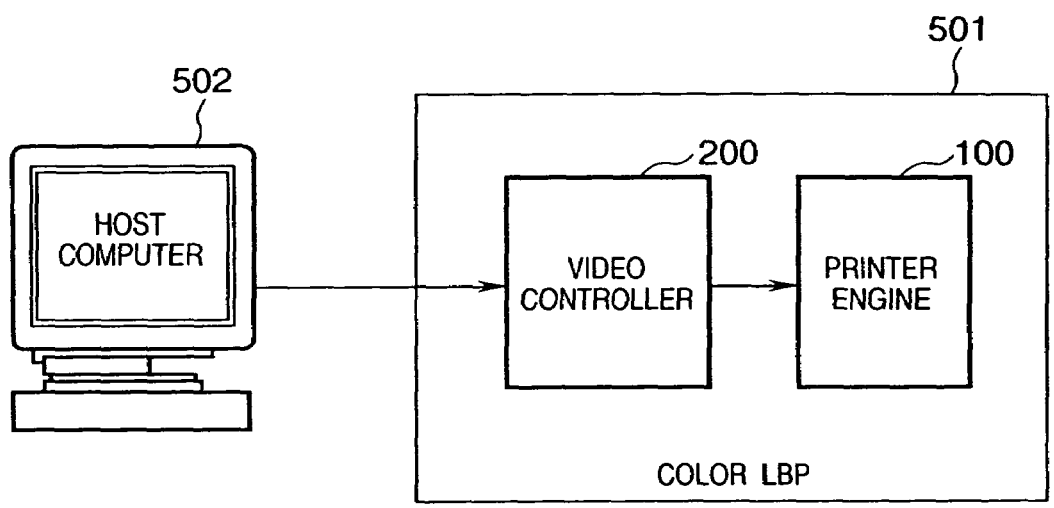
FIG. 1 is a schematic block diagram showing the arrangement of a color LBP according to the first embodiment of the present invention.

FIG. 1 shows the schematic arrangement of a color LBP according to an embodiment of the present invention.

Referring to FIG. 1, a color LBP 501 receives code data and image data described in a printer description language (PDL), which are sent from a host computer 502 as an external apparatus, and forms a color image on a recording medium on the basis of these data.

More specifically, the color LBP 501 comprises a printer controller (to be simply referred to as a "controller" hereinafter) 200 and a printer engine (to be simply referred to as an "engine" hereinafter) 100. The controller 200 generates magenta (M), cyan (C), yellow (Y), and black (K) multi-valued image data for one page on the basis of data input from the host computer 502. The engine 100 records a color image via a series of electrophotography processes, i.e., forms a latent image by scanning a photosensitive drum with a laser beam, which is modulated in accordance with the multi-valued image data generated by the controller 200, develops the latent image with toner, transfers the toner image onto a recording sheet, and fixes the toner image on the recording sheet. Note that the engine 100 has a resolution of 600 dpi.

Figure 2:
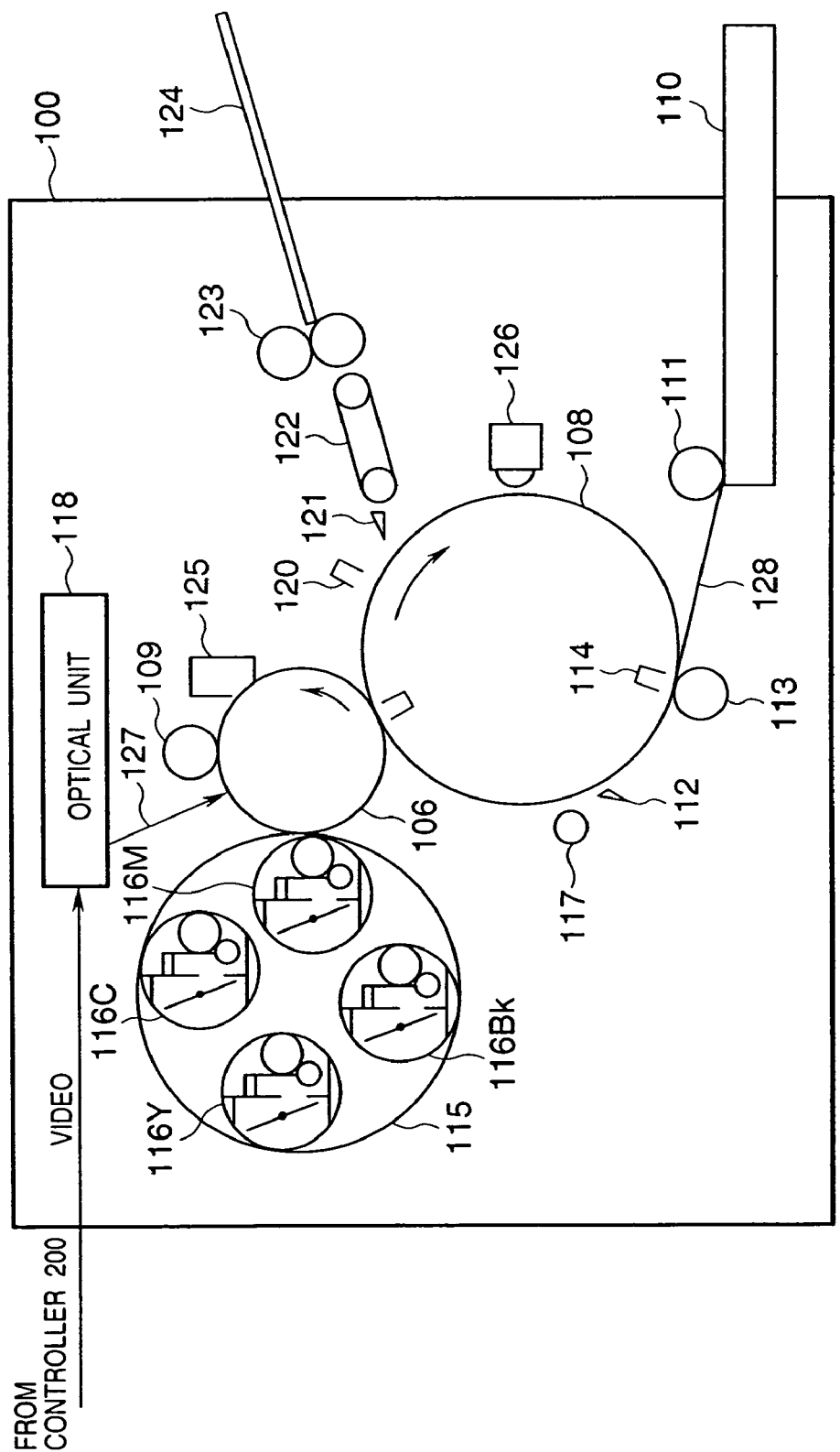
FIG. 2 is a detailed block diagram showing the arrangement of a printer engine.

FIG. 2 is a detailed block diagram showing an example of the arrangement of the engine 100. The operation of the engine 100 will be described below with reference to FIG. 2.

Referring to FIG. 2, the engine 100 rotates a photosensitive drum 106 and transfer drum 108 in the directions of arrows in FIG. 2 by driving means (not shown). The engine 100 then starts charging of a roller charger 109 to nearly uniformly charge the surface potential of the photosensitive drum 106 to a predetermined value. The engine 100 feeds a recording sheet 128 stored in a recording sheet cassette 110 to the transfer drum 108 by a paper feed roller 111. The transfer drum 108 is prepared by adhering a dielectric sheet on a hollow support member, and rotates in the direction of the arrow at the same velocity as the photosensitive drum 106.

The recording sheet 128 fed to the transfer drum 108 is held by a gripper 112 provided on the support member of the transfer drum 108, and is attracted on the transfer drum 108 by an attraction roller 113 and attraction charger 114. At the same time, a developer support member 115 is rotated so that one corresponding to a first latent image to be formed of four developers 116Y, 116M, 116C, and 116K supported by the support member 115 opposes the photosensitive drum 106. Note that the developers 116Y, 116M, 116C, and 116K respectively store yellow (Y), magenta (M), cyan (C), and black (K) toners.

On the other hand, the engine 100 detects the leading end of the recording sheet 128 attracted on the transfer drum 106 using a sheet leading end detector 117, and sends a control signal to the controller 200. Upon receiving the control signal, the controller 200 outputs a video signal to a laser driver 102 in an optical unit 118.

Figure 3:
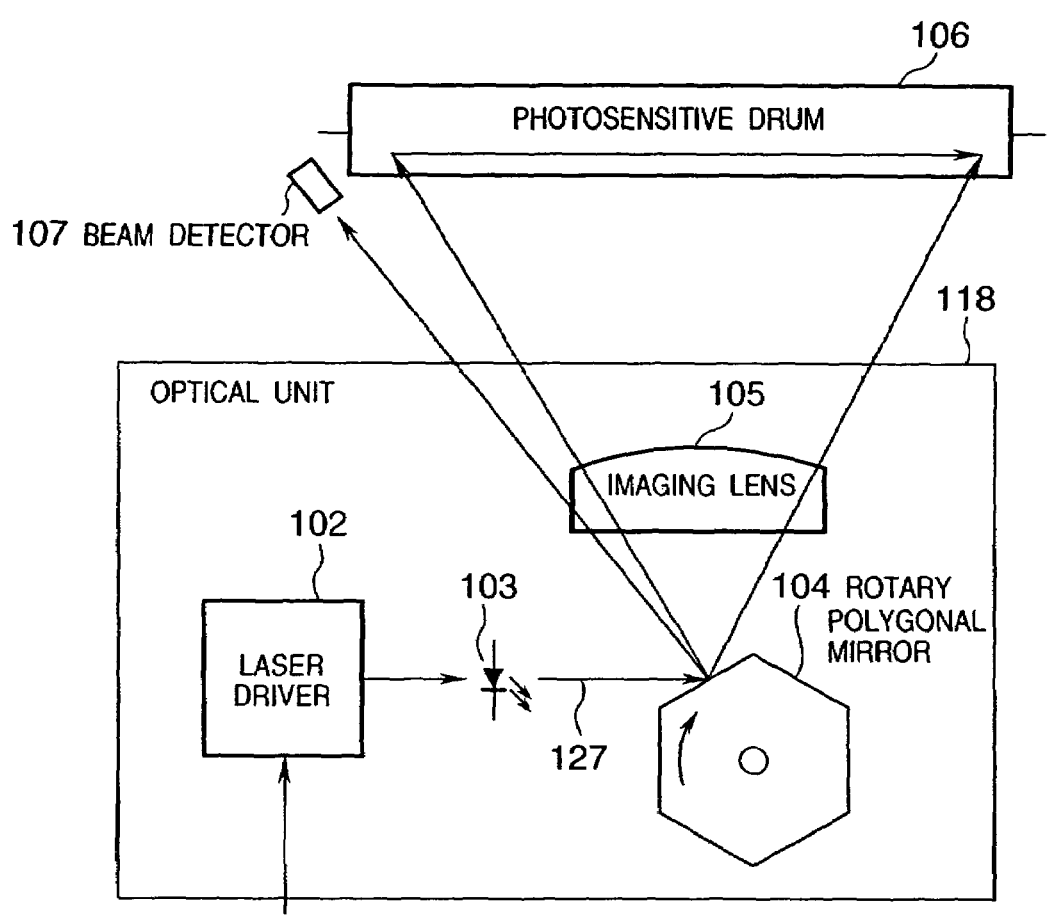
FIG. 3 is a detailed block diagram showing the arrangement of an optical unit.

FIG. 3 shows the detailed arrangement of the optical unit 118 shown in FIG. 2. The laser driver 102 makes a laser diode 103 emit light in accordance with a video signal, thus outputting a laser beam 127. The laser beam 127 is deflected by a rotary polygonal mirror 104, which is rotated by a motor (not shown) in the direction of an arrow in FIG. 3, and scans the surface of the photosensitive drum 106 in the main scan direction via an imaging lens 106 inserted in its optical path, thus forming a latent image on the photosensitive drum 106. At this time, a beam detector 107 generates a horizontal sync signal by detecting the scan start point of the laser beam 127.

The latent image formed on the photosensitive drum 106 is developed by the corresponding developer, and is then transferred onto the recording sheet 128 attracted on the transfer drum 108 by a transfer charger 119. In this case, the residual toner on the photosensitive drum 106 after transfer is removed by a cleaning device 125.

By repeating the aforementioned operations, color toner images are transferred onto the recording sheet 128.

The recording sheet 128 on which all the toner images have been transferred is peeled from the transfer drum 108 by a separation pawl 121 via a separation charger 120, and is fed to a fixing device 128 by a conveyor belt 122. At this time, a transfer drum cleaner 126 cleans the surface of the transfer drum 108. The toner images on the recording sheet 128 are melted and fixed by heat and pressure applied by the fixing device 123, thus forming a full-color image. The recording sheet 128 recorded with the full-color image is exhausted onto an exhaust tray 124.

Figure 4:
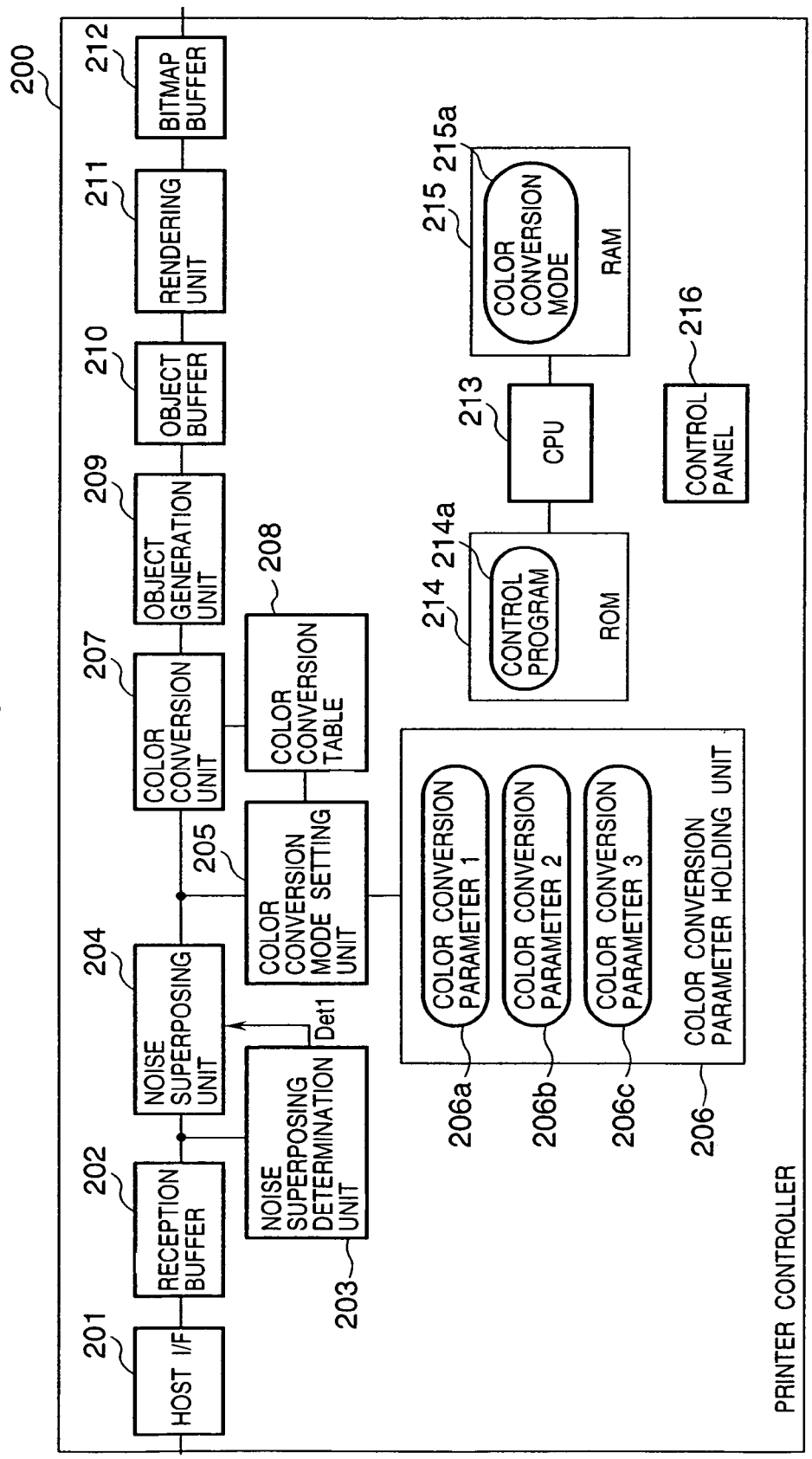
FIG. 4 is a detailed block diagram showing the arrangement of a printer controller in the first embodiment.

FIG. 4 is a block diagram showing an example of the detailed arrangement of the controller 200. The operation of the controller 200 will be explained below with reference to FIG. 4.

Referring to FIG. 4, reference numeral 201 denotes a host interface (to be referred to as a "host I/F" hereinafter), which communicates with the host computer 502 to receive print information such as code data, image data, and the like described in PDL. In this embodiment, image data (having the structure shown in FIGS. 45 and 46) such as FlashPix or the like, which complies with the hierarchical data format that hierarchically handles image data of a plurality of resolutions, will be referred to as FPX data, and a case will be examined below wherein FPX data is received from the host computer 502 as print information, and is printed out.

Reference numeral 202 denotes a reception buffer for holding input print information. Reference numeral 203 denotes a noise superposing determination unit, which acquires copyright information from extended property information of FPX data input from the host computer 502, and determines whether or not noise is superposed on image data in the FPX data. Reference numeral 204 denotes a noise superposing unit which superposes noises on FPX data on the basis of a control signal Det1 from the noise superposing determination unit 203. Note that a noise superposing process will be described in detail later.

Reference numeral 205 denotes a color conversion mode setting unit, which selects color conversion parameters corresponding to a color conversion mode (e.g., standard color, high gloss color, low gloss color, high vividness color, and the like) input from the host computer 502 from a color conversion parameter holding unit 206, and creates and stores a color conversion table 208. Reference numeral 206 denotes a color conversion parameter holding unit, which holds, e.g., color conversion parameters 1 (206a), color conversion parameters 2 (206b), and color conversion parameters 3 (206c) corresponding to the color conversion modes. Reference numeral 207 denotes a color conversion unit, which converts RGB FPX data input from the host computer 502 into CMYK data by interpolation with reference to the color conversion table 208.

Reference numeral 209 denotes an object generation unit, which converts information (PDL) such as FPX data or the like input from the host computer 502 into objects. In this manner, the FPX data is converted into objects in the CMYK format that have undergone the noise superposing process and color conversion by the noise superposing unit 204 and color conversion unit 207.

Reference numeral 210 denotes an object buffer, which stores objects for one page, converted by the object generation unit 209. Reference numeral 211 denotes a rendering unit, which renders on the basis of the objects for one page stored in the object buffer 210, and converts them into bitmap data to be rendered. Reference numeral 212 denotes a bitmap buffer, which stores the bitmap data generated by the rendering unit 211, and outputs the bitmap data to the printer engine 100.

Reference numeral 213 denotes a central processing unit (CPU), which controls various processes of the controller 200 via a CPU bus-(not shown) in accordance with control programs pre-stored in a ROM 214. Reference numeral 214 denotes a ROM (read-only memory), which stores various control programs 214a including a program shown in the flow chart in FIG. 5 (to be described later) Reference numeral 215 denotes a RAM (random access memory), which stores data required for the CPU 213 to control various processes in accordance with the control programs stored in the ROM 214, color conversion modes 215a, and the like, and is used as a work area of the CPU 213.

Reference numeral 216 denotes a control panel, which comprises a display unit that is constructed by a CRT, LCD, or the like and displays the operation state and condition of the apparatus, and an input unit that is constructed by a keyboard, touch panel, and the like, and inputs operator instructions. That is, the operator can directly make various setups of the color LBP 501 by operating this control panel 216.

The operation of the controller 200 in this embodiment will be described in detail below with reference to the flow chart shown in FIG. 5. Note that the control program that implements the processes shown in the flow chart in FIG. 5 is stored in the ROM 214, and is executed by the CPU 213, as described above.

Figure 5:
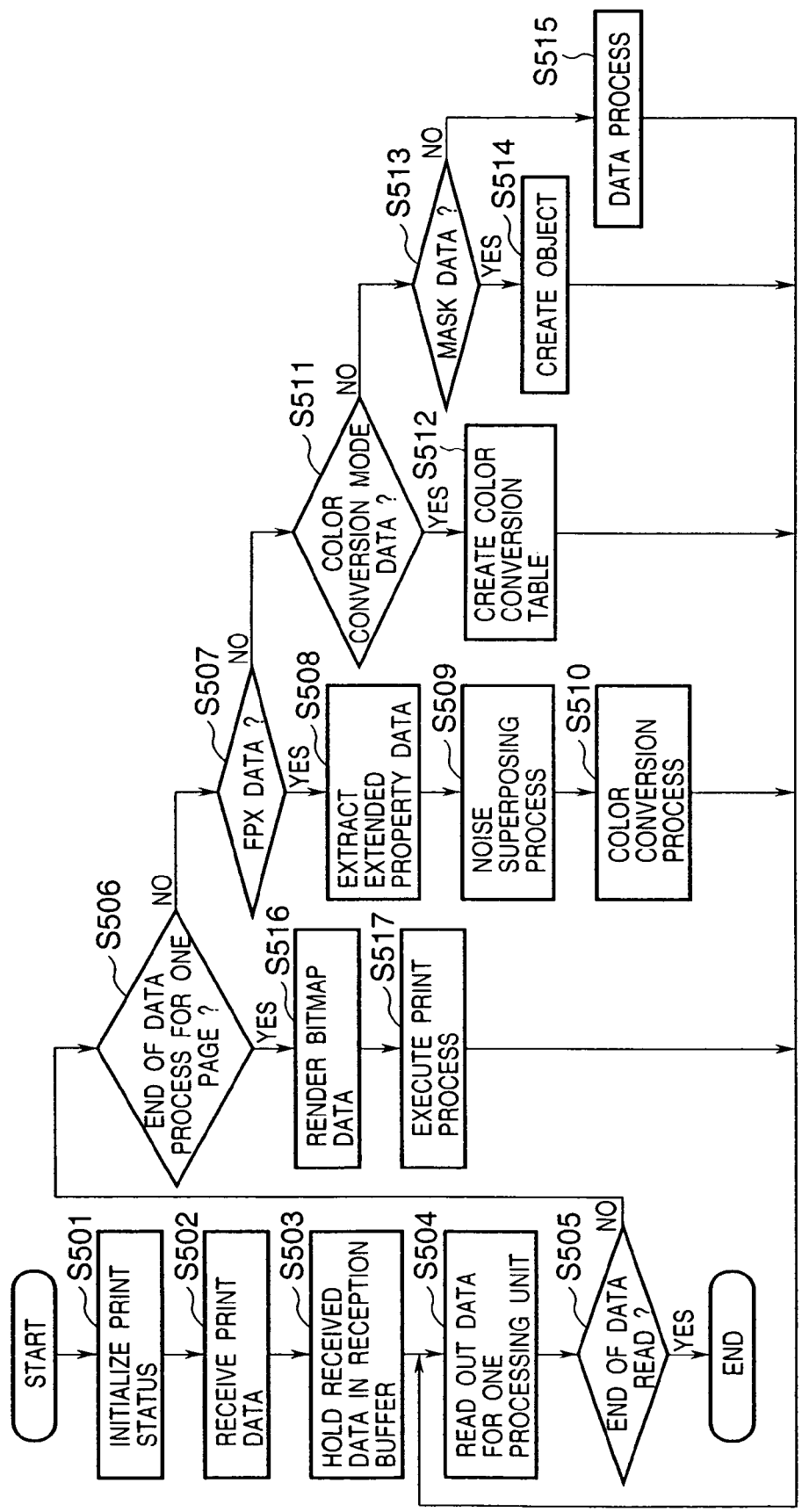
FIG. 5 is a flow chart showing the operation of the printer controller.

Referring to FIG. 5, the printer status is initialized as an initialization process of the color LBP 501, and the buffers are initialized (step S501). At this time, a color conversion table 208 is created and stored based on a default value of the color conversion mode. Print data is received from the host computer 502 (step S502), and is held in the reception buffer 202 (step S503). Data for one processing unit is read out from the reception buffer 202 (step S504), and it is checked if all data have been read out (step S505).

If NO in step S505, it is checked if a data process for one page is complete (step S506). If NO in step S506, it is checked if the print data is FPX data (step S507). If YES in step S507, copyright data is extracted from extended property information (step S508), and the noise superposing unit 204 executes a noise superposing process on the basis of the extracted data (step S509). The color conversion unit 207 converts the RGB FPX data that has undergone the noise superposing process in step S509 into CMYK color data by interpolation with reference to the color conversion table 208 (step S510), and the flow then returns to step S504.

On the other hand, if it is determined in step S507 that the print data is not FPX data, it is checked if the print data is color conversion mode data (step S511). If YES in step S511, the color conversion mode setting unit 205 creates the color conversion table 208 on the basis of color conversion parameters corresponding to the color conversion mode (step S512), and the flow returns to step S504.

If it is determined in step S510 that the print data is not color conversion mode data, it is checked if the print data is mask data of, e.g., a character, figure, or the like (step S513). If YES in step S513, an object of the mask data is generated (step S514), and the flow returns to step S504. If it is determined in step S513 that the print data is not mask data, a data process is done in accordance with the type of data (step S515), and the flow returns to step S504.

On the other hand, if it is determined in step S506 that the data process for one page is complete, a rendering process to bitmap data is done on the basis of objects held in the object buffer 210 (step S516), and the bitmap data is sent to the printer engine 100 to execute a print process (step S517). If it is determined in step S505 that all the data have been read out, the print process ends.

Figure 6:
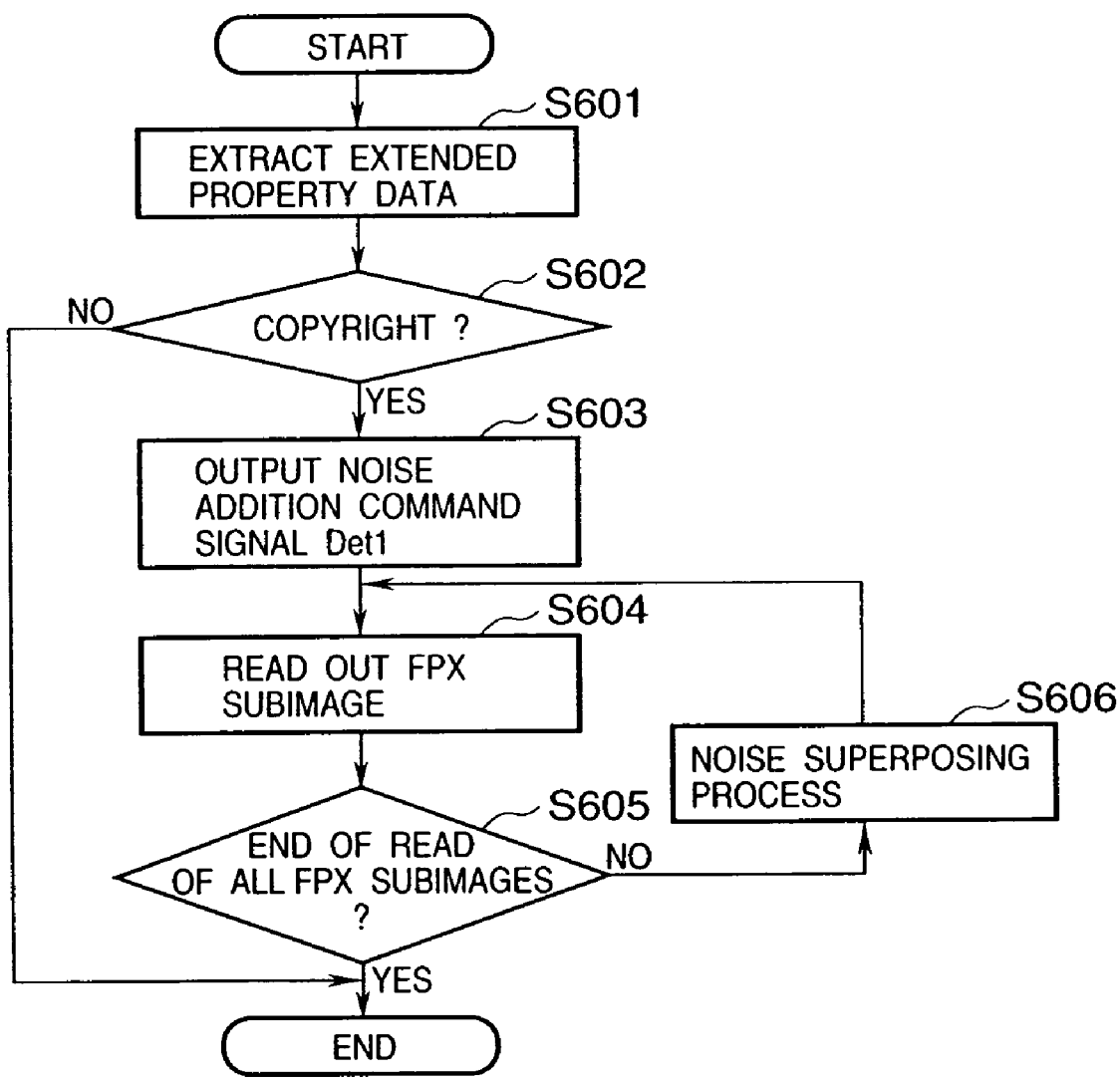
FIG. 6 is a flow chart showing a noise superposing process.

The operation of the noise superposing unit 204 in this embodiment will be described in detail below with reference to the flow chart in FIG. 6. The flow chart in FIG. 6 shows details of steps S508 and S509 shown in FIG. 5 above. Note that FPX image data explained in this embodiment and subsequent embodiments stores image data of four different resolutions, i.e., highest resolution=600 dpi, standard resolution=300 dpi, low resolution=150 dpi, and lowest resolution=75 dpi, and an image of each resolution is called a subimage.

Referring to FIG. 6, copyright information stored in extended property information of the FPX data is acquired in step S601, and it is checked if the FPX data to be printed is an image having a copyright (step S602). If YES in step S602, the noise superposing determination unit 203 outputs a noise addition command signal Det1 to the noise superposing (processing) unit 204 (step S603).

Then, an FPX subimage is read out (step S604), and it is checked if all FPX subimages have been read out (step S605). If NO in step S605, the noise superposing unit 204 superposes noise on the readout FPX subimage (step S606), and the flow returns to step S604.

On the other hand, if it is determined in step S604 that all FPX subimages have been read out, the process ends. If it is determined in step S602 that the FPX data to be printed does not have any copyright, the flow ends without executing the aforementioned processes.

Figure 7:
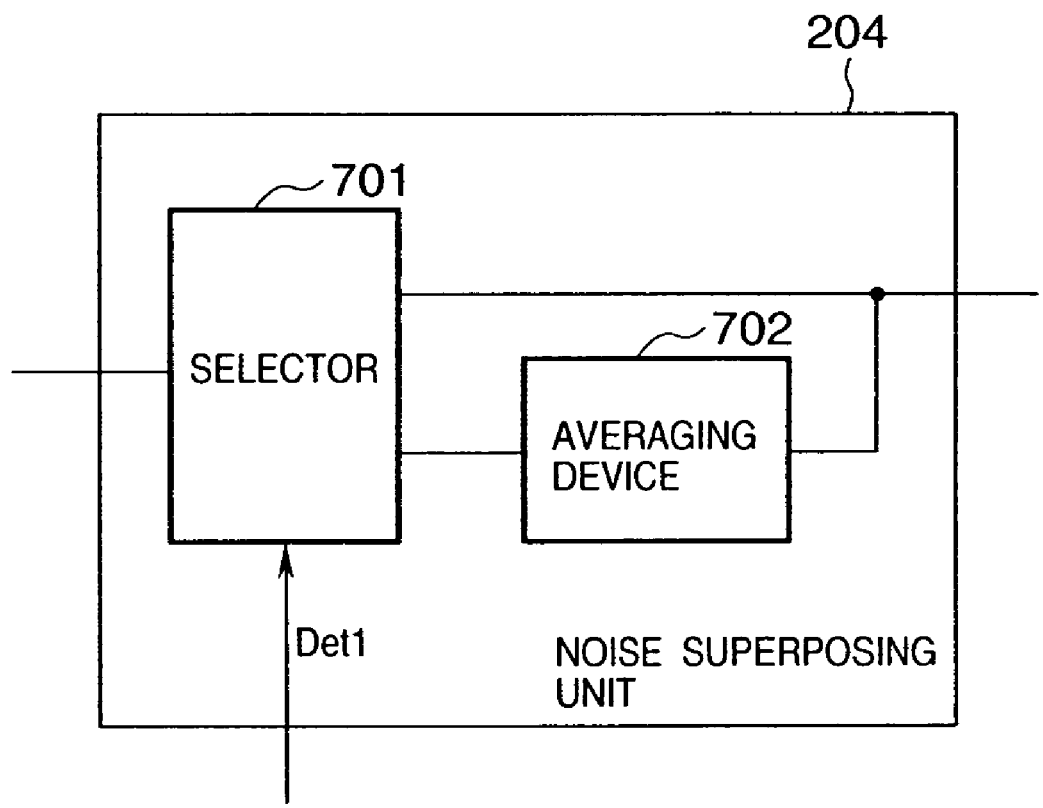
FIG. 7 is a detailed block diagram showing the arrangement of a noise superposing processing unit.

The noise superposing process in step S606 above will be explained in more detail below with reference to FIGS. 7 and 8.

In the noise superposing process in this embodiment, an averaging process is done in units of N×M pixels using an averaging device. FIG. 7 is a block diagram showing an example of the detailed arrangement of the noise superposing unit 204, which comprises a selector 701 and averaging device 702. The selector 701 is controlled by the noise addition command signal Det1 from the noise superposing determination unit 203. If the signal Det1 is true, the selector 701 is switched to input the FPX subimage to the averaging device 702.

Figure 8:
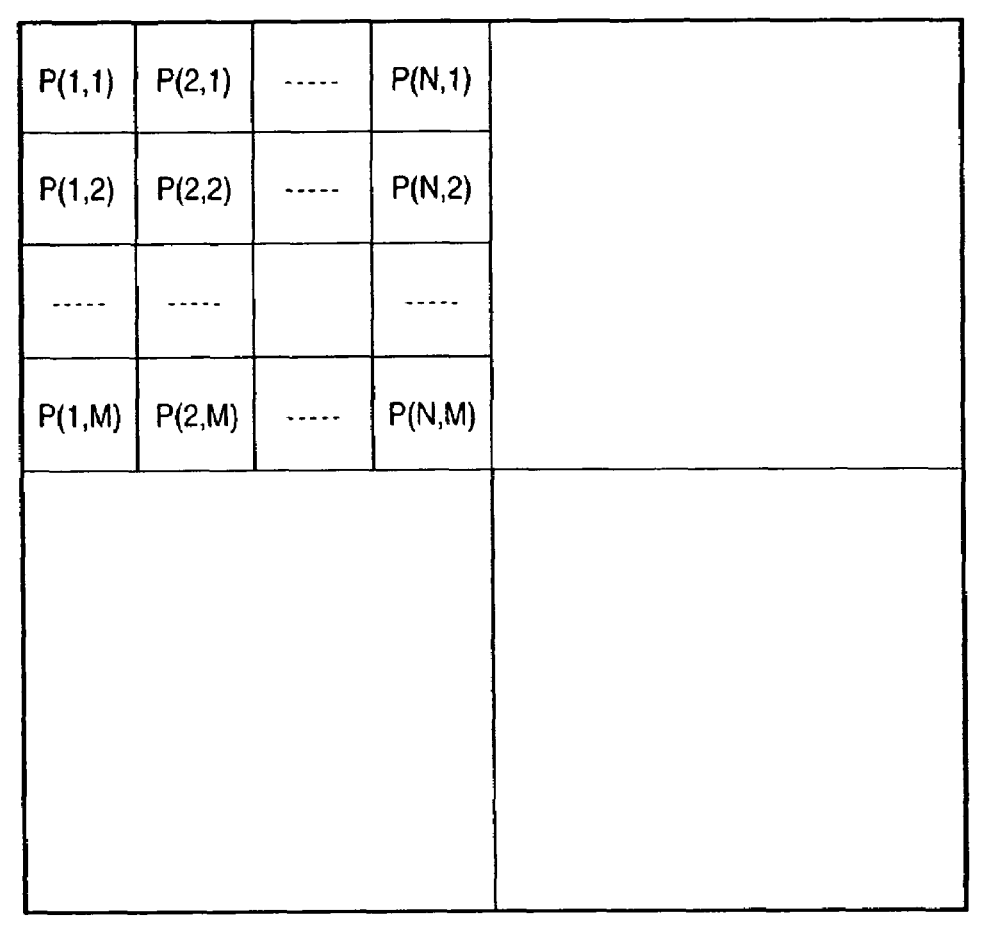

FIG. 8 is a view for explaining the operation in the averaging device 702, and shows FPX subimage data output from the noise superposing unit 204. Referring to FIG. 8, P(x, y) represents each pixel. The range from P(1, 1) to P(N, M) shown in FIG. 8 corresponds to a minimum unit block of the averaging process, and an average value Pave in this block is given by:

$$Pave = \Sigma\Sigma P(x, y)/(N \times M)$$

As described above, according to this embodiment, when received FPX data has a copyright, the noise superposing unit 204 outputs the average values Pave in units of predetermined blocks in place of original image data, thus adding proper noise to an original image. Hence, since the copyrighted image data deteriorates upon output, it can be prevented from being clearly printed out without permission by a third party with malicious intent.

When copyrighted image data is to be printed out after permission of a copyright holder is granted, the copyright holder can append information indicating print permission to copyright information stored in the extended property information of the FPX data. If the print permission information is appended, the image data to be printed can be processed in the noise superposing process of this embodiment in the same manner as image data without any copyright.

Second Embodiment

The second embodiment of the present invention will be described below. Note that the same reference numerals in the second embodiment denote substantially the same parts as those in the first embodiment mentioned above, and a detailed description thereof will be omitted.

Figure 9:
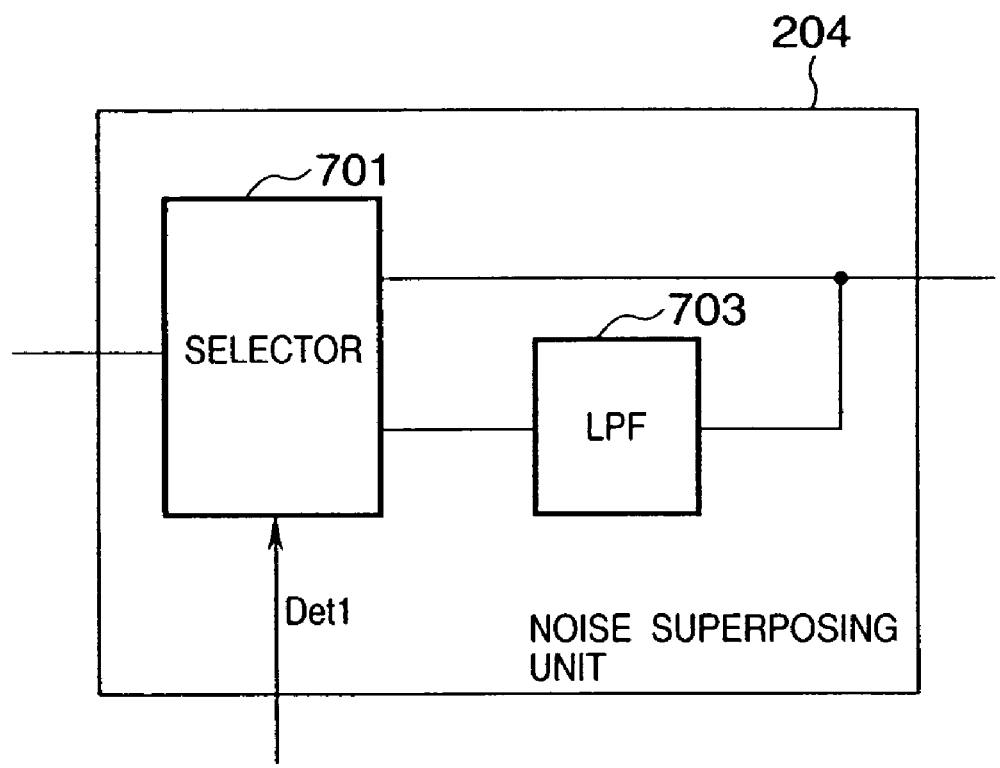
FIG. 9 is a detailed block diagram showing the arrangement of a noise superposing processing unit according to the second embodiment of the present invention.

In the second embodiment, the detailed arrangement of the noise superposing unit 204 is different from that in the first embodiment. FIG. 9 is a block diagram showing an example of the detailed arrangement of the noise superposing unit 204 in the second embodiment. Unlike the arrangement of the first embodiment shown in FIG. 7, a low-pass filter (to be referred to as an "LPF" hereinafter) 703 for band-limiting an FPX subimage in a two-dimensional space is arranged in place of the averaging device 702. The LPF 703 passes low-frequency components of an image space, and suppresses RF components. As typical LPFs for the two-dimensional space, a Butterworth filter, Gaussian filter, and the like are known.

According to the arrangement of the noise superposing unit 204 of the second embodiment, when the received FPX data has a copyright, only low-frequency components of the received data are output in place of original image data.

As described above, according to the second embodiment, an original image that deteriorates appropriately can be output as in the first embodiment. Hence, image data having a copyright can be prevented from being clearly printed out without permission by an ill-disposed person.

In the first and second embodiments, the noise superposing process is implemented by averaging or LPF. However, the noise superposing process of the present invention is not limited to such specific examples, but may use any other methods as long as the method does not faithfully reproduce input data when the input data has a copyright.

Third Embodiment

The third embodiment of the present invention will be described below. Note that the same reference numerals in the third embodiment denote substantially the same parts as those in the first and second embodiments mentioned above, and a detailed description thereof will be omitted.

Figure 10:
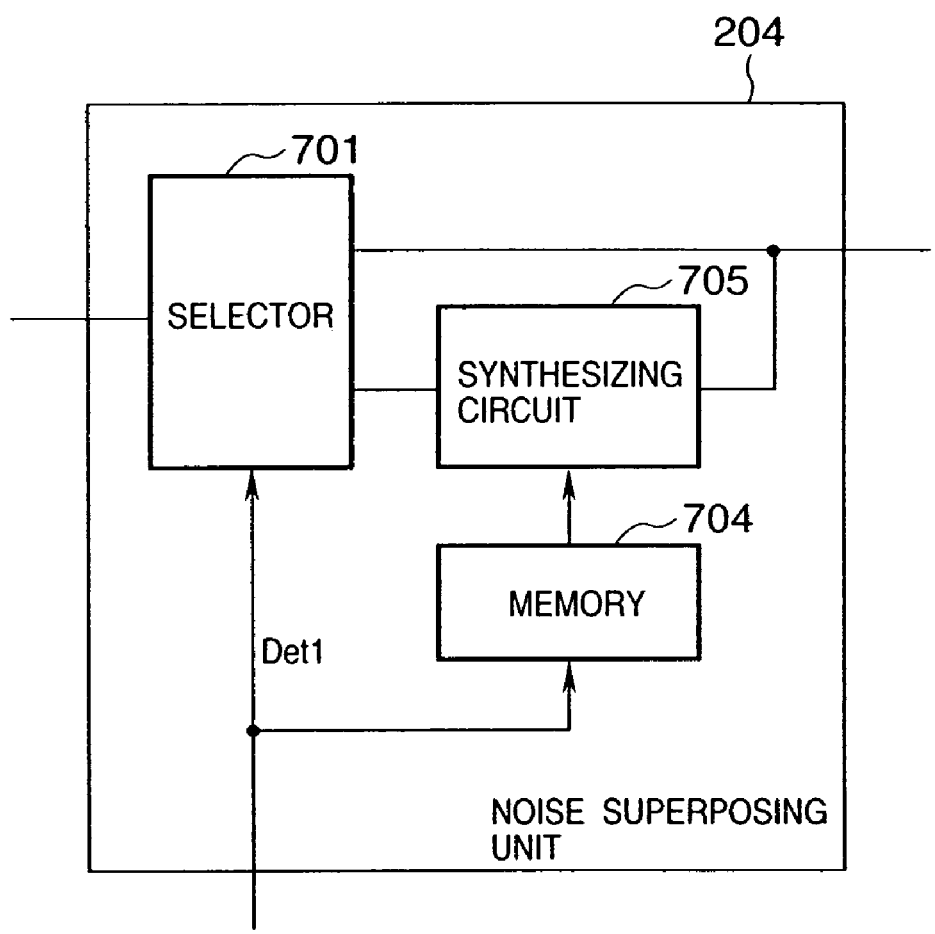
FIG. 10 is a detailed block diagram showing the arrangement of a noise superposing processing unit according to the third embodiment of the present invention.

In the third embodiment, the detailed arrangement of the noise superposing unit 204 is different from those in the first and second embodiments. FIG. 10 is a block diagram showing an example of the detailed arrangement of the noise superposing unit 204 in the third embodiment. Unlike in the arrangements of the first and second embodiments shown in FIGS. 7 and 9, data is appended to an input FPX subimage. Referring to FIG. 10, reference numeral 704 denotes a memory which pre-stores image data to be appended; and 705, a synthesizing circuit for synthesizing the image data output from the memory 704 in an FPX subimage input from the selector 701.

Figure 11:
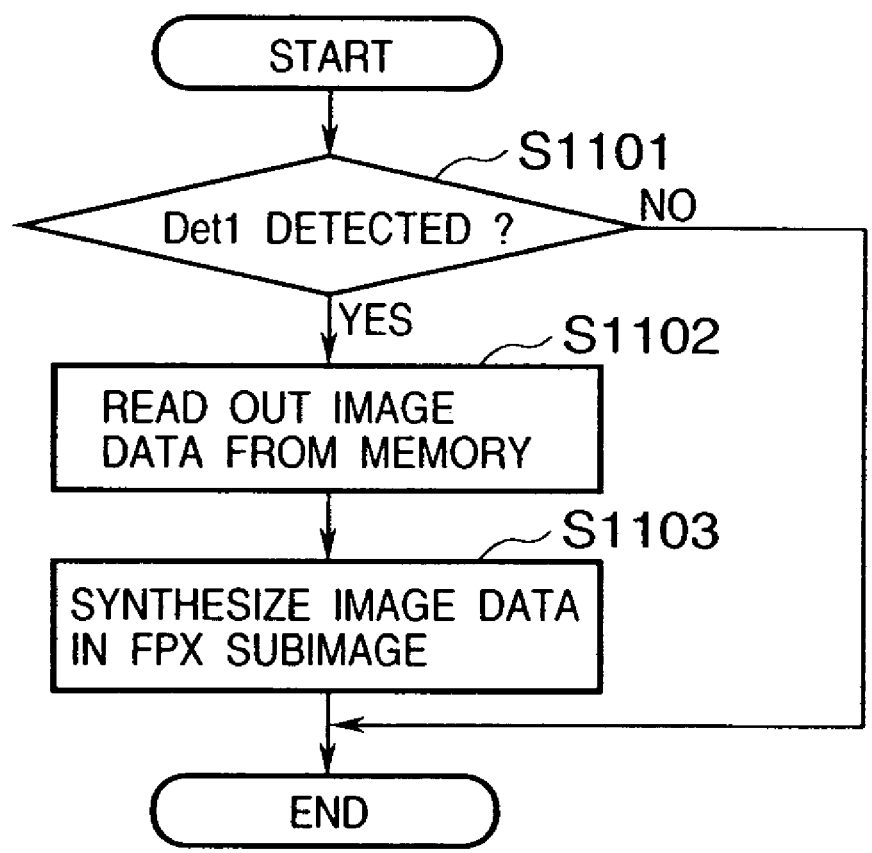
FIG. 11 is a flow chart showing the operation of the noise superposing processing unit in the third embodiment.

The operation of the noise superposing unit 204 in the third embodiment will be described in detail below with reference to the flow chart in FIG. 11. It is checked in step S1101 if the noise addition command signal Det1 from the noise superposing determination unit 203 is detected. If Det1 is true, it is determined that the subimage to be printed is data having a copyright, and the pre-stored image data is read out from the memory 704 (step S1102). The synthesizing circuit 705 synthesizes the image data read out in step S1102 with the subimage (step S1103), and outputs the synthesized data as print data, thus ending the process. On the other hand, if it is determined in step S1101 that the noise addition command signal Det1 is false, the flow ends without any process.

Figure 12:
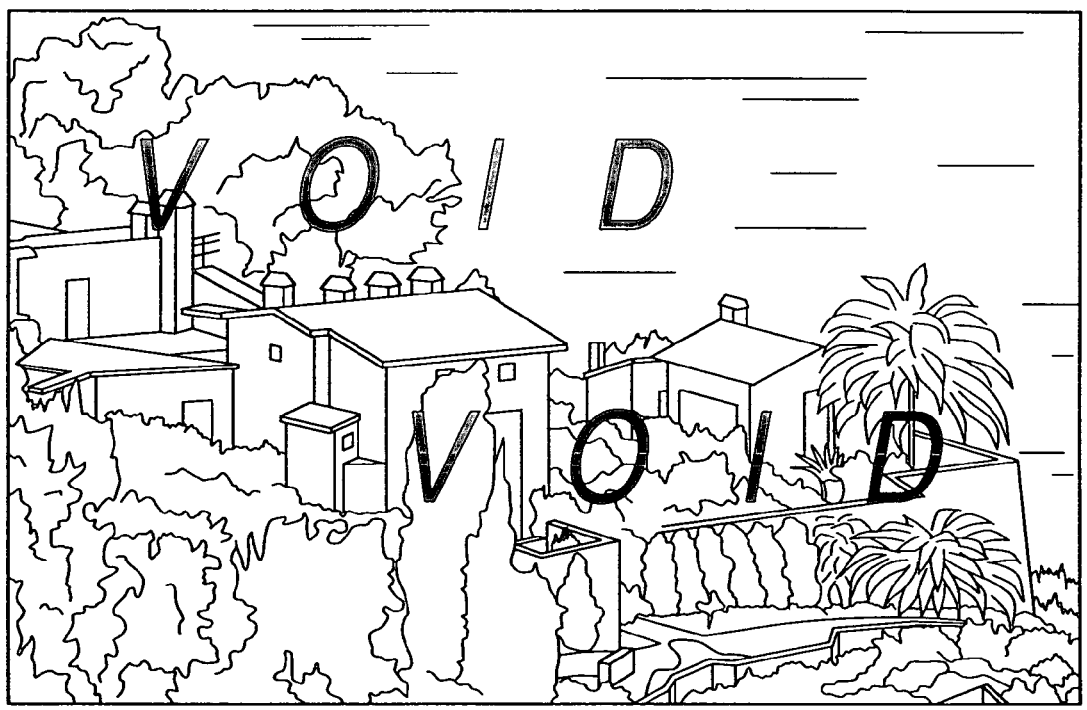
FIG. 12 shows an example of an output image after the noise superposing process in the third embodiment.

FIG. 12 shows an example of an image synthesized in the third embodiment. In FIG. 12, an image indicating letters "VOID" is appended to an original FPX subimage.

As described above, according to the third embodiment, a predetermined image can be forcibly appended to image data having a copyright, and the synthesized image can be output. Therefore, image data having a copyright can be prevented from being printed out without permission by an ill-disposed person.

Fourth Embodiment

The fourth embodiment of the present invention will be described below. In the first to third embodiments described above, all FPX subimage data undergo a noise superposing process. As a characteristic feature of the fourth embodiment, when the FPX data to be printed is image data having a copyright, an FPX subimage with the lowest resolution (75 dpi) is forcibly selected and printed out. Note that the same reference numerals in the fourth embodiment denote substantially the same parts as those in the first embodiment, and a detailed description thereof will be omitted.

Figure 13:
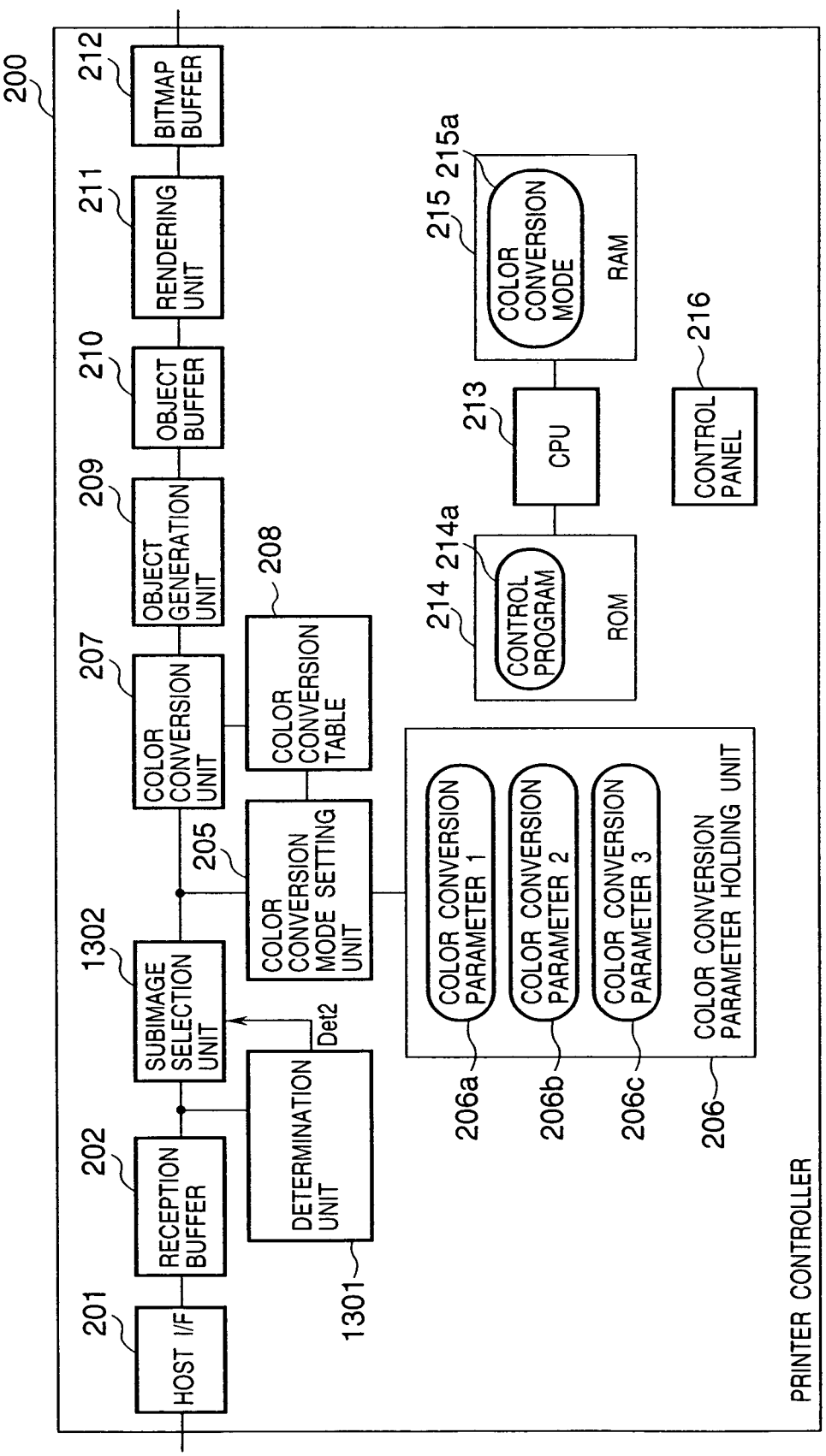
FIG. 13 is a detailed block diagram showing the arrangement of a printer controller according to the fourth embodiment of the present invention.

FIG. 13 is a block diagram showing an example of the detailed arrangement of the controller 200 in the fourth embodiment. Referring to FIG. 13, reference numeral 1301 denotes a determination unit, which acquires copyright information from extended property information of FPX data input from the host computer 502, determines whether or not image data of the FPX data should undergo a normal print process, and outputs a control signal Det2. Reference numeral 1302 denotes a subimage selection unit, which selects the resolution of a subimage to be output with respect to the FPX data on the basis of the control signal Det2 from the determination unit 1301.

The operation of the controller 200 in the fourth embodiment will be described in detail below with reference to the flow chart in FIG. 14. Note that the same step numbers in the flow chart shown in FIG. 14 denote the same processes as those in FIG. 5 in the first embodiment, and a detailed description thereof will be omitted. The control program that implements the processes shown in the flow chart in FIG. 14 is also stored in the ROM 214, and is executed by the CPU 213.

Figure 14:
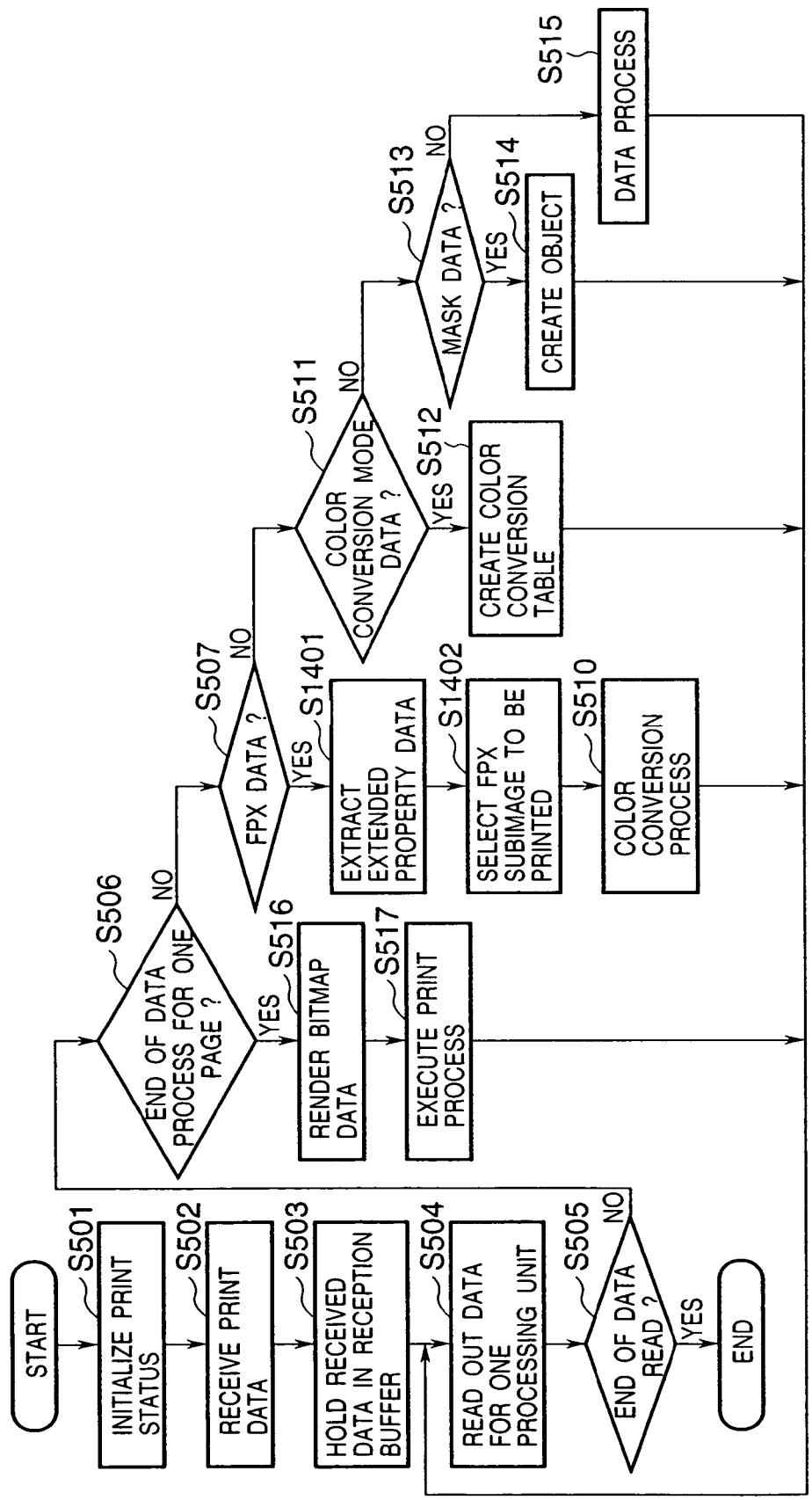
FIG. 14 is a flow chart showing the operation of the printer controller in the fourth embodiment.

Referring to FIG. 14, if it is determined in step S507 that the print data is FPX data, copyright data is extracted from extended property information (step S1401), and the subimage selection unit 1302 selects the resolution of an FPX subimage to be printed on the basis of the extracted information (step S1402). The color conversion unit 207 converts the FPX data selected in step S1402 into CMYK data (step S510), and the flow returns to step S504.

The operation of the subimage selection unit 1302 in the fourth embodiment will be described in detail below with reference to the flow chart shown in FIG. 15. The flow chart in FIG. 15 shows details of steps S1401 and 1402 shown in FIG. 14.

Figure 15:
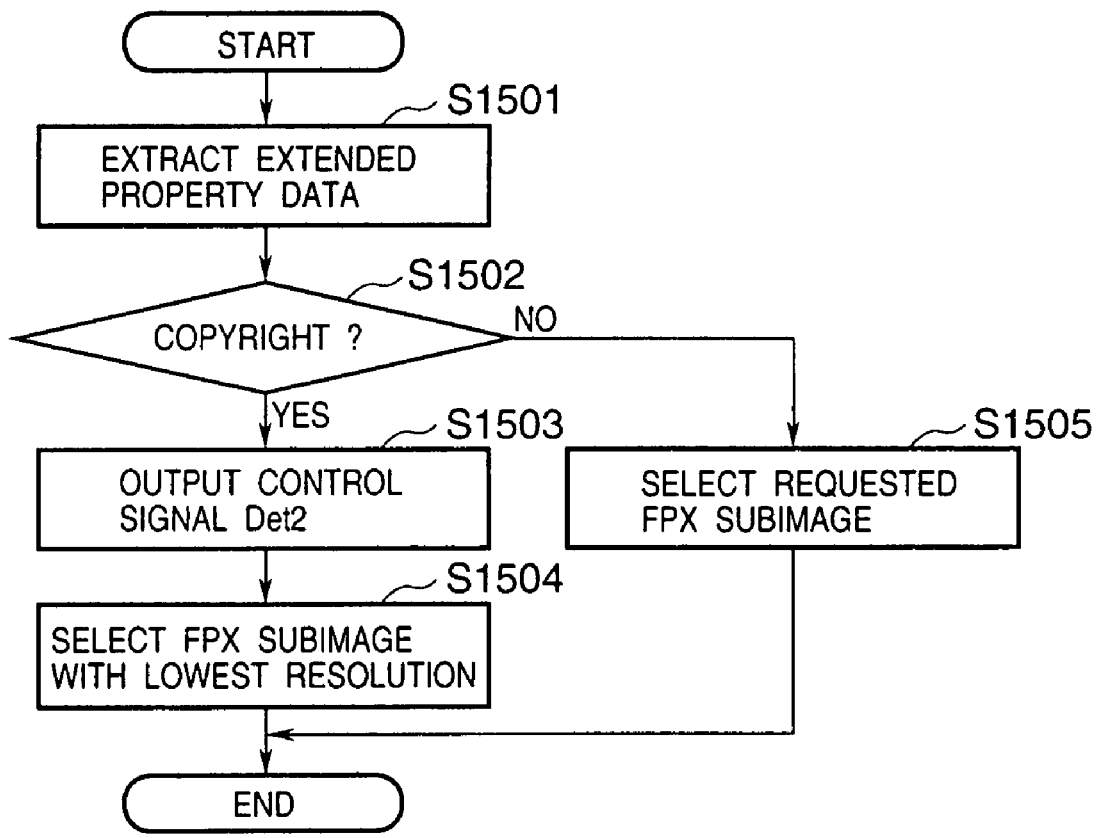
FIG. 15 is a flow chart showing the operation of a subimage selection unit in the fourth embodiment.

Referring to FIG. 15, copyright information stored in extended property information of the FPX data is acquired in step S1501, and it is checked if the FPX data to be printed is an image having a copyright (step S1502). If YES in step S1502, the determination unit 1301 outputs the control signal Det2 to the subimage selection unit 1302 (step S1503). Then, an FPX subimage of 75 dpi as the lowest resolution is read out (step S1504), thus ending the process.

On the other hand, if it is determined in step S1502 that the FPX data to be printed does not have any copyright, an FPX subimage of 600 dpi as the highest resolution is read out (step S1505), thus ending the process.

As described above, according to the fourth embodiment, when the received FPX data has a copyright, an FPX data with the lowest resolution is forcibly output, thus inhibiting other subimages having the highest resolution and the like from being output. That is, since image data having a copyright can only be output as deteriorated data, it can be prevented from being output without permission by an ill-disposed person.

Fifth Embodiment

The fifth embodiment of the present invention will be described below. The fourth embodiment has explained a process for selecting and outputting an FPX subimage with the lowest resolution (75 dpi) when the FPX data to be printed has a copyright. As a characteristic feature of the fifth embodiment, the selected FPX subimage with the lowest resolution is enlarged to an image size as that of the highest resolution (600 dpi), and the enlarged image is output. Since the apparatus arrangement in the fifth embodiment is substantially the same as that in the first embodiment described above, the same reference numerals denotes the same parts as those in the first embodiment, and a detailed description thereof will be omitted.

Figure 16:
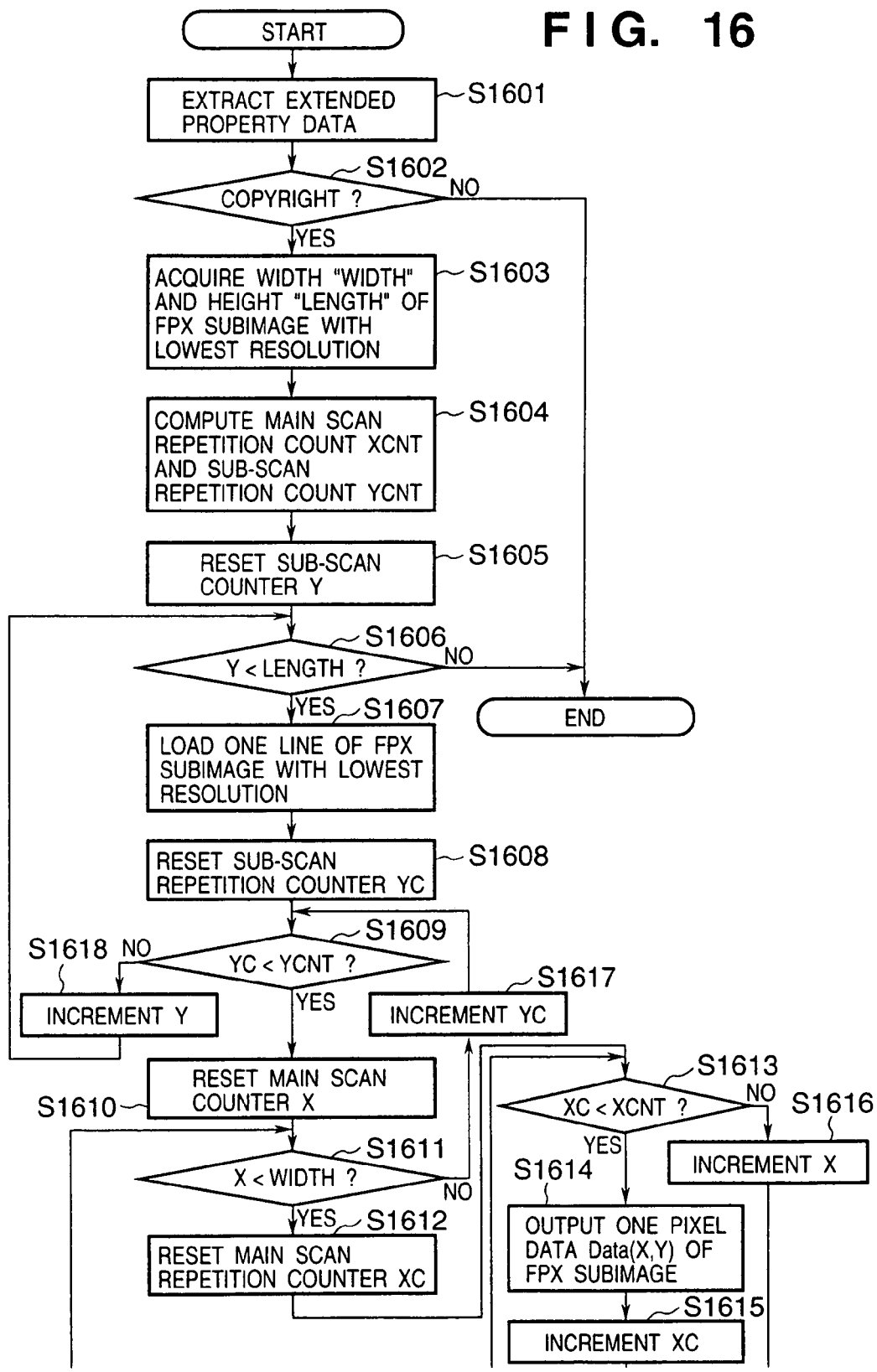
FIG. 16 is a flow chart showing the operation of a subimage selection unit according to the fifth embodiment of the present invention.

FIG. 16 is a flow chart showing the operation of the controller 200 in the fifth embodiment. Referring to FIG. 16, copyright information stored in extended property information of the FPX data is acquired in step S1601, and it is checked if the FPX data to be printed is an image having a copyright (step S1602). If YES in step S1602, a width WIDTH and height LENGTH of the subimage are acquired from FPX subimage header information of the lowest resolution (75 dpi) (step S1603), and a main scan repetition count XCNT and sub-scan repetition count YCNT are computed (step S1604) by:

$$XCNT = YCNT = 600 \text{ dpi}/75 \text{ dpi} = 4$$

A sub-scan counter Y is reset (step S1605), and the sub-scan counter Y is compared with the height LENGTH of the FPX subimage (step S1606). If the process is not completed to the height of the FPX subimage, data for one line of the FPX subimage of the lowest resolution (75 dpi) is stored in a line memory (step S1607). A sub-scan repetition counter YC is reset (step S1608), and the sub-scan repetition counter YC is compared with the sub-scan repetition count YCNT (step S1609). If YC<YCNT, a main scan counter X is reset (step S1610).

Then, the main scan counter X is compared with the width WIDTH of the FPX subimage (step S1611). If the process is not completed to the width of the FPX subimage, a main scan repetition counter XC is reset (step S1612), and the main scan repetition counter XC is compared with the main scan repetition count XCNT (step S1613). If XC<XCNT, one pixel data DATA(X, Y) of the FPX subimage is output (step S1614), the main scan repetition counter XC is incremented (step S1615), and the flow returns to step S1613. If it is determined in step S1613 that the main scan repetition counter XC is larger than the main scan repetition count XCNT, the main scan counter X is incremented (step S1616), and the flow returns to step S1611.

If it is determined in step S1611 that the main scan counter X is larger than the width WIDTH of the FPX subimage, the sub-scan repetition counter YC is incremented (step S1617), and the flow returns to step S1609. If it is determined in step S1609 that the sub-scan repetition counter YC is larger than the sub-scan repetition count YCNT, it is determined that the process for one line of the FPX subimage is complete, the sub-scan counter Y is incremented (step S1618), and the flow returns to step S1606.

If it is determined in step S1606 that the sub-scan counter Y is larger than the height LENGTH of the FPX subimage, it is determined that all data processes of the FPX subimage are complete, thus ending the process. On the other hand, if it is determined in step S1602 that the FPX data to be printed does not have any copyright, the flow ends without any process.

As described above, according to the fifth embodiment, when the received FPX data has a copyright, the FPX subimage with the lowest resolution is output in the enlarged scale. That is, since only the deteriorated output is available for the copyrighted image data, such image data can be prevented from being output without permission by an ill-disposed person.

Sixth Embodiment

The sixth embodiment of the present invention will be described below. In the first to third embodiments described above, FPX data to be printed is used as original image data, and noise is superposed on that original data. As a characteristic feature of the sixth embodiment, noise is superposed in advance on input FPX data. When extended property information of FPX data has copyright information and also print permission information, a noise removal filter removes the superposed noise, and the noise-removed image is printed out. Note that the same reference numerals in the sixth embodiment denote substantially the same parts as those in the first embodiment described above, and a detailed description thereof will be omitted.

Figure 17:
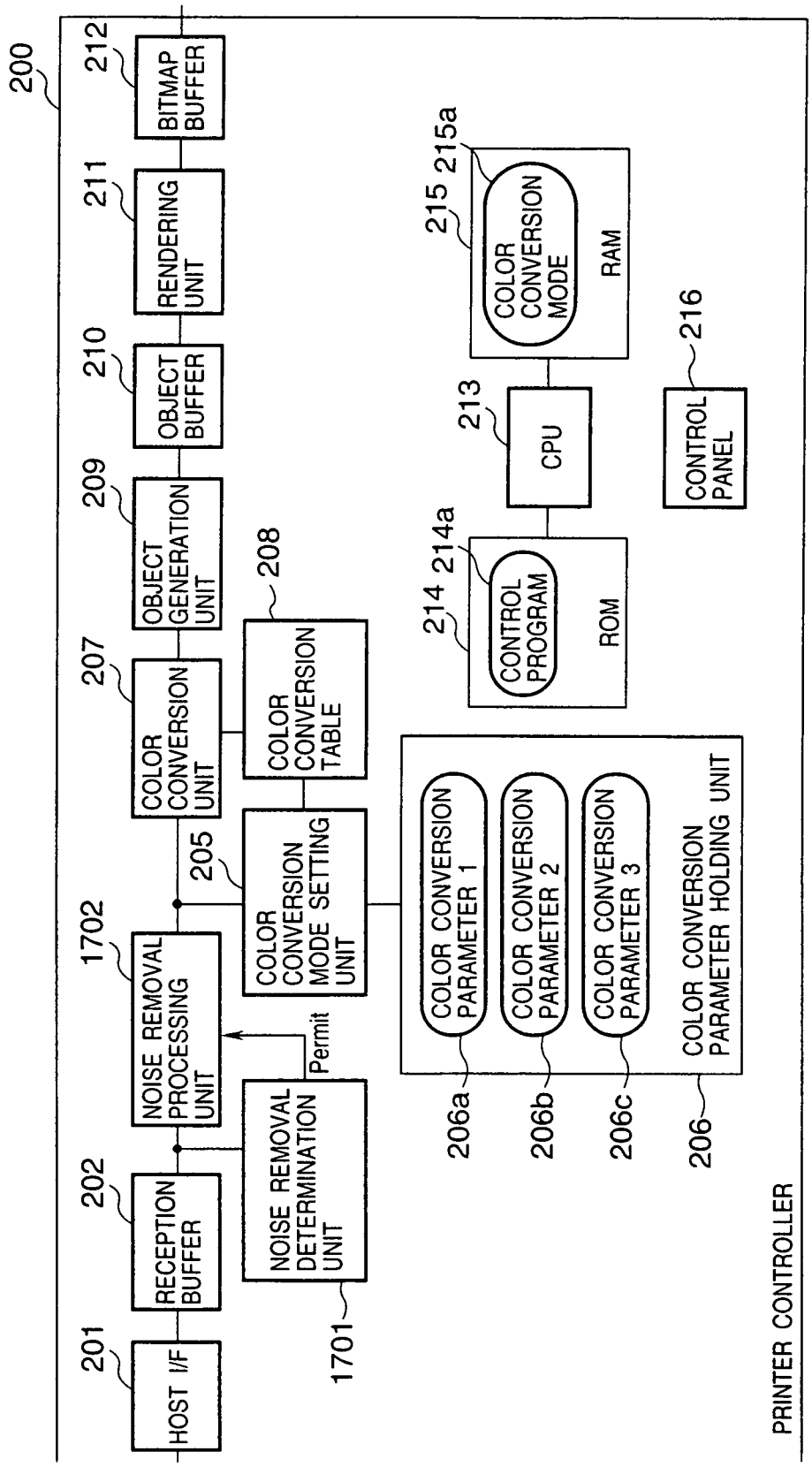
FIG. 17 is a detailed block diagram showing the arrangement of a printer controller according to the sixth embodiment of the present invention.

FIG. 17 is a block diagram showing an example of the detailed arrangement of the controller 200 in the sixth embodiment. Referring to FIG. 17, reference numeral 1701 denotes a noise removal determination unit, which acquires copyright information and print permission information from extended property information of FPX data input from the host computer 502, determines whether or not noise is removed from an image of the FPX data, and outputs a print permission control signal Permit. Reference numeral 1702 denotes a noise removal processing unit, which removes noise from the FPX data on the basis of the print permission control signal Permit output from the noise removal determination unit 1701.

The operation of the controller 200 in the sixth embodiment will be described in detail below with reference to the flow chart in FIG. 18. Note that the same step numbers in the flow chart in FIG. 18 denote the same processes as those in FIG. 5 in the first embodiment, and a detailed description thereof will be omitted. The control program that implements the processes shown in the flow chart in FIG. 18 is also stored in the ROM 214, and is executed by the CPU 213.

Figure 18:
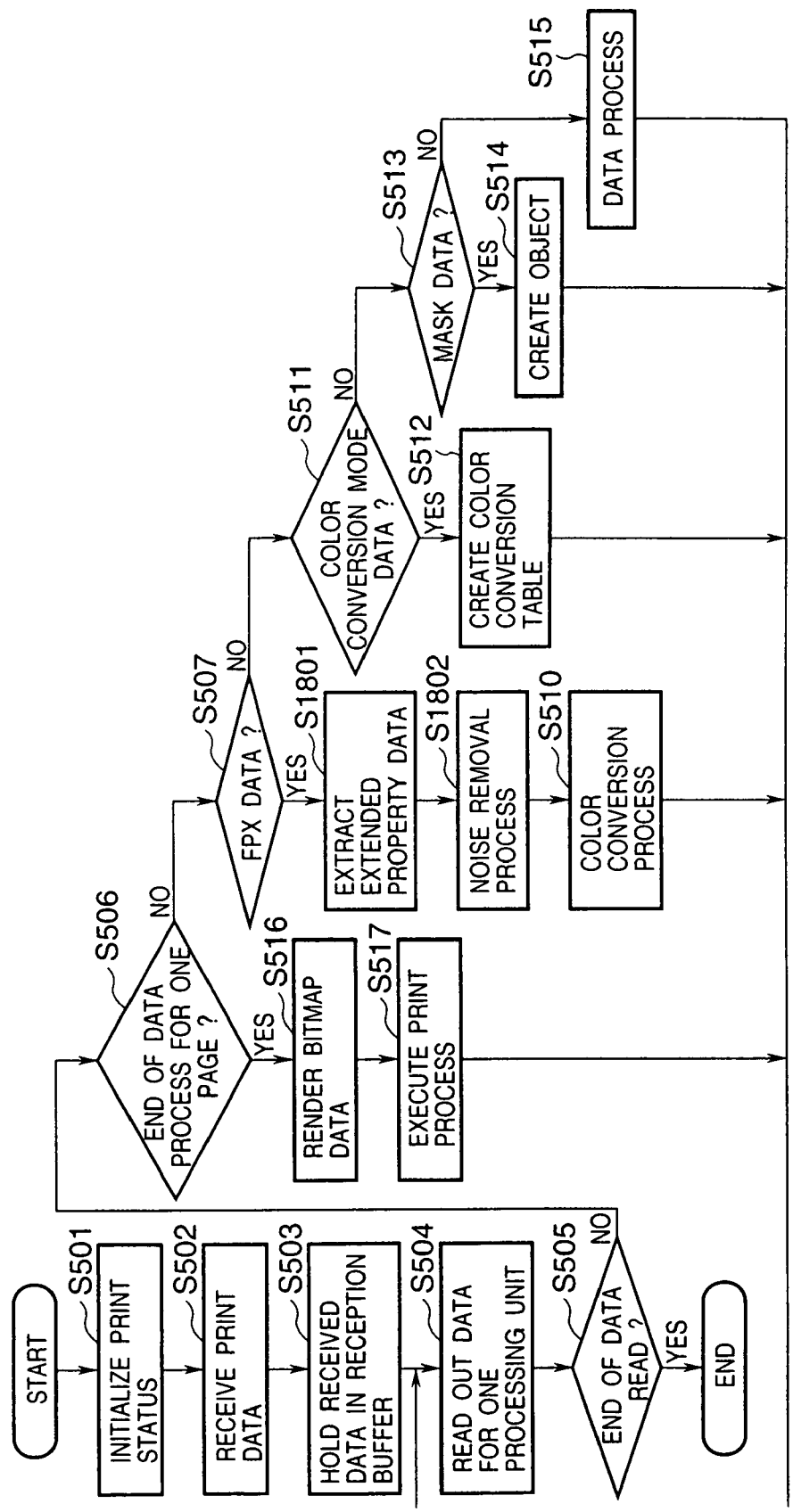
FIG. 18 is a flow chart showing the operation of the printer controller in the sixth embodiment.

Referring to FIG. 18, if it is determined in step S507 that the print data is FPX data, copyright data is extracted from extended property information (step S1801), and the noise removal processing unit 1702 executes a noise removal process on the basis of the extracted information (step S1802). The color conversion unit 207 converts the FPX data that has undergone the noise removal process in step S1802 into CMYK data (step S510), and the flow then returns to step S504.

Figure 19:
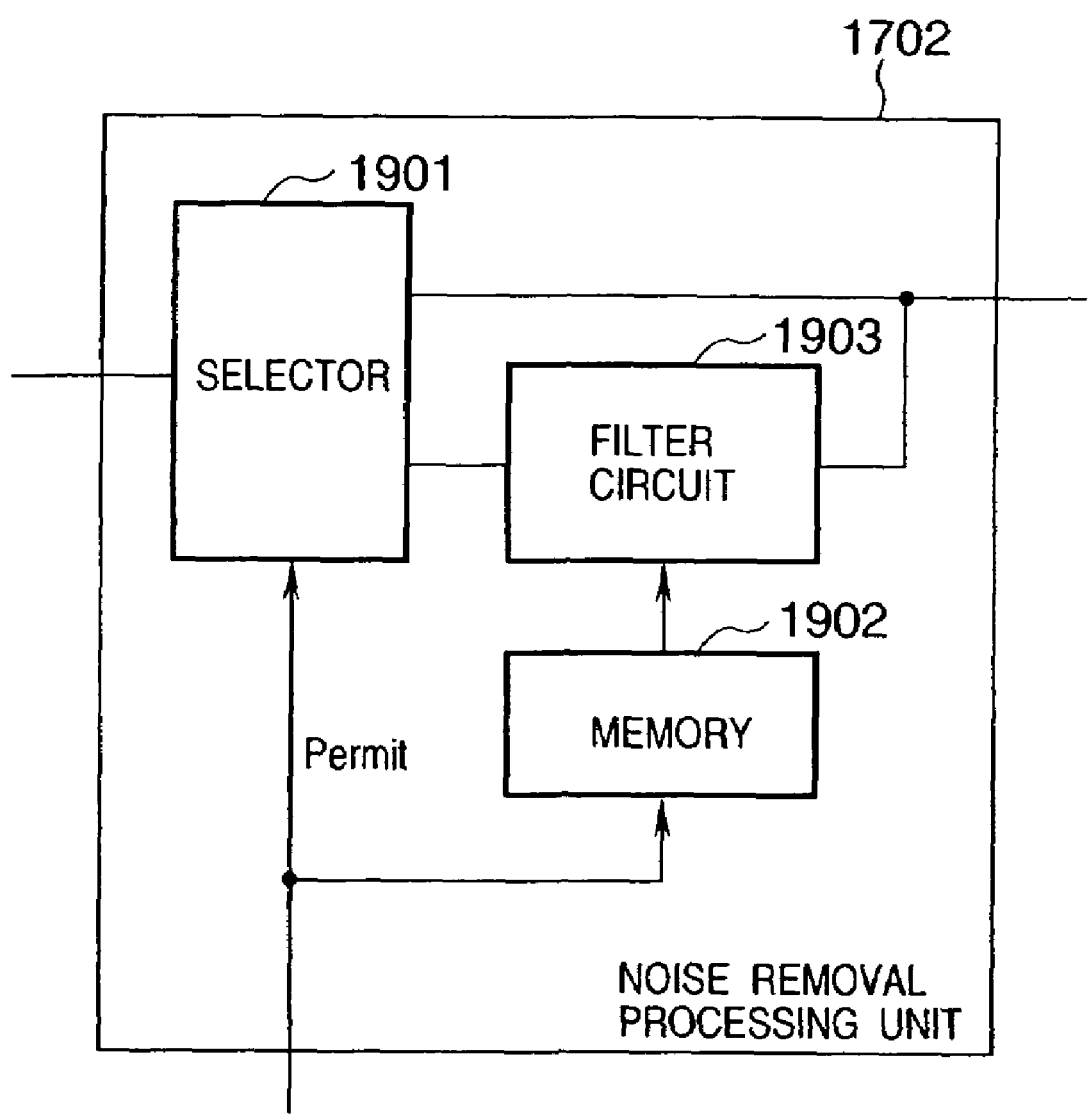
FIG. 19 is a detailed block diagram showing the arrangement of a noise removal processing unit in the sixth embodiment.

FIG. 19 is a block diagram showing an example of the detailed arrangement of the noise removal processing unit 1702. The operation of the unit 1702 will be described in detail below with reference to FIG. 19.

Referring to FIG. 19, reference numeral 1901 denotes a selector, which is controlled by the print permission control signal Permit from the noise removal determination unit 1701, and is switched to input an FPX subimage to a filter circuit 1903 when the print permission control signal Permit is true. Reference numeral 1902 denotes a memory which pre-stores various filter coefficients for removing noise of an FPX subimage. Reference numeral 1903 denotes a filter circuit which executes a filter process of an FPX subimage using the filter coefficients read out from the memory 1902 in accordance with the print permission control signal Permit.

Figure 20:
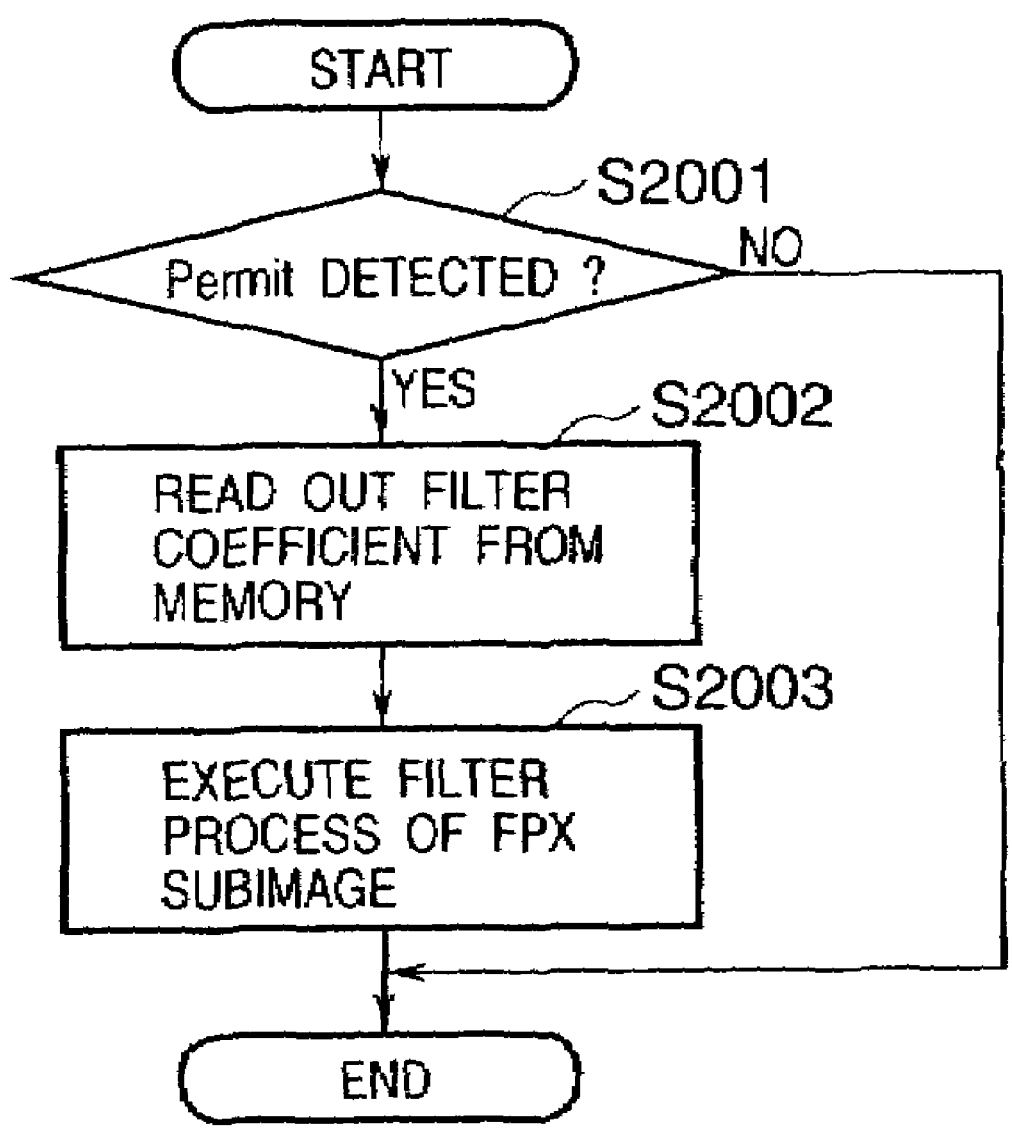
FIG. 20 is a flow chart showing the operation of the noise removal processing unit in the sixth embodiment.

The operation of the noise removal processing unit 1702 in the sixth embodiment will be described in detail below with reference to the flow chart in FIG. 20. The flow chart in FIG. 20 shows details of steps S1801 and S1802 shown in FIG. 18.

It is checked in step S2001 if the print permission control signal Permit from the noise removal determination unit 1701 is true. If YES in step S2001, it is determined that the subimage to be printed has a copyright, and is data, the print process of which is permitted, and the pre-stored filter coefficients are read out from the memory 1902 (step S2002). The filter circuit 1903 executes a filter process for the subimage using the filter coefficients read out in step S2002 (step S2003), and outputs the filtered image as print data, thus ending the process. On the other hand, if it is determined in step S2001 that the print permission control signal Permit is false, the flow ends without any process.

As described above, according to the sixth embodiment, noise is superposed in advance on FPX data, and only when the received FPX data has a copyright and its print process is permitted, the FPX data from which noise is removed can be output. Hence, image data having a copyright can be prevented from being printed out without permission by an ill-disposed person.

In the sixth embodiment, the noise removal process is implemented by executing the filter process based on the filter coefficients read out from the memory. However, the present invention is not limited to such specific example. For example, decoding information such as filter coefficients or the like may be recorded in extended property information of FPX data, and image data may be decoded by reading out that information.

Seventh Embodiment

The seventh embodiment of the present invention will be described below. The seventh embodiment is characterized in that the tone characteristics of FPX data are controlled by a halftone process using dithering. Note that the same reference numerals in the seventh embodiment denote substantially the same parts as those in the first embodiment mentioned above, and a detailed description thereof will be omitted.

Figure 21:
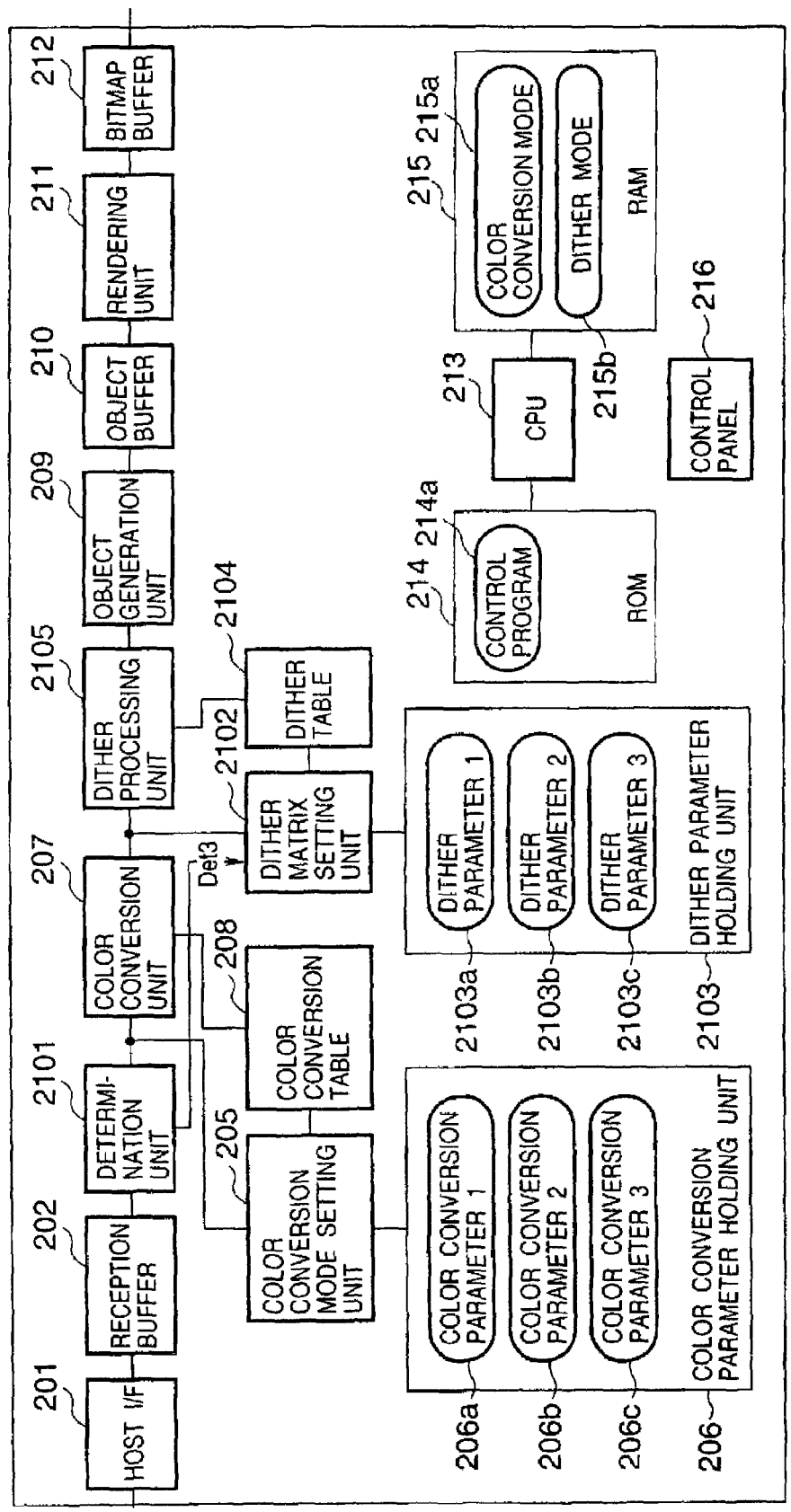
FIG. 21 is a detailed block diagram showing the arrangement of a printer controller according to the seventh embodiment of the present invention.

FIG. 21 is a block diagram showing an example of the detailed arrangement of the controller 200 in the seventh embodiment. Referring to FIG. 21, reference numeral 2101 denotes a determination unit, which acquires copyright information from extended property information of FPX data input from the host computer 502, and determines whether or not a tone-down process is executed for the FPX data. Note that the tone-down process in the seventh embodiment will be described in detail later.

Reference numeral 2102 denotes a dither matrix setting unit, which selects, from a dither parameter holding unit 2103, dither parameters corresponding to one of dither modes such as 4-bit halftone dither, 2-bit halftone dither, 1-bit halftone dither, and the like input from the host computer 502, or dither parameters corresponding to a tone-down command signal Det3 input from the determination unit 2101, and creates and stores a dither table 2104.

Reference numeral 2103 denotes a dither parameter holding unit, which holds dither parameters 1 (2103a), dither parameters 2 (2103b), and dither parameters 3 (2103c) corresponding to the dither modes. Reference numeral 2105 denotes a dither processing unit, which converts the CMYK data converted by the color conversion unit 207 to data having gray levels the number of which corresponds to the dither mode by comparison operations with reference to the dither table 2104.

Note that the RAM 215 of the seventh embodiment stores dither modes 215b in addition to the color conversion modes 215a.

The operation of the controller 200 in the seventh embodiment will be described in detail below with reference to the flow chart in FIG. 22. Note that the same step numbers in the flow chart shown in FIG. 22 denote the same processes as those in FIG. 5 in the first embodiment, and a detailed description thereof will be omitted. The control program that implements the processes shown in the flow chart in FIG. 22 is also stored in the ROM 214, and is executed by the CPU 213.

Figure 22:
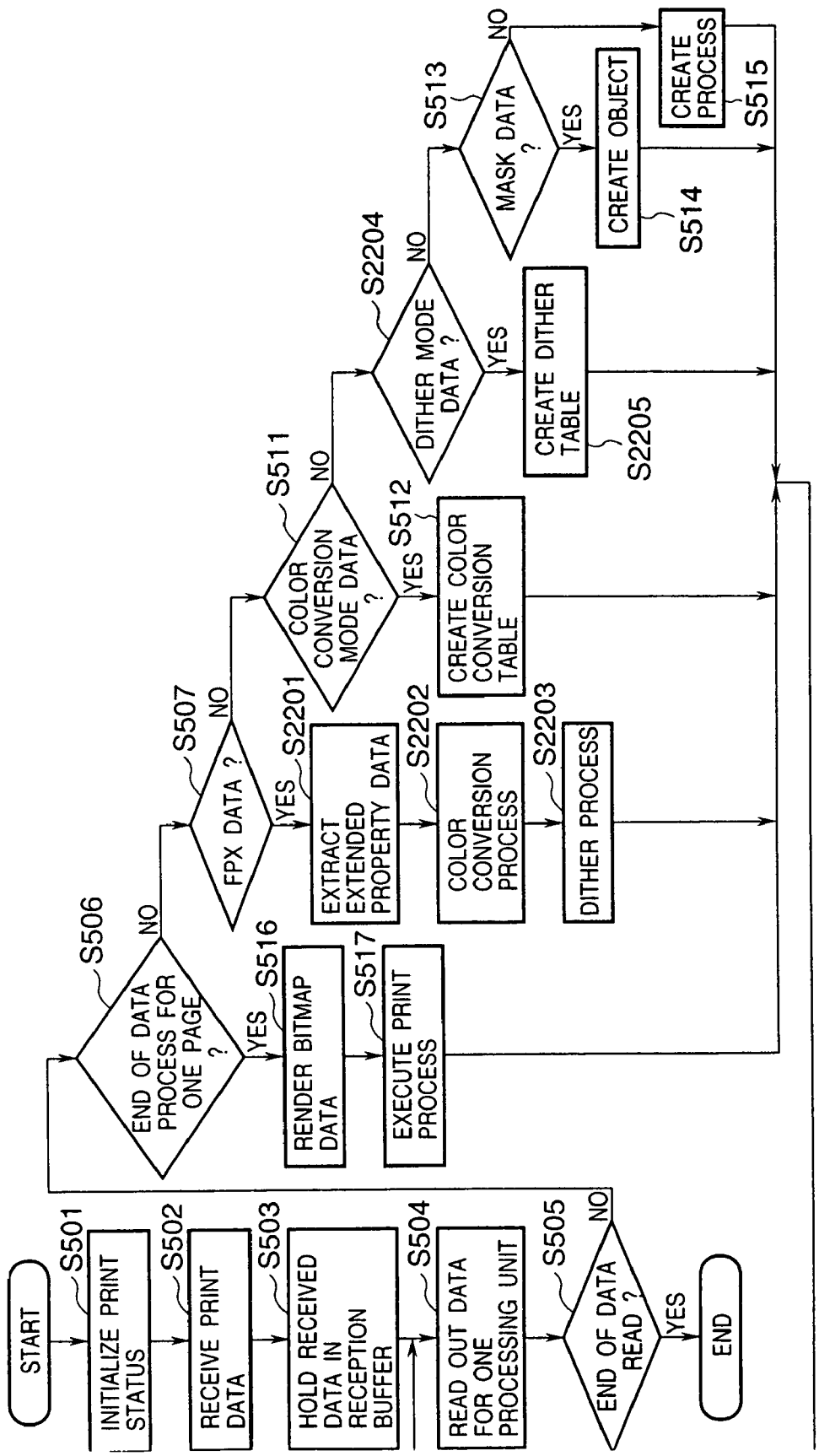
FIG. 22 is a flow chart showing the operation of the noise removal processing unit in the seventh embodiment.

Referring to FIG. 22, if it is determined in step S507 that the print data is FPX data, copyright data is extracted from extended property information (step S2201). The color conversion unit 207 converts RGB FPX color data into CMYK color data by interpolation with reference to the color conversion table 208 (step S2202). The dither processing unit 2105 converts the CMYK color data into dither-processed color data by comparison operations with the dither table 2104 (step S2203), and the flow then returns to step S504.

On the other hand, if it is determined in step S511 that the print data is not color conversion mode data, it is checked if the print data is dither mode data (step S2204). If YES in step S2204, the dither matrix setting unit 2102 creates a dither table based on dither parameters corresponding to the dither mode (step S2205), and the flow returns to step S504.

The operation of the dither processing unit 2105 in the seventh embodiment will be explained in detail below with reference to the flow chart shown in FIG. 23. The flow chart in FIG. 23 shows details of step S2203 shown in FIG. 22.

Figure 23:
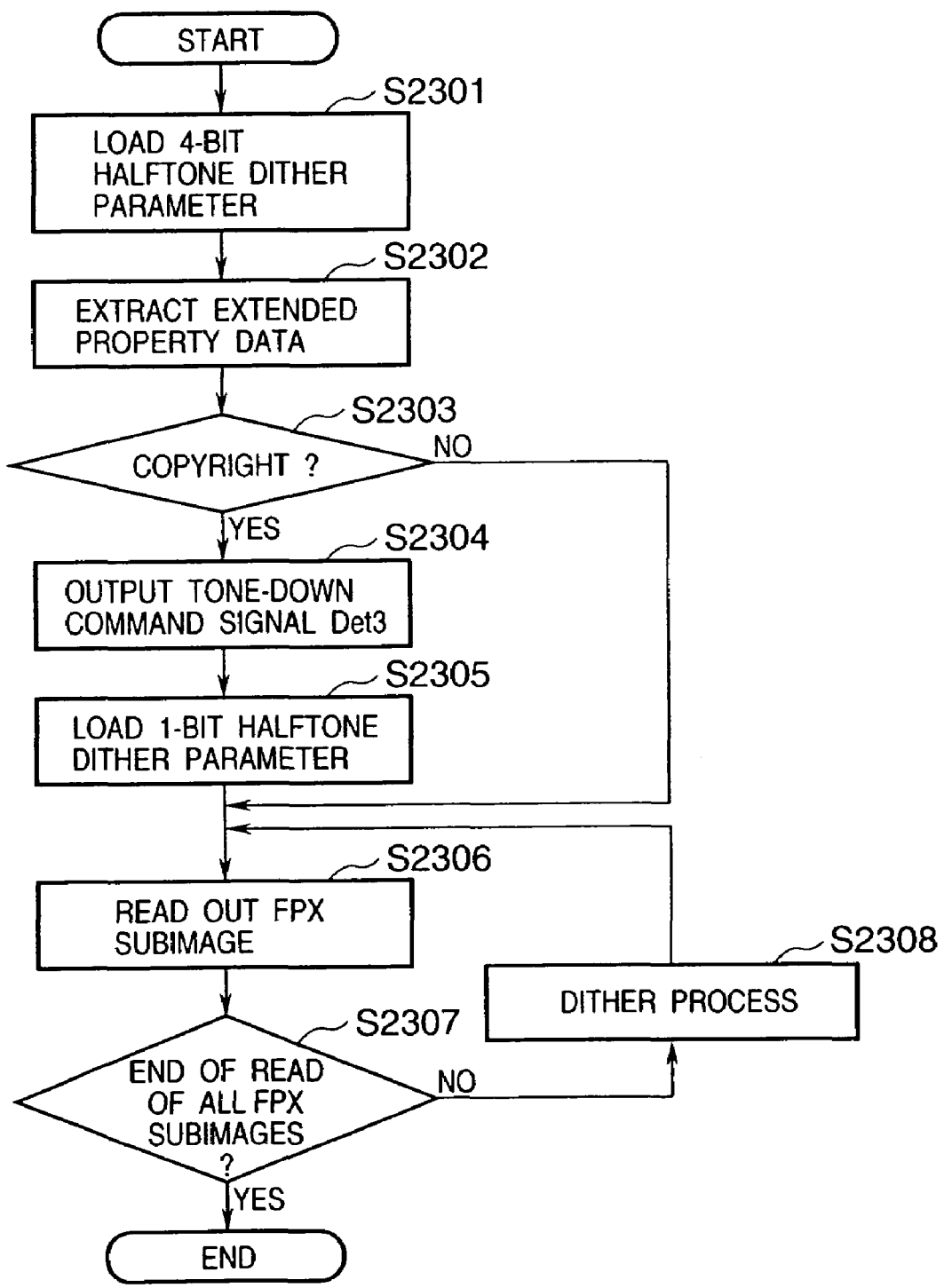
FIG. 23 is a flow chart showing a dither process in the seventh embodiment.

Referring to FIG. 23, dither parameters for 4-bit halftone dither are loaded from the dither parameter holding unit 2103 in step S2301. Then, copyright information stored in extended property information of the FPX data is acquired (step S2302) to check if the FPX data to be printed is an image having a copyright (step S2303). If YES in step S2303, the determination unit 2101 outputs the tone-down command signal Det3 to the dither matrix setting unit 2102 (step S2304), and dither parameters for 1-bit halftone dither are loaded from the dither parameter holding unit 2103 (step S2305).

On the other hand, if it is determined in step S2303 that the FPX data to be printed does not have any copyright, the control skips the processes in steps S2304 and S2305.

Subsequently, an FPX subimage is read out (step S2306), and it is checked if all FPX subimages have been read out (step S2307). If NO in step S2307, the dither matrix setting unit 2102 executes a dither process of the readout FPX subimage using the dither table 2104 set based on the dither parameters for 4- or 1-bit halftone dither (step S2308), and the flow returns to step S2306.

On the other hand, if it is determined in step S2306 that all FPX subimages have been read out, the dither process of the seventh embodiment ends.

Figure 24:
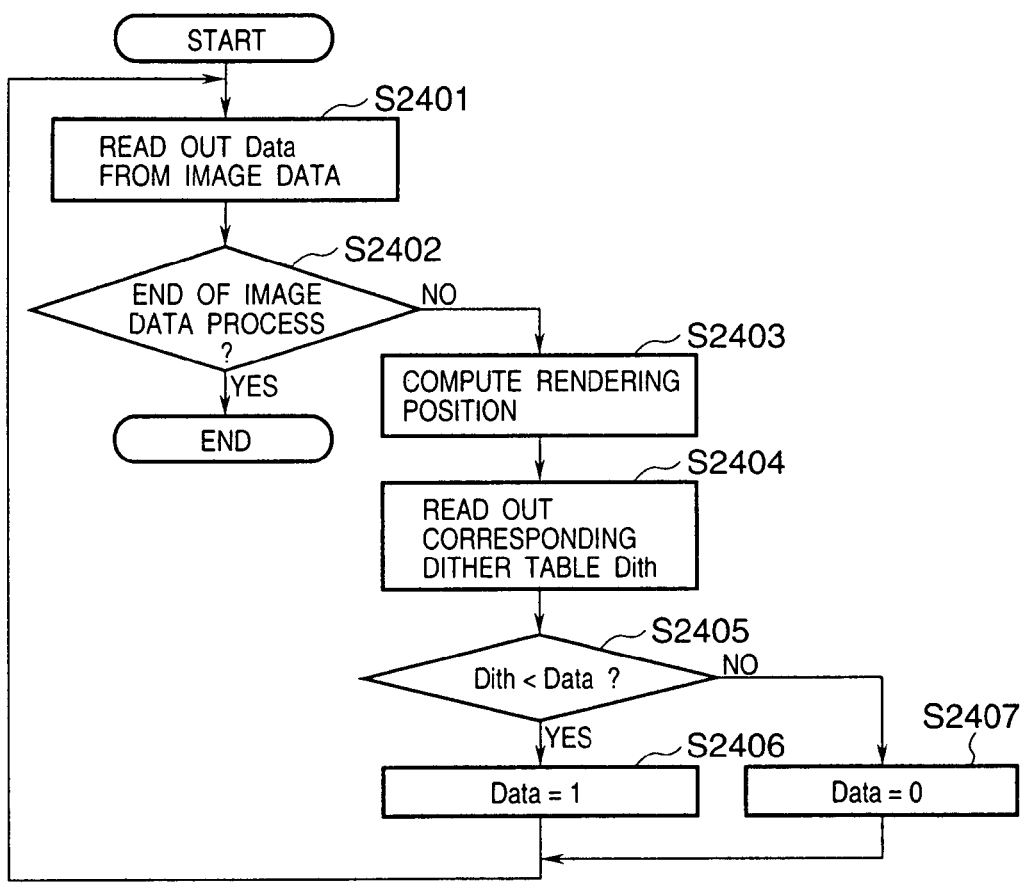
FIG. 24 is a flow chart showing the dither process in the seventh embodiment.

The dither process will be explained in detail below with reference to FIGS. 24 and 25. The dither process of the seventh embodiment uses a comparator and makes tone outputs corresponding to the dither mode. FIG. 24 is a flow chart showing an example of the dither process, i.e., shows details of step S2308 shown in FIG. 23.

Referring to FIG. 24, one data Data is read out from FPX image data (step S2401), and it is checked if all data have been extracted (step S2402). If NO in step S2402, the rendering position of the readout FPX image data is computed (step S2403), and dither table data Dith corresponding to the rendering position is read out (step S2404).

The FPX image data Data read out in step S2401 is compared with the value of the dither table data Dith read out in step S2404 (step S2405), and if Data>Dith, 1 (ON) is set at the rendering position of Data (step S2406), and the flow returns to step S2401. On the other hand, if Data<Dith in step S2405, 0 (OFF) is set at the rendering position of Data (step S2407), and the flow returns to step S2401. If it is determined in step S2402 that all FPX image data have been processed, the process ends.

Figure 25:
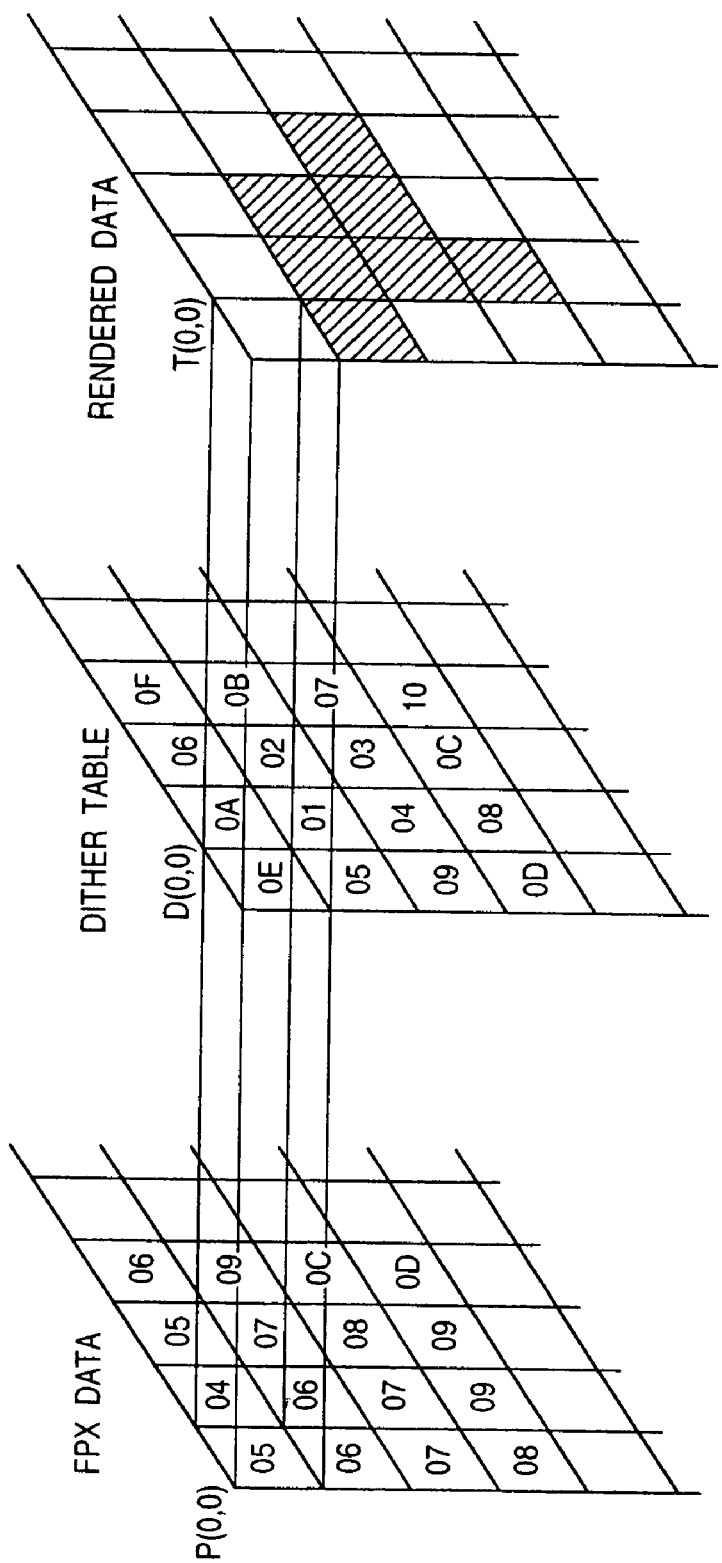
FIG. 25 illustrates the dither process in the seventh embodiment.

FIG. 25 is a view for explaining the dither process shown in FIG. 24 and especially shows a dither process using a 4-bit halftone dither table. Referring to FIG. 25, P(x, y) is each pixel of an FPX image, D(x, y) is each threshold value of the dither table, and T(x, y) is each pixel of the FPX image after the dither process. As can be seen from FIG. 25, dither process results T(1, 0), T(1, 1), T(1, 2), T(2, 1), T(2, 2), T(2, 3), and T(3, 1) are data to be actually rendered. Since the unitary period of the dither table is 4 pixels×4 pixels, a data value T(x, y) at each rendering position (x, y) is given by:

$$T(x, y) = 1 \text{ (when } P(x, y) > D(x \text{ \%4}, y \text{ \%4})\text{)}$$
$$0 \text{ (when } P(x, y) \leq D(x \text{ \%4}, y \text{ \%4})\text{)}$$

(where x %4 and y %4 are respectively the remainders obtained upon dividing x and y by 4)

Note that pseudo 16 gray levels are expressed using the 4-bit halftone dither table in FIG. 25. As for a 1-bit halftone dither table, since its unit period is one pixel, all pixels have identical threshold values. Hence, the number of pseudo gray levels that can be expressed is 2, and the number of pseudo gray levels that can be expressed is smaller than that of the 4-bit halftone dither process.

As described above, according to the seventh embodiment, when the received FPX data has a copyright, it undergoes a lowest 1-bit halftone dither process, thus reducing the number of gray levels of the output image. Hence, image data having a copyright can be prevented from being printed out without permission by an ill-disposed person.

When copyrighted image data is to be printed out after permission of a copyright holder is granted, the copyright holder can append information indicating print permission to copyright information stored in the extended property information of the FPX data. If the print permission information is appended, the image data to be printed can be processed in the dither process of this embodiment in the same manner as image data without any copyright, i.e., can undergo a 4-bit halftone dither process.

Eighth Embodiment

The eighth embodiment of the present invention will be described below. Note that the same reference numerals in the eighth embodiment denote substantially the same parts as those in the first embodiment mentioned above, and a detailed description thereof will be omitted.

In the seventh embodiment mentioned above, when the FPX data to be printed is image data having a copyright, it undergoes a dither process using dither parameters corresponding to the smallest number of gray levels. The eighth embodiment is characterized in that a halftone process is implemented by an error diffusion process in place of the dither process.

Figure 26:
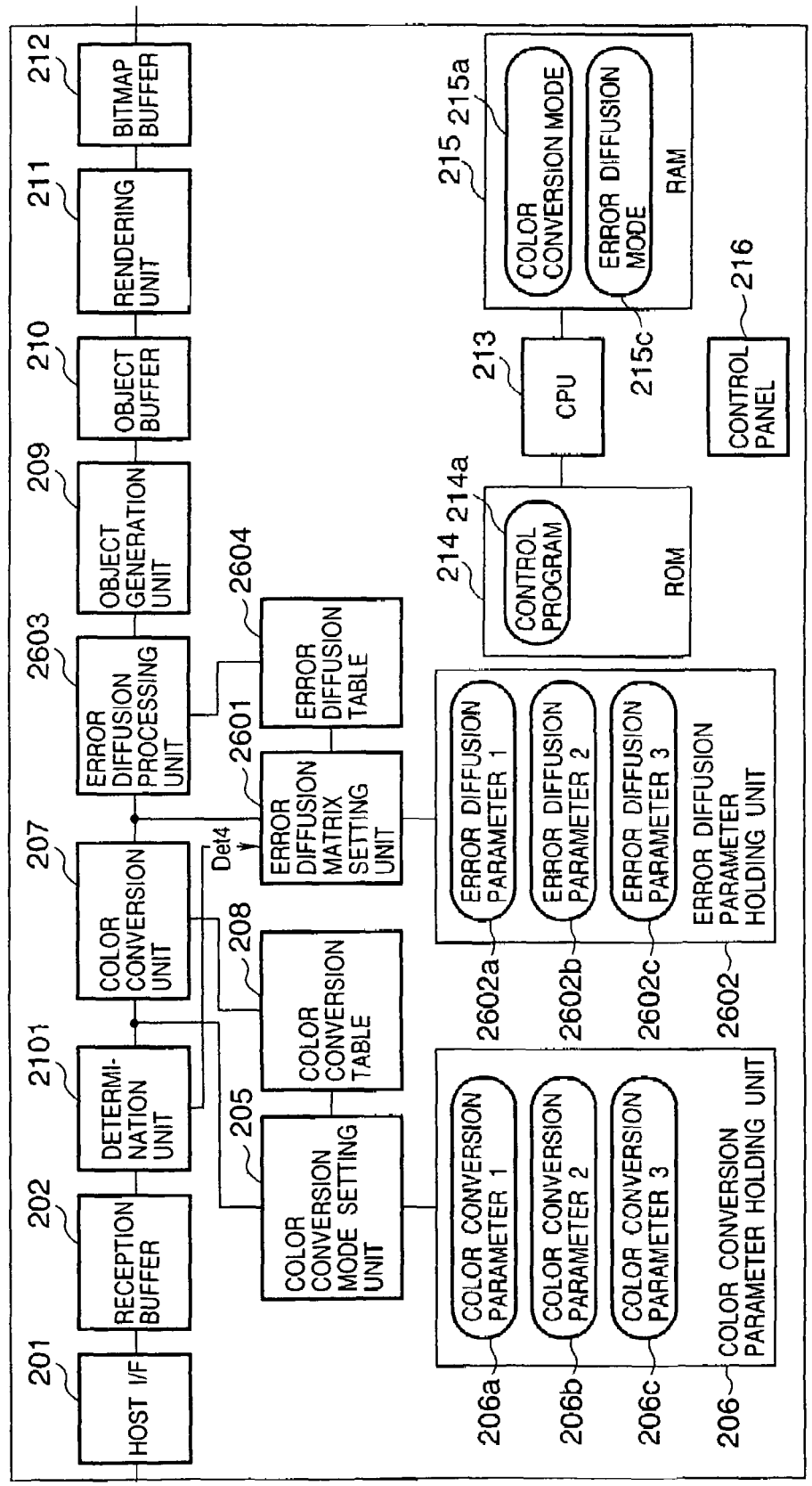
FIG. 26 is a detailed block diagram showing the arrangement of a printer controller according to the eighth embodiment of the present invention.

FIG. 26 is a block diagram showing the detailed arrangement of the controller 200 in the eighth embodiment.

Referring to FIG. 26, reference numeral 2601 denotes an error diffusion matrix setting unit, which selects, from an error diffusion parameter holding unit 2602, error diffusion parameters corresponding to one of error diffusion modes such as 4-bit error diffusion, 2-bit error diffusion, 1-bit error diffusion, and the like input from the host computer 502, or error diffusion parameters corresponding to a tone-down command signal Det4 input from the determination unit 2101, and creates and stores an error diffusion table 2604. Note that a tone-down process in the eighth embodiment will be described in detail later.

Reference numeral 2602 denotes an error diffusion parameter holding unit, which holds, e.g., error diffusion parameters 1 (2602*a*), error diffusion parameters 2 (2602*b*), and error diffusion parameters 3 (2602*c*) corresponding to the aforementioned error diffusion modes. Reference numeral 2603 denotes an error diffusion processing unit, which converts CMYK print data converted by the color conversion unit 207 into print information with the number of gray levels corresponding to the error diffusion mode by error diffusion operations with reference to the error diffusion table 2604.

Note that the RAM 215 in the eighth embodiment stores error diffusion modes 215*c* in addition to the color conversion modes 215*a*.

The operation of the controller 200 in the eighth embodiment will be described in detail below with reference to the flow chart in FIG. 27. Note that the same step numbers in the flow chart shown in FIG. 27 denote the same processes as those in FIG. 22 in the seventh embodiment, and a detailed description thereof will be omitted. The control program that implements the processes shown in the flow chart in FIG. 27 is also stored in the ROM 214, and is executed by the CPU 213.

Figure 27:
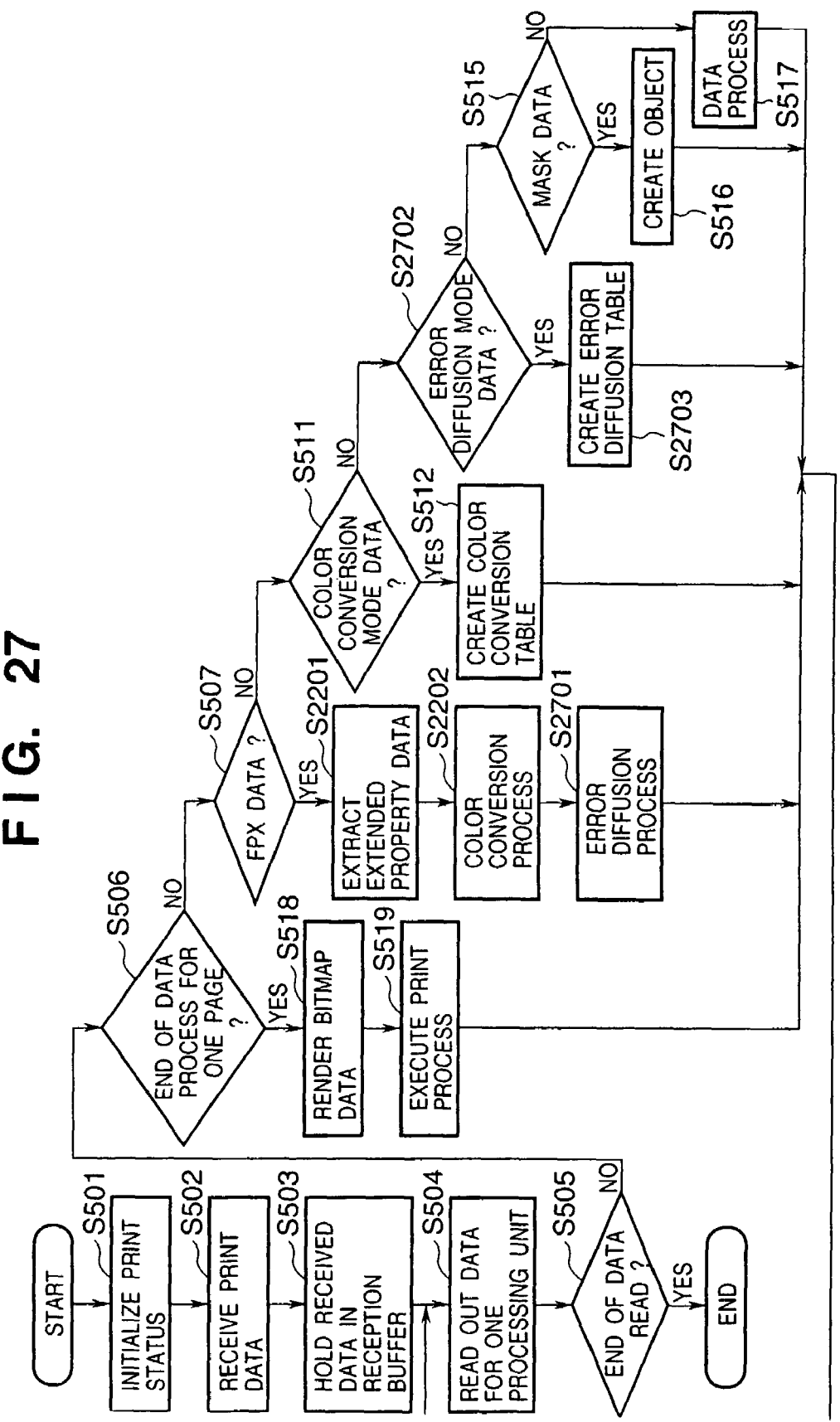
FIG. 27 is a flow chart showing the operation of the printer controller in the eighth embodiment.

Referring to FIG. 27, if it is determined in step S507 that the print data is FPX data, copyright data is extracted from extended property information (step S2201), the color conversion unit 207 converts the input data into CMYK color data (step S2202), and the error diffusion processing unit 2603 then converts the CMYK data into color data that has undergone error diffusion by error diffusion operations using the error diffusion table 2604 (step S2701). The flow then returns to step S504.

On the other hand, if it is determined in step S511 that the print data is not color conversion mode data, it is checked if the print data is error diffusion mode data (step S2702). If YES in step S2702, the error diffusion matrix setting unit 2601 creates an error diffusion table using error diffusion parameters corresponding to the error diffusion mode (step S2604), and the flow returns to step S504.

On the other hand, if it is determined in step S2702 that the print data is not error diffusion mode data, the flow advances to step S515 to check if print data is mask data of, e.g., a character, figure, or the like.

The operation of the error diffusion processing unit 2603 in the eighth embodiment will be described in detail below with reference to the flow chart in FIG. 28. The flow chart in FIG. 28 shows details of steps S2701 shown in FIG. 27.

Figure 28:
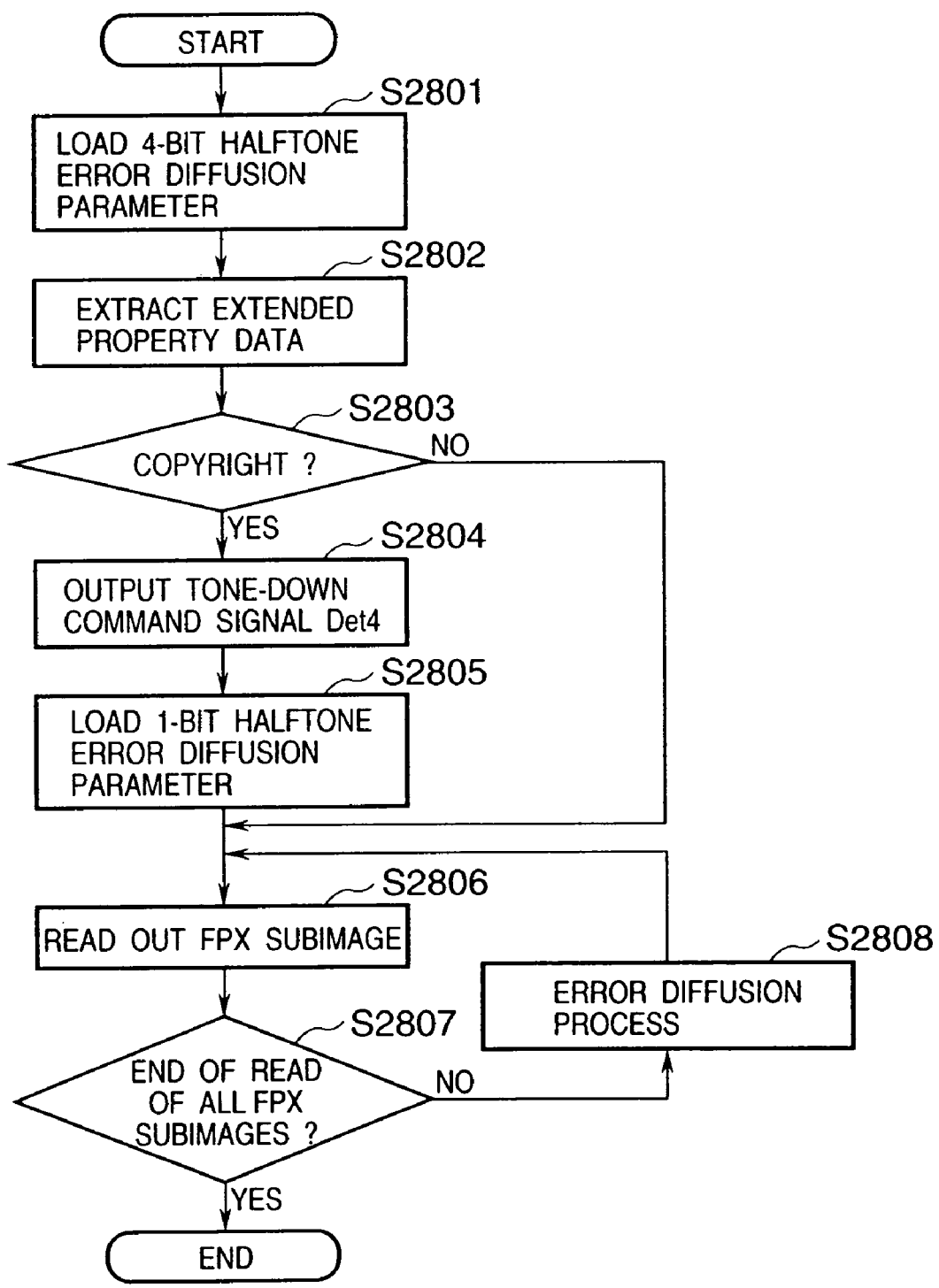
FIG. 28 is a flow chart showing an error diffusion process in the eighth embodiment.

Referring to FIG. 28, 4-bit halftone error diffusion parameters are loaded from the error diffusion parameter holding unit 2602 in step S2801. Then, copyright information stored in extended property information of the FPX data is acquired (step S2802) to check if the FPX data to be printed is an image having a copyright (step S2803). If YES in step S2803, the determination unit 2101 outputs the tone-down command signal Det4 to the error diffusion matrix setting unit 2601 (step S2804) to load 1-bit halftone error diffusion parameters from the error diffusion parameter holding unit 2602 (step S2805).

On the other hand, if it is determined in step S2803 that the FPX data to be printed does not have any copyright, the control skips the processes in steps S2804 and S2805.

Subsequently, an FPX subimage is read out (step S2806), and it is checked if all FPX subimages have been read out (step S2807). If NO in step S2807, the readout FPX subimage undergoes an error diffusion process using the error diffusion table 2604 which is set by the error diffusion matrix setting unit 2601 on the basis of 4- or 1-bit halftone error diffusion parameters (step S2808), and the flow returns to step S2806. On the other hand, if it is determined in step S2806 that all FPX subimages have been read out, the error diffusion process of this embodiment ends.

The error diffusion process will be explained in detail below with reference to FIGS. 29 and 30. The error diffusion process of the eighth embodiment uses a comparator and makes tone outputs corresponding to the error diffusion mode.

Figure 29:
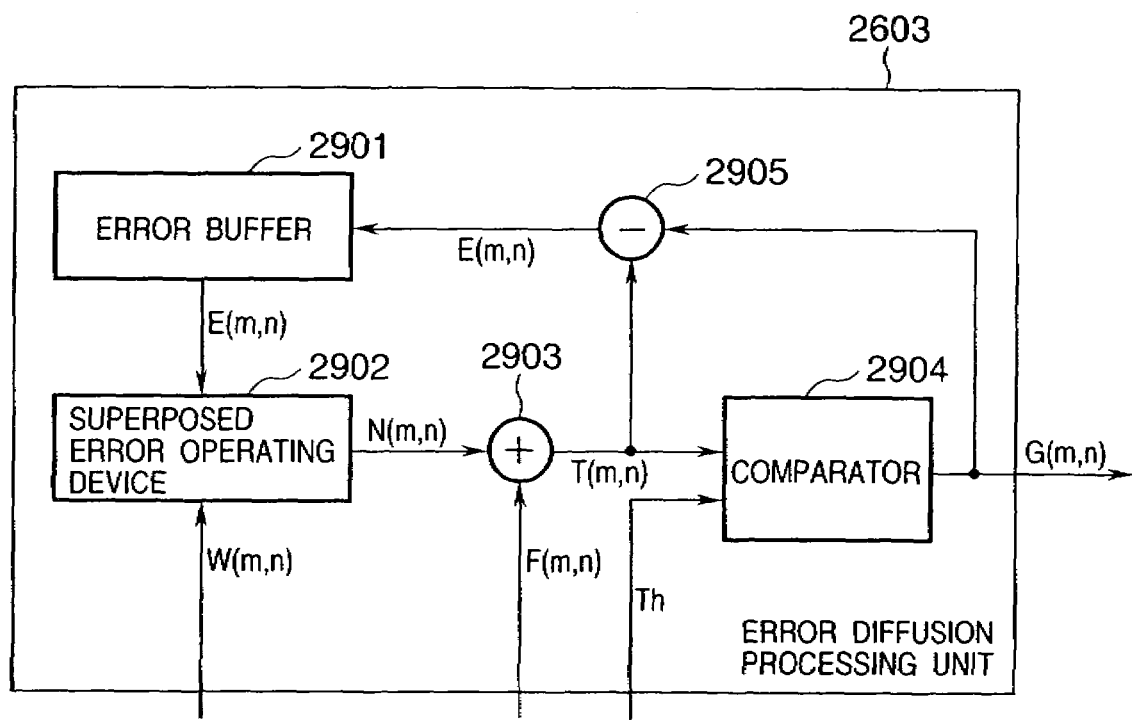
FIG. 29 is a detailed block diagram showing the arrangement of an error diffusion processing unit in the eighth embodiment.

FIG. 29 is a block diagram showing the detailed arrangement of the error diffusion processing unit 2603. Referring to FIG. 29, reference numeral 2901 denotes an error buffer, which comprises a line buffer to accumulate errors produced during processes of respective pixels of the FPX image data. Reference numeral 2902 denotes a superposition error operating device for computing a superposition error by product-sum operation of data W(m, n) of the error diffusion table 2604, and error data E(m, n) held in the error buffer 2901. Reference numeral 2903 denotes an adder for adding the superposition error N(m, n) computed by the superposition error operating device 2902 and a pixel value F(m, n) of interest of FPX image data converted by the color conversion unit 207. Reference numeral 2904 denotes a comparator for comparing value T(m, n) output from the adder 2903 with a threshold value Th output from the error diffusion table. Reference numeral 2905 denotes a subtractor for computing an error E(m, n) with respect to the pixel of interest by subtracting an output value G(m, n) of the comparator 2904 from the output value T(m, n) of the adder 2903.

Figure 30:
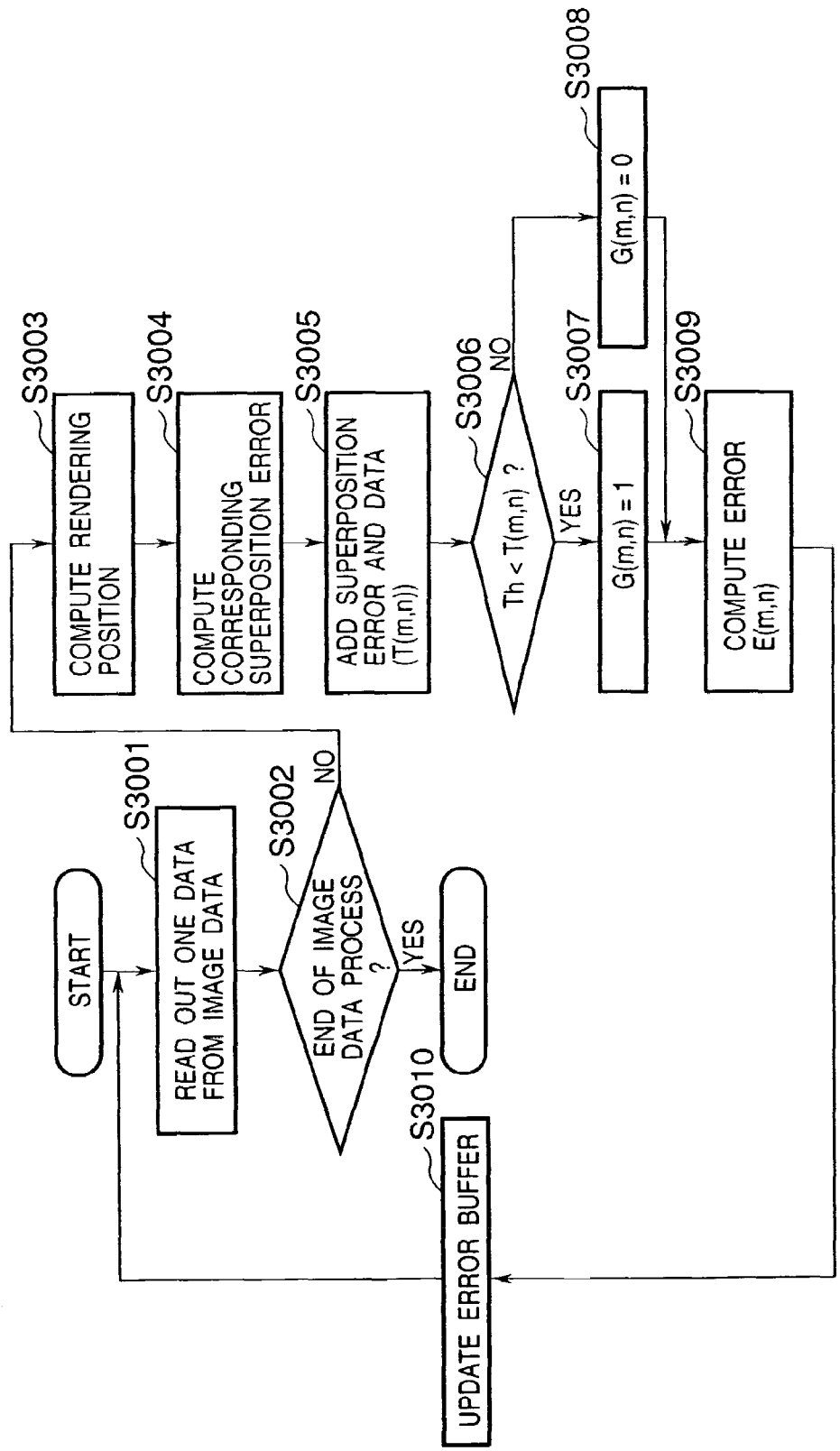
FIG. 30 is a flow chart showing the error diffusion process in the eighth embodiment.

FIG. 30 is a flow chart showing an example of the error diffusion process, and shows details of step S2808 shown in FIG. 28.

Referring to FIG. 30, one data is read out from FPX image data (S3001), and it is checked if all data have been read out (step S3002). If NO in step S3002, the rendering position of the readout FPX image data is computed (step S3003), and the superposition error operating device 2902 computes a superposition error N(m, n) corresponding to the rendering position (step S3004).

Note that the superposition error is given by:

$$N(m, n) = \Sigma\Sigma W(i, j) \times E(m-i, n-j)/\Sigma W(i, j)$$

where (m, n) is the rendering position of the data of interest, E(m, n) is the error data held in the error buffer 2901 in correspondence with the rendering position, i×j is the size of the error diffusion table, and W(m, n) is the error diffusion table data.

T(m, n) is computed by adding the superposition error N(m, n) computed in step S3004 and the image data (step S3005). T(m, n) computed in step S3005 is compared with the value of a threshold value Th read out from the error diffusion table 2604 (step S3006). If T(m, n)>Th, 1 (ON) is set at the rendering position G(m, n) of the FPX image data (step S3007); if T(m, n)≦Th, 0 (OFF) is set at the rendering position G(m, n) of the FPX image data (step S3008). An error E(m, n) is then computed (step S3009) to update the contents of the error buffer 2901 (step S3010), and the flow returns to step S3001. If it is determined in step S3002 that all FPX image data have been processed, the process ends.

Note that in step S3009, the error E(m, n) is computed by:

$$E(m, n) = G(m, n) - T(m, n)$$

As described above, according to the eighth embodiment, when the received FPX data has a copyright, since it undergoes a 1-bit lowest halftone error diffusion process, the number of gray levels of the output image is decreased. Hence, copyrighted image data can be prevented from being printed out without permission by an ill-disposed person.

Ninth Embodiment

The ninth embodiment of the present invention will be described below. The ninth embodiment is characterized in that when color image data presented as an FPX image has a copyright, the data is converted into monochrome data. Note that the same reference numerals in the ninth embodiment denote substantially the same parts as those in the first embodiment mentioned above, and a detailed description thereof will be omitted.

Figure 31:
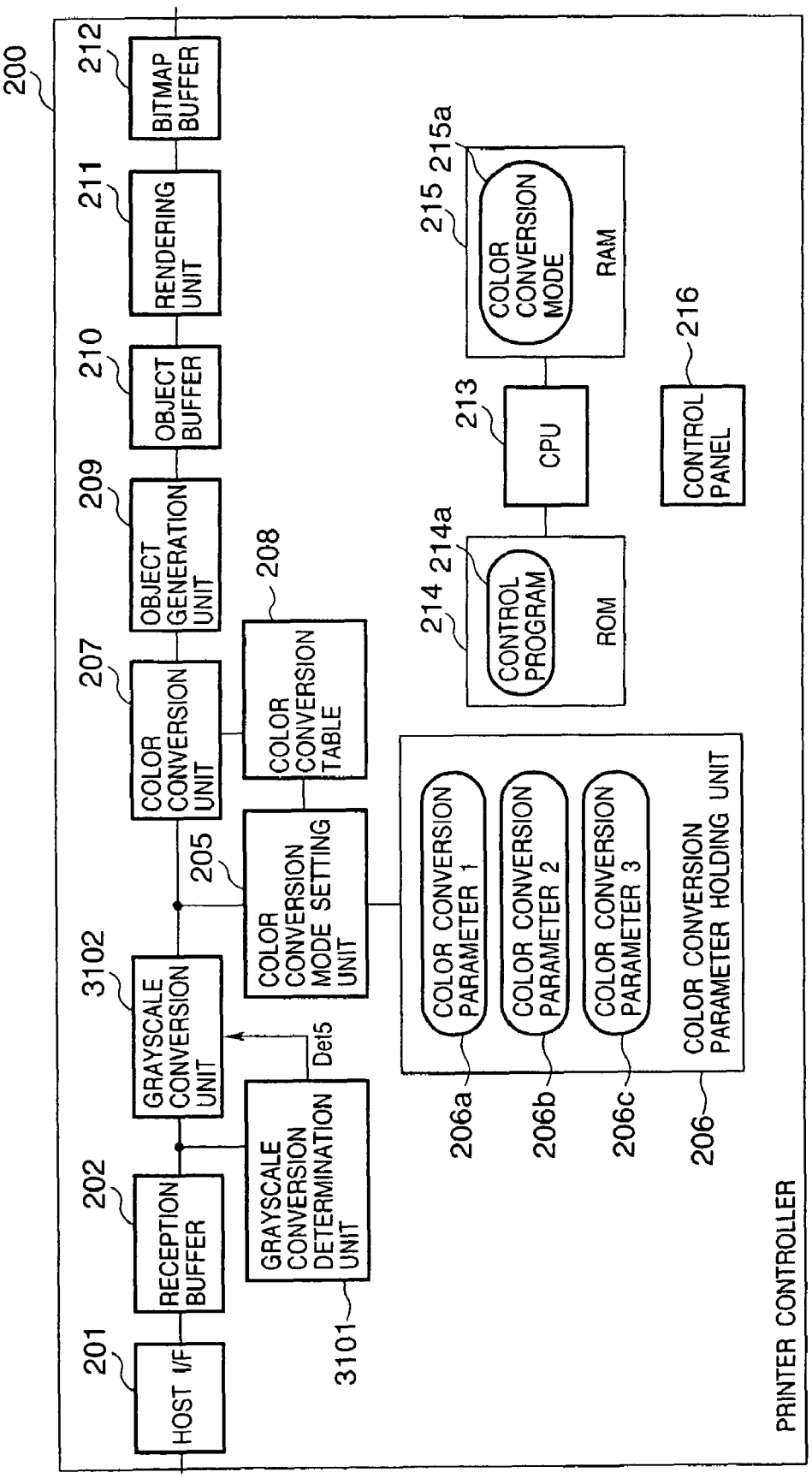
FIG. 31 is a detailed block diagram showing the arrangement of a printer controller according to the ninth embodiment of the present invention.

FIG. 31 is a block diagram showing the detailed arrangement of the controller 200 in the ninth embodiment.

Referring to FIG. 31, reference numeral 3101 denotes a grayscale conversion determination unit, which acquires copyright information from extended property information of FPX data input from the host computer 502, and determines whether or not image data of FPX data is to be converted into grayscale data. Reference numeral 3102 denotes a grayscale conversion unit for converting FPX data into grayscale data on the basis of a control signal Det5 from the grayscale conversion determination unit 3101.

The operation of the controller 200 in the ninth embodiment will be described in detail below with reference to the flow chart in FIG. 32. Note that the same step numbers in the flow chart shown in FIG. 32 denote the same processes as those in FIG. 5 in the first embodiment, and a detailed description thereof will be omitted. The control program that implements the processes shown in the flow chart in FIG. 32 is also stored in the ROM 214, and is executed by the CPU 213.

Figure 32:
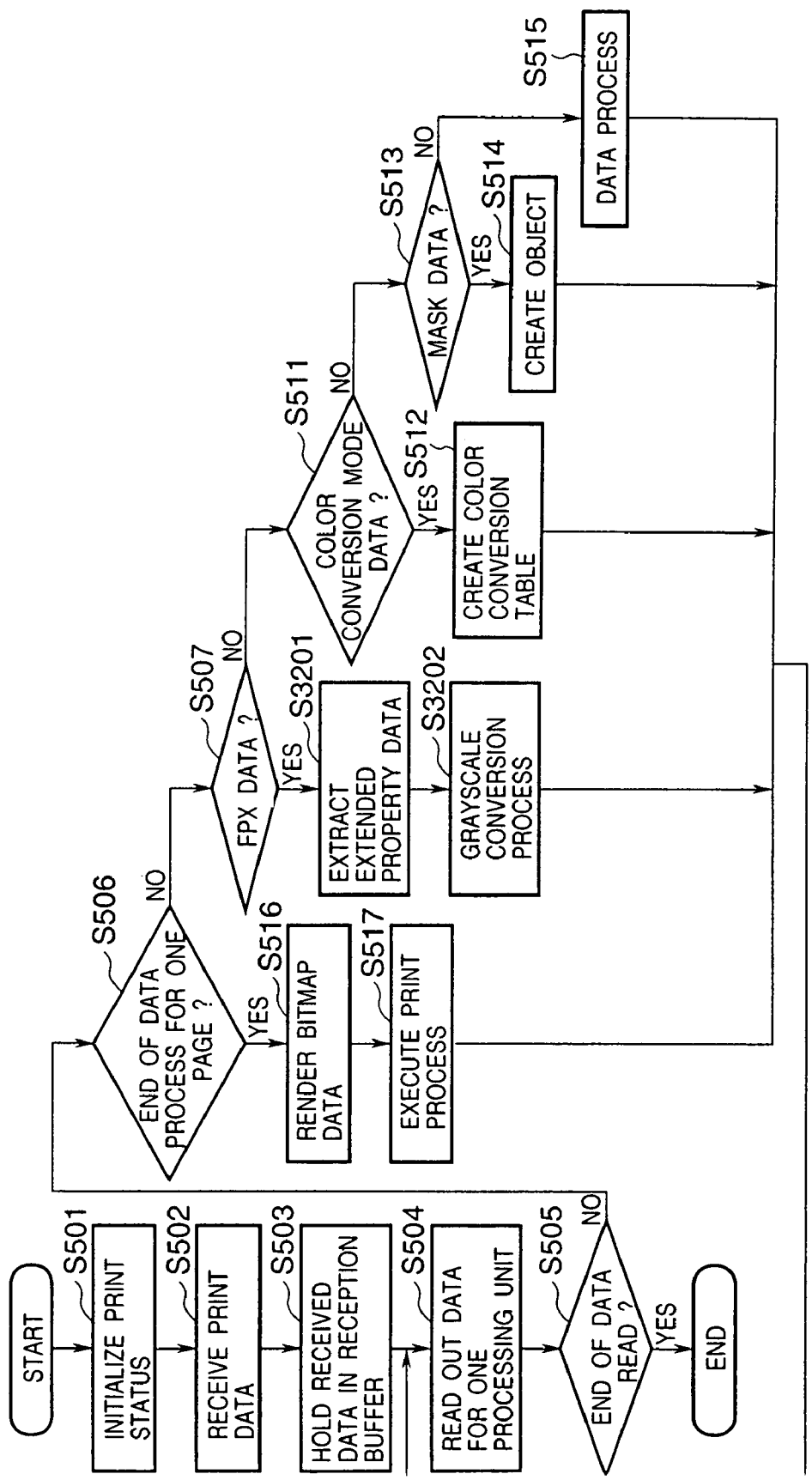
FIG. 32 is a flow chart showing the operation of the printer controller in the ninth embodiment.

Referring to FIG. 32, if it is determined in step S507 that the print data is FPX data, copyright data is extracted from extended property information (step S3201). The grayscale conversion unit 3102 converts FPX data into grayscale data (step S3202), and the flow returns to step S504.

The operation of the grayscale conversion unit 3102 in the ninth embodiment will be described in detail below with reference to the flow chart in FIG. 33. The flow chart in FIG. 33 shows details of steps S3201 and S3202 shown in FIG. 32.

Figure 33:
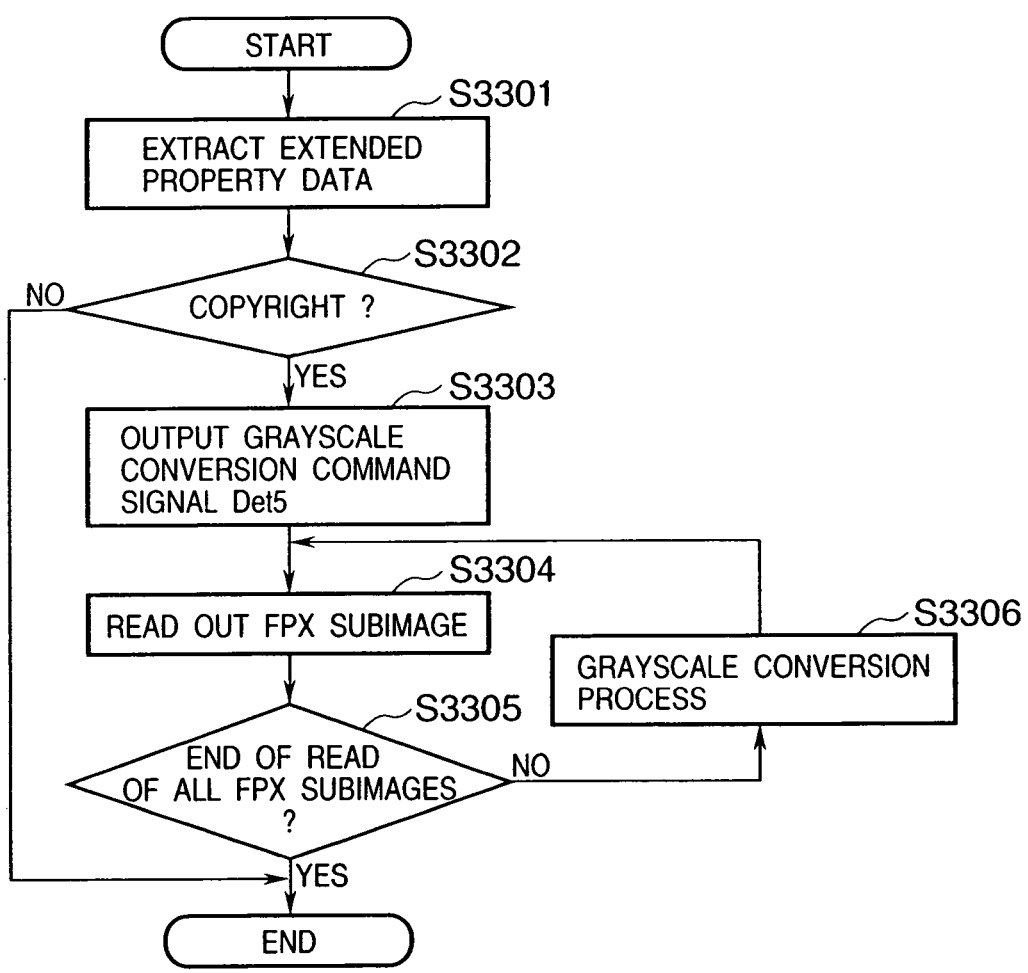
FIG. 33 is a flow chart showing a grayscale conversion process in the ninth embodiment.

Referring to FIG. 33, copyright information stored in extended property information of FPX data is acquired in step S3301 to check if the FPX data to be printed is an image having a copyright (step S3302). If YES in step S3302, the grayscale conversion determination unit 3101 outputs a grayscale conversion command signal Det5 to the grayscale conversion unit 3102 (step S3303). An FPX subimage is read out (step S3304), and it is checked if all FPX subimages have been read out (step S3305). If NO in step S3305, the grayscale conversion unit 3102 converts the readout FPX subimage into grayscale data (step S3306), and the flow returns to step S3304. On the other hand, if it is determined in step S3305 that all FPX subimages have been read out, the grayscale conversion process of the ninth embodiment ends.

If it is determined in step S3302 that the FPX data to be printed does not have any copyright, the flow ends without executing the processes in steps S3303 to S3306.

The grayscale conversion process will be described below. In the ninth embodiment, matrix operation is made based on RGB input data to convert it into grayscale data. An example of the matrix operation is:

Gray=0.2126×$R$+0.7152×$G$+0.0722×$B$ (for 0≦R, G, B≦1)

As described above, according to the ninth embodiment, when the received FPX data has a copyright, it is converted into grayscale data, thus converting an output image into a monochrome image. Hence, copyrighted image data can be prevented from being printed out without permission by an ill-disposed person.

When copyrighted image data is to be printed out after permission of a copyright holder is granted, the copyright holder can append information indicating print permission to copyright information stored in the extended property information of the FPX data. If the print permission information is appended, the image data to be printed can be processed in the grayscale process of the ninth embodiment in the same manner as image data without any copyright, i.e., does not undergo any grayscale conversion.

10th Embodiment

The 10th embodiment of the present invention will be described below. Note that the same reference numerals in a color LBP of the 10th embodiment denote substantially the same parts as those in the ninth embodiment, and a detailed description thereof will be omitted.

In the ninth embodiment described above, when the FPX data to be printed is image data having a copyright, the data is converted into grayscale data to obtain a monochrome image. As a characteristic feature of the 10th embodiment, monochrome data is extracted from the input FPX data and replaces the input data.

Figure 34:
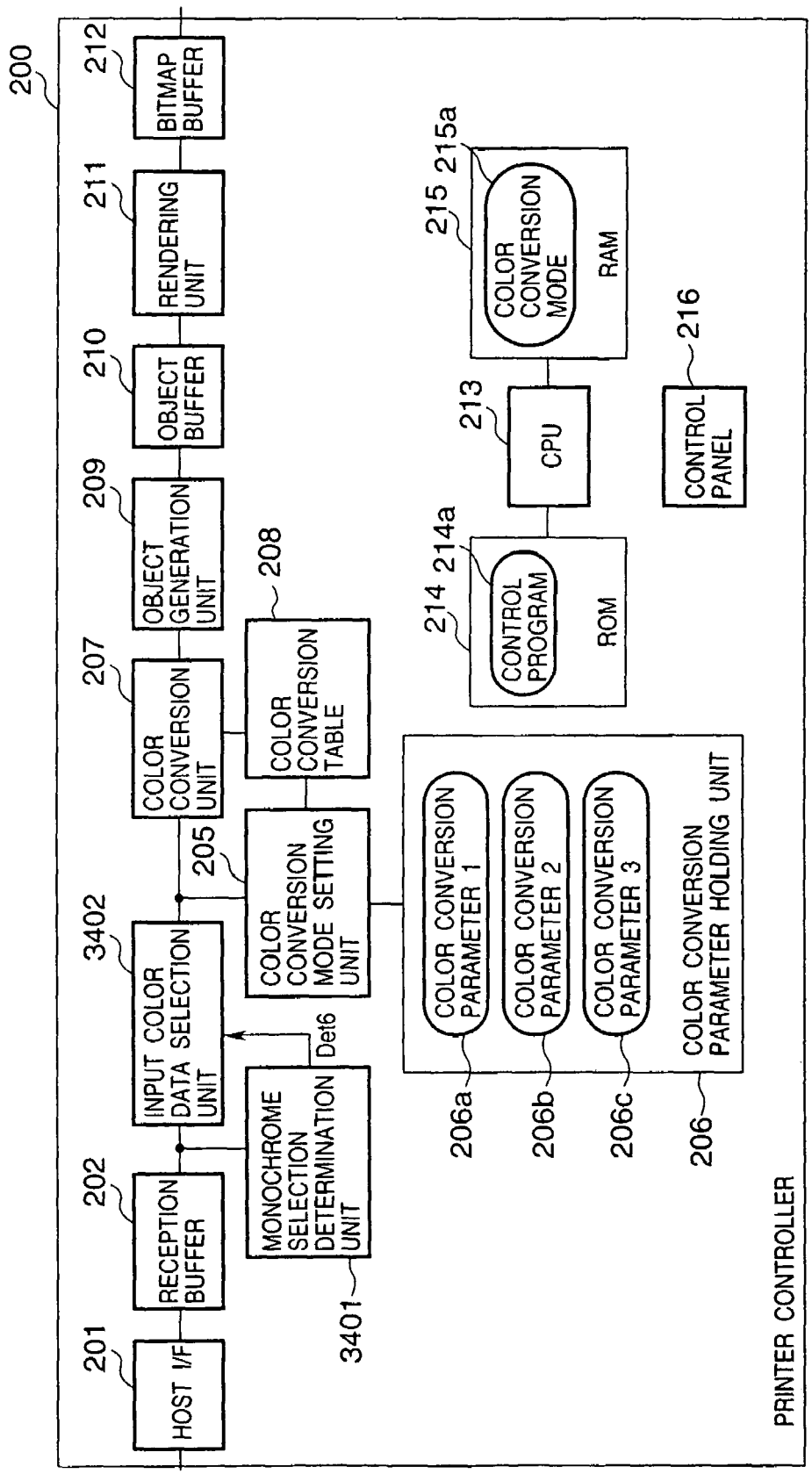
FIG. 34 is a detailed block diagram showing the arrangement of a printer controller according to the 10th embodiment of the present invention.

FIG. 34 is a block diagram showing the detailed arrangement of the controller 200 in the 10th embodiment. Referring to FIG. 34, reference numeral 3401 denotes a monochrome selection determination unit, which acquires copyright information from extended property information of FPX data input from the host computer 502, and determines whether or not monochrome data is to be selected from image data of the FPX data, i.e., whether or not the image data is to be normally printed. Reference numeral 3402 denotes an input color data selection unit, which extracts monochrome data, i.e., one of R, G, and B data from RGB FPX data on the basis of a control signal Det6 from the monochrome selection determination unit 3401. Note that the color to be extracted is set in advance.

The operation of the controller 200 in the 10th embodiment will be described in detail below with reference to the flow chart in FIG. 35. Note that the same step numbers in the flow chart shown in FIG. 35 denote the same processes as those in FIG. 32 in the ninth embodiment, and a detailed description thereof will be omitted. The control program that implements the processes shown in the flow chart in FIG. 35 is also stored in the ROM 214, and is executed by the CPU 213.

Figure 35:
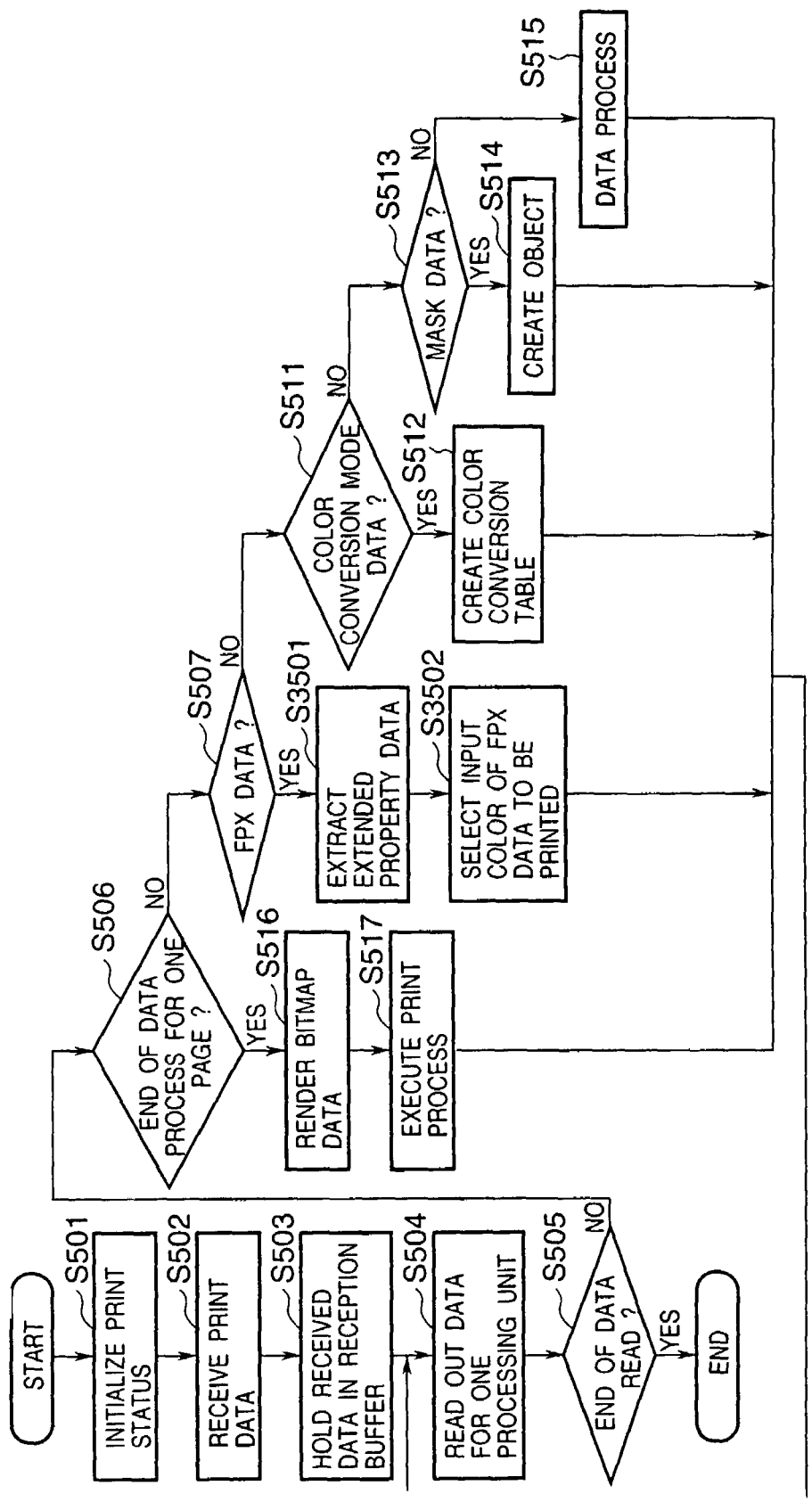
FIG. 35 is a flow chart showing the operation of the printer controller in the 10th embodiment.

Referring to FIG. 35, if it is determined in step S507 that the print data is FPX data, copyright data is extracted from extended property information (step S3501), and the input color data selection unit 3401 selects the input color of the FPX data to be printed on the basis of the extracted information (step S3502). The flow then returns to step S504.

The operation of the input color data selection unit 3402 in the 10th embodiment will be described below with reference to the flow chart shown in FIG. 36. The flow chart in FIG. 36 shows details of steps S3501 and S3502 shown in FIG. 35.

Figure 36:
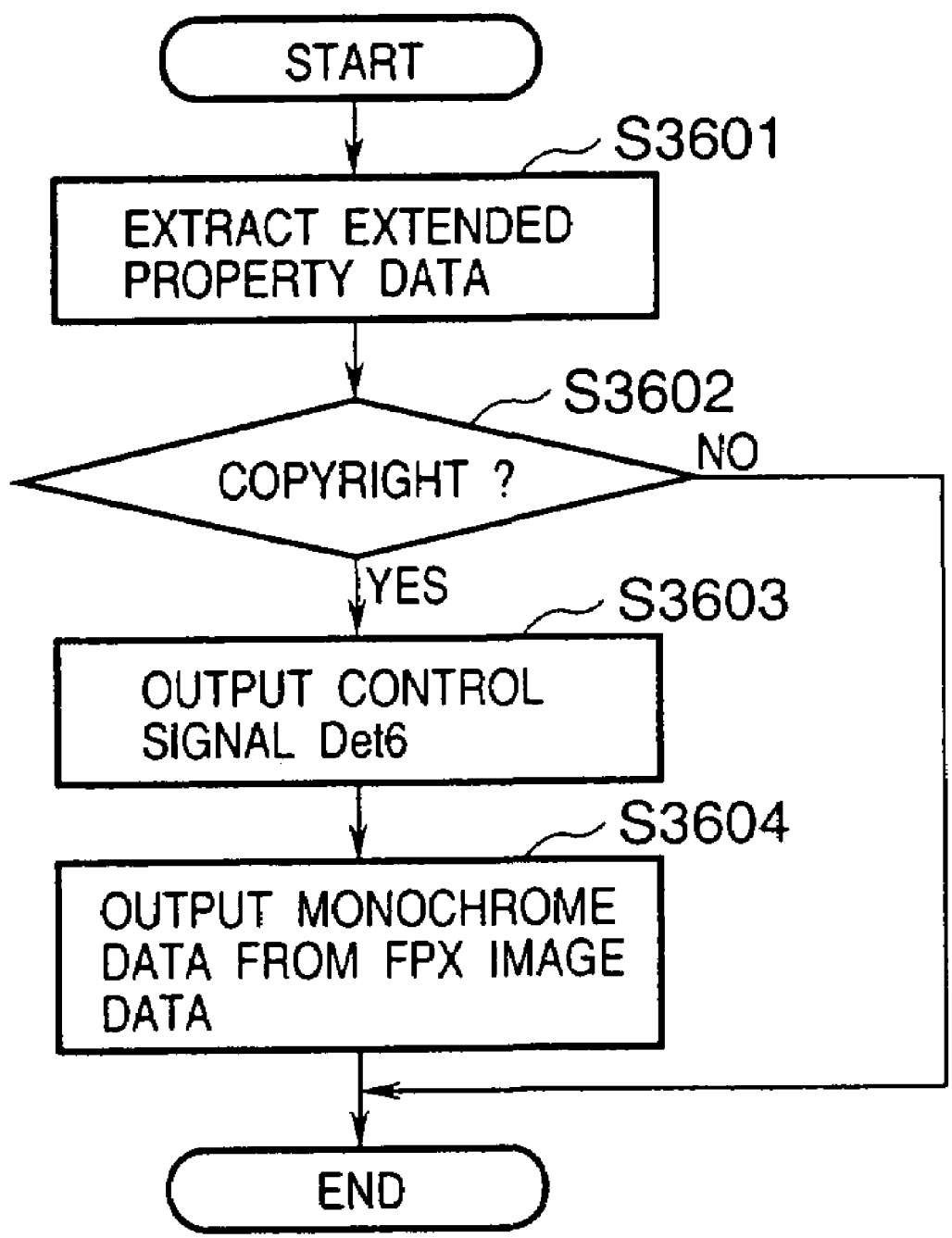
FIG. 36 is a flow chart showing a monochrome conversion process in the 10th embodiment.

Referring to FIG. 36, copyright information stored in extended property information of the FPX data is acquired (step S3601) to check if the FPX data to be printed is an image having a copyright (step S3602). If YES in step S3602, the monochrome selection determination unit 3401 outputs an input color selection command signal Det6 to the input color data conversion unit 3402 (step S3603). Only designated monochrome data is extracted from the FPX data (step S3604), thus ending the monochrome conversion process of the 10th embodiment.

If it is determined in step S3602 that the FPX data to be printed does not have any copyright, the flow ends without executing the processes in steps S3603 and S3604.

As described above, according to the 10th embodiment, when the received FPX data has a copyright, only monochrome data (one of R, G, and B data) is extracted as input data. Hence, copyrighted image data can be prevented from being printed out without permission by a malicious third party.

11th Embodiment

The 11th embodiment of the present invention will be described below. Note that the same reference numerals in a color LBP of the 11th embodiment denote substantially the same parts as those in the ninth embodiment, and a detailed description thereof will be omitted.

In the 10th embodiment described above, when the FPX data to be printed is image data having a copyright, monochrome data is extracted from the FPX data. The 11th embodiment is characterized in that the FPX data is converted into monochrome data.

Figure 37:
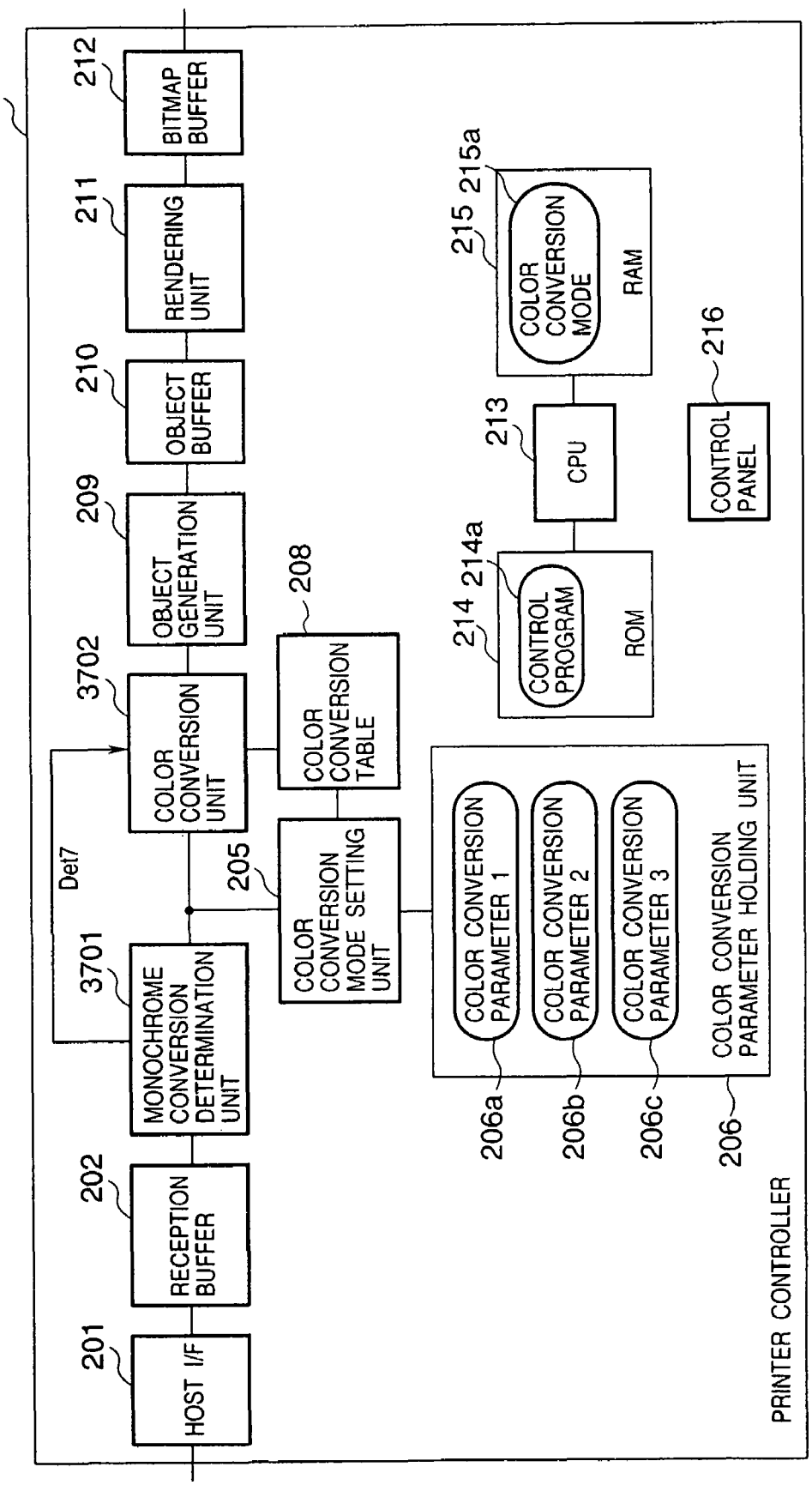
FIG. 37 is a detailed block diagram showing the arrangement of a printer controller according to the 11th embodiment of the present invention.

FIG. 37 is a block diagram showing the detailed arrangement of the controller 200 in the 11th embodiment. Referring to FIG. 37, a monochrome conversion determination unit 3701 acquires copyright information from extended property information of FPX data input from the host computer 502, and determines whether or not image data of the FPX data is to be converted into monochrome data, i.e., whether or not the image data is to be normally printed. A color conversion unit 3702 converts RGB FPX data into monochrome data, i.e., one of C, M, Y, and K data on the basis of a control signal Det7 from the monochrome conversion determination unit 3701 upon converting the FPX data into CMYK print information.

The operation of the color conversion unit 3702 in the 11th embodiment will be described below with reference to the flow chart in FIG. 38.

Figure 38:
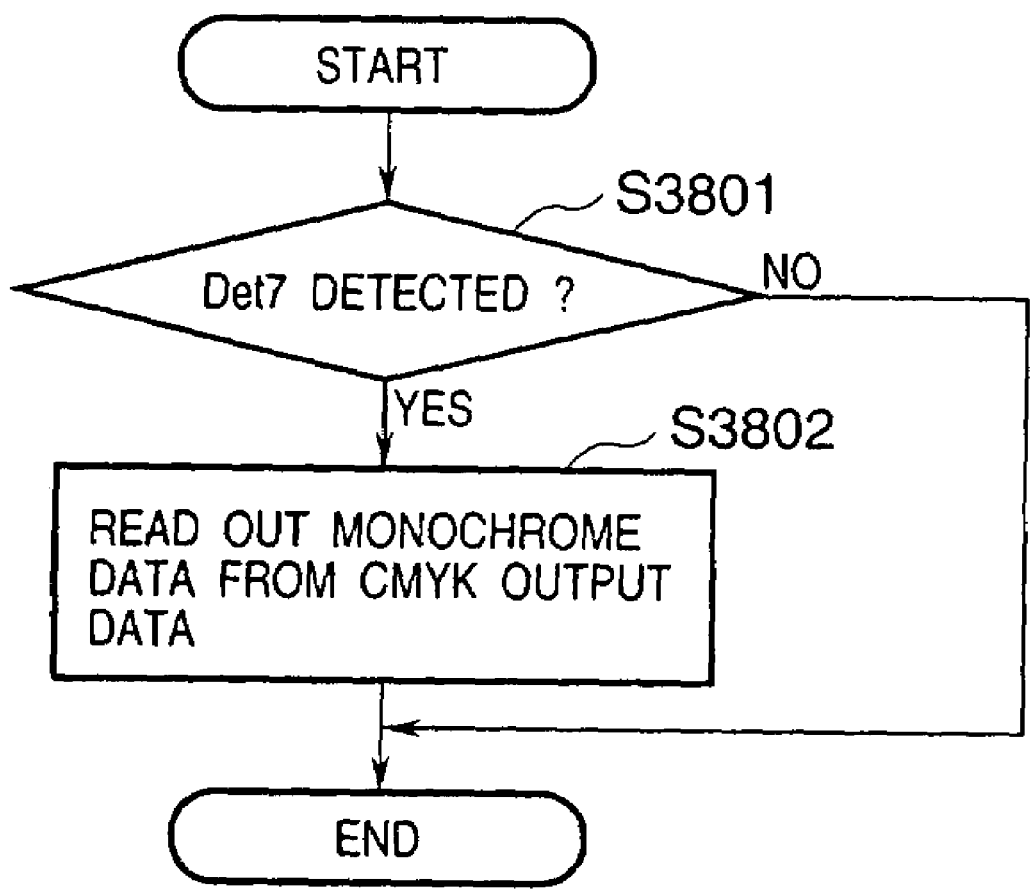
FIG. 38 is a flow chart showing a monochrome conversion process in the 11th embodiment.

Referring to FIG. 38, it is checked in step S3801 if a monochrome command signal Det7 from the monochrome conversion determination unit 3701 is detected. If YES in step S3801, it is determined that the subimage to be printed is data having a copyright and, for example, only C (cyan) data is read out as print data from CMYK print information converted by the color conversion unit 3702 (step S3802). On the other hand, if the monochrome conversion command signal Det7 is not detected in step S3801, the flow ends without executing the process in step S3802.

As described above, according to the 11th embodiment, when the received FPX data has a copyright, it is converted into monochrome data (one of C, M, Y, and K data), and the converted data is output. Hence, copyrighted image data can be prevented from being printed out without permission by an ill-disposed person.

12th Embodiment

The 12th embodiment of the present invention will be described below. Note that the same reference numerals in a color LBP of the 12th embodiment denote substantially the same parts as those in the seventh embodiment, and a detailed description thereof will be omitted.

In the ninth to 11th embodiments described above, when the FPX data to be printed is image data having a copyright, its image quality is lowered by monochrome conversion. The 12th embodiment is characterized in that the FPX data is replaced by inverted data.

Figure 39:
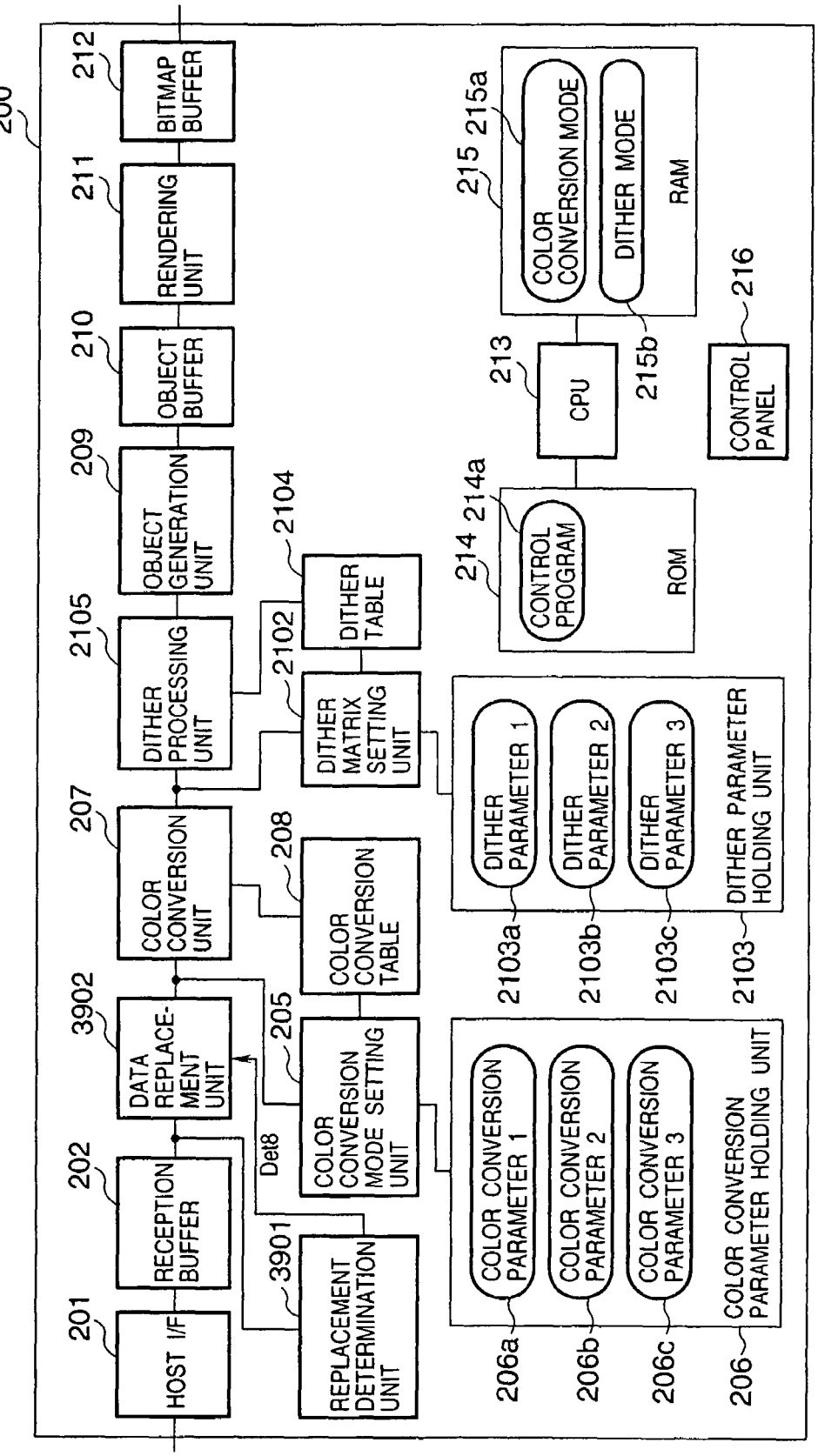
FIG. 39 is a detailed block diagram showing the arrangement of a printer controller according to the 12th embodiment of the present invention.

FIG. 39 is a block diagram showing the detailed arrangement of the controller 200 in the 12th embodiment. A detailed description of the same arrangement as that in FIG. 21 of the seventh embodiment will be omitted. Referring to FIG. 39, reference numeral 3901 denotes a replacement determination unit, which acquires copyright information from extended property information of FPX data input from the host computer 502, and determines whether or not image data of the FPX data is to undergo a data replacement process. Reference numeral 3902 denotes a data replacement unit which executes a data replacement process of the FPX data on the basis of a control signal Det8 from the replacement determination unit 3901. Note that the data replacement process will be described in detail later.

The operation of the controller 200 in the 12th embodiment will be described in detail below with reference to the flow chart in FIG. 40. Note that the same step numbers in the flow chart shown in FIG. 40 denote the same processes as those in FIG. 22 in the seventh embodiment, and a detailed description thereof will be omitted. The control program that implements the processes shown in the flow chart in FIG. 40 is also stored in the ROM 214, and is executed by the CPU 213.

Figure 40:
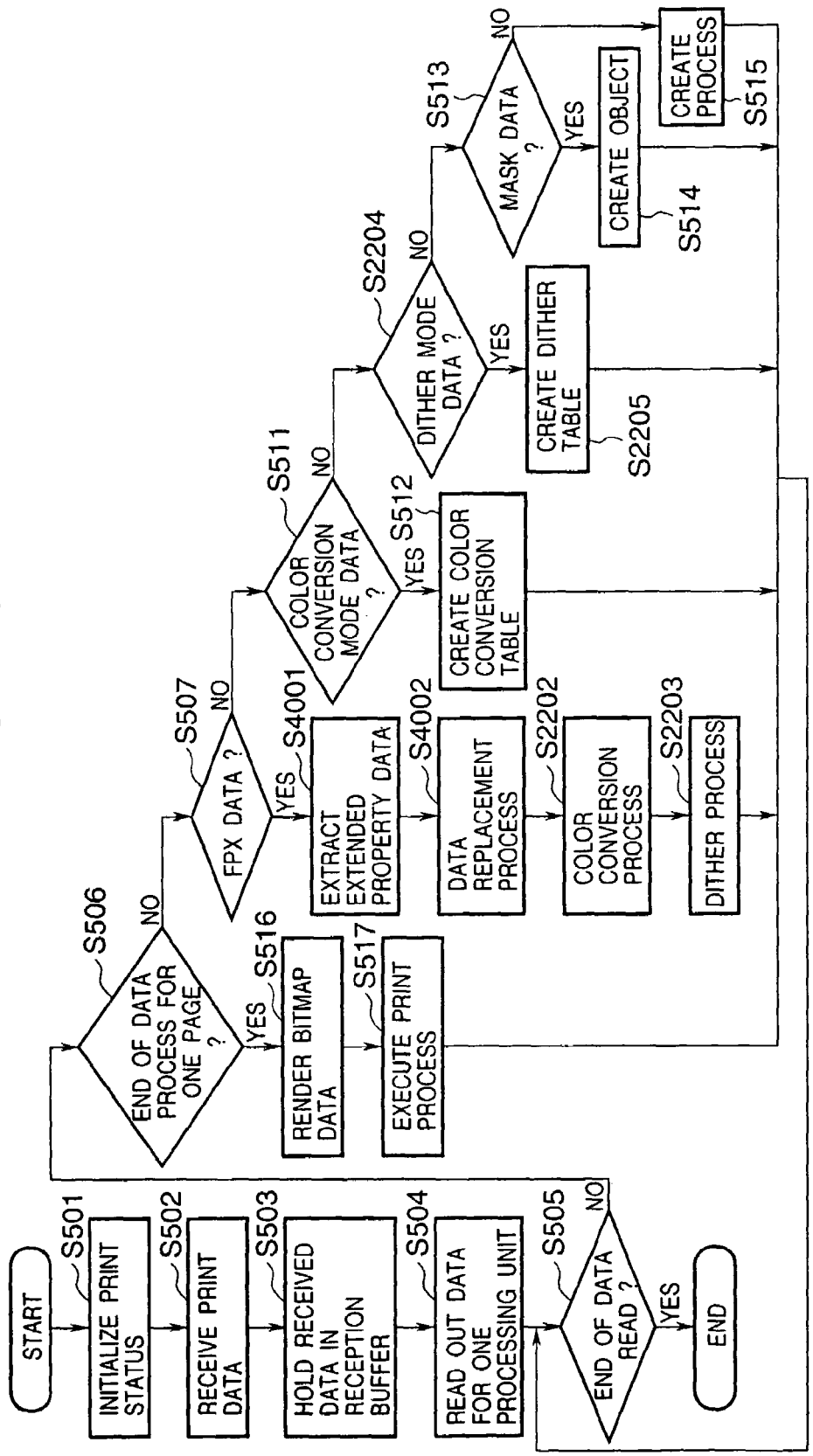
FIG. 40 is a flow chart showing the operation of the printer controller in the 12th embodiment.

Referring to FIG. 40, if it is determined in step S507 that the print data is FPX data, copyright data is extracted from extended property information (step S4001), and the data replacement unit 3902 executes the data replacement process on the basis of the extracted information (step S4002).

The operation of the data replacement unit 3902 in the 12th embodiment will be described in detail below with reference to the flow chart in FIG. 41. The flow chart in FIG. 41 shows details of steps S4001 and S4002 shown in FIG. 40.

Figure 41:
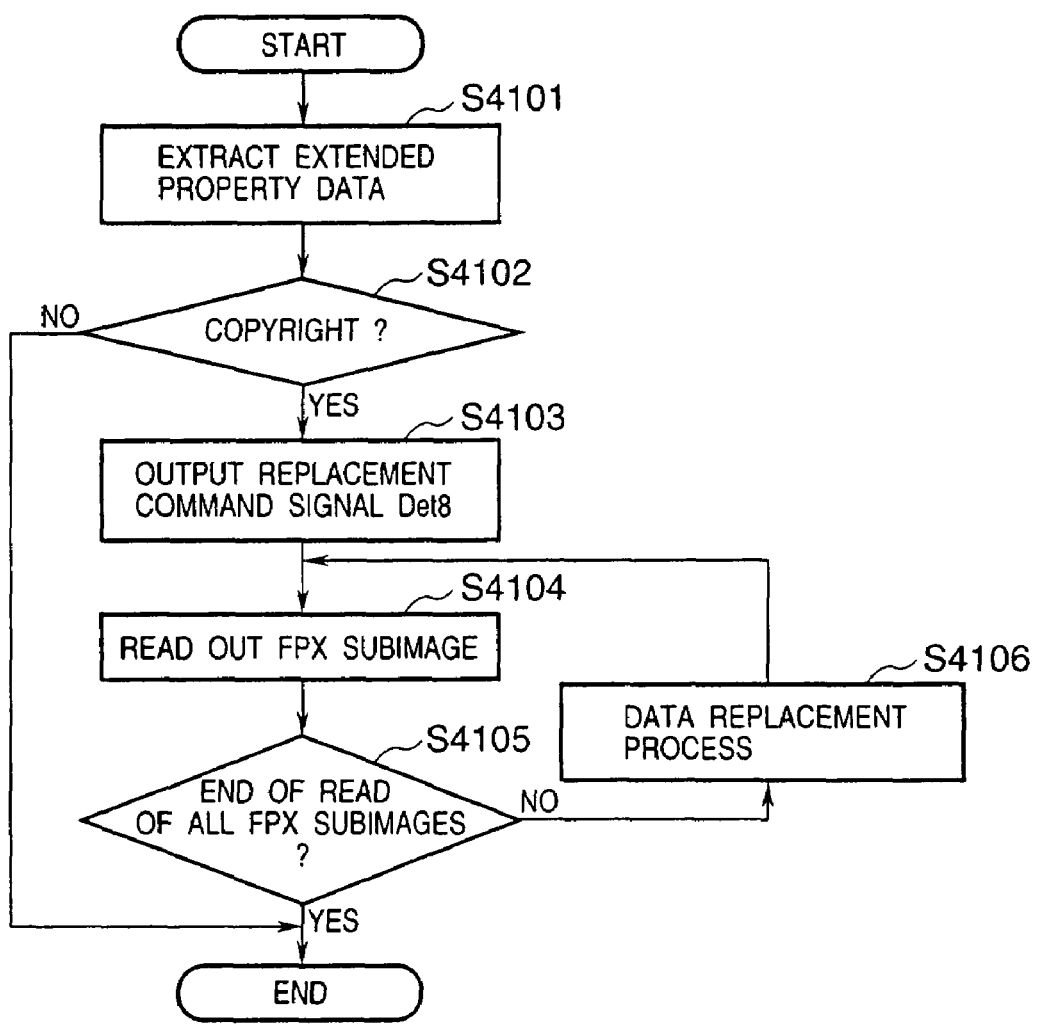
FIG. 41 is a flow chart showing a data replacement process in the 12th embodiment.

Referring to FIG. 41, copyright information stored in extended property information of the FPX data is acquired in step S4101, and it is checked if the FPX data to be printed is an image having a copyright (step S4102). If YES in step S4102, the replacement determination unit 3901 outputs a replacement command signal Det8 to the data replacement unit 3902 (step S4103). An FPX subimage is read out (step S4104), and it is checked if all FPX subimages have been read out (step S4105). If NO in step S4105, the data replacement unit 3902 executes the data replacement process of the readout FPX subimage (step S4106), and the flow returns to step S4104. On the other hand, if it is determined in step S4105 that all FPX subimages have been read out, the data replacement process of the 12th embodiment ends.

If it is determined in step S4102 that the FPX data to be printed does not have any copyright, the flow ends without executing the processes in steps S4103 to S4106.

The data replacement process in the 12th embodiment will be described below with reference to FIGS. 42 and 43. The data replacement process of the 12th embodiment uses a one-dimensional look-up table, and is done in units of pixels.

Figure 42:
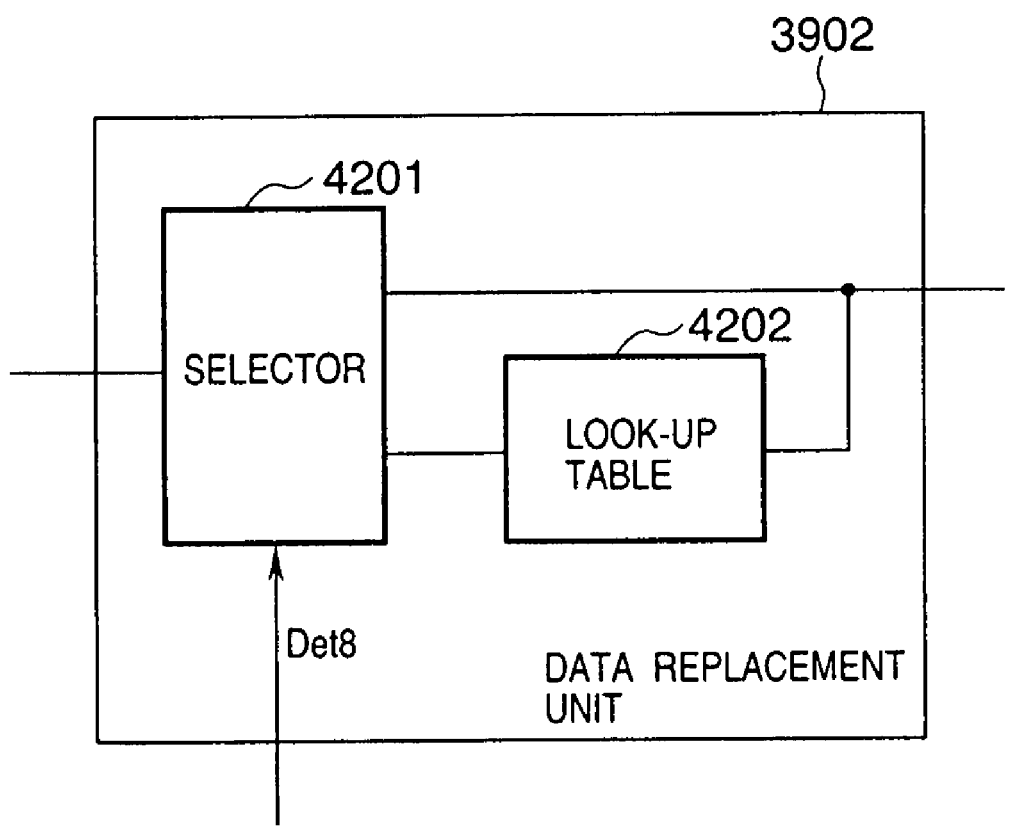
FIG. 42 is a detailed block diagram showing the arrangement of a data replacement unit in the 12th embodiment.

FIG. 42 is a block diagram showing the detailed arrangement of the data replacement unit 3902, which comprises a selector 4201 and look-up table 4202. The selector 4201 is controlled by the replacement command signal Det8 from the replacement determination unit 3901, and is switched to input an FPX subimage to the look-up table 4202 when the signal Det8 is true. The look-up table 4202 outputs an output value corresponding to input data in units of pixels on the basis of the input/output relationship shown in FIG. 43.

As can be seen from the input/output relationship shown in FIG. 43, the output value is an inverted value of the output value.

As described above, according to the 12th embodiment, when the received FPX data has a copyright, the FPX data is replaced by inverted data in units of pixels. Hence, image data having a copyright can be prevented from being printed out without permission by an ill-disposed person.

13th Embodiment

The 13th embodiment of the present invention will be described below. Note that the same reference numerals in a color LBP of the 13th embodiment denote substantially the same parts as those in the 12th embodiment, and a detailed description thereof will be omitted.

In the 12th embodiment described above, when the FPX data to be printed is image data having a copyright, it is replaced by inverted data. The 13th embodiment is characterized in that FPX data is directly inverted.

Figure 44:
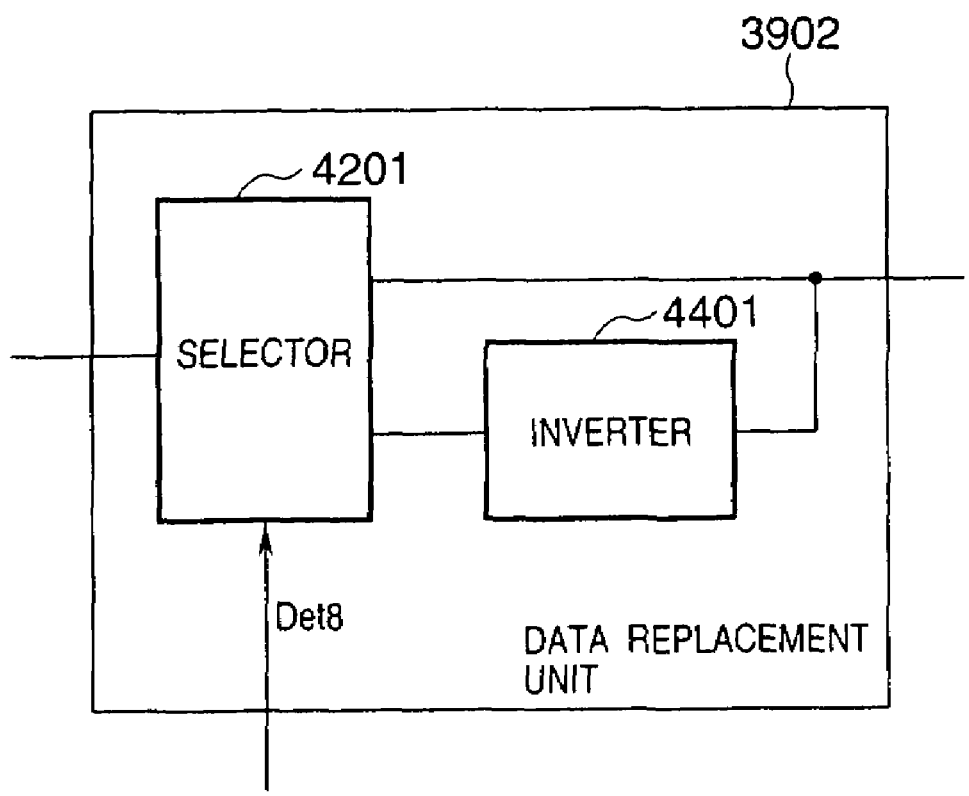
FIG. 44 is a detailed block diagram showing the arrangement of a data replacement unit according to the 13th embodiment of the present invention.

FIG. 44 is a block diagram showing the detailed arrangement of the data replacement unit 3902 in the 13th embodiment. As a characteristic feature of the arrangement shown in FIG. 44, an inverter 4401 for inverting respective bits of FPX subimage data is arranged in place of the look-up table 4202 shown in FIG. 42. With this arrangement, the respective bits of a subimage of FPX data can be inverted and output.

As described above, according to the 13th embodiment, when the received FPX data has a copyright, the FPX data is inverted in units of pixels. Hence, image data having a copyright can be prevented from being printed out without permission by an ill-disposed person.

In the 12th and 13th embodiments described above, the data replacement process is implemented by a look-up table conversion or bit inversion process. However, the present invention is not limited to such specific processes. For example, image data may undergo other data replacement processes that disturb the copyrighted image data from being directly output.

Other Embodiments

As many apparently widely different embodiments of the present invention can be made without departing from the spirit and scope thereof, it is to be understood that the invention is not limited to the specific embodiments thereof except as defined in the appended claims.

In the embodiments described above, the input and output data have been explained as RGB and CMYK data, respectively. Also, the present invention can be applied to any other color space expressions such as L*a*b*, XYZ, and the like.

In the above embodiments, the noise superposing process and noise removal process are done for FPX data as a file format that hierarchically stores a plurality of resolutions. However, the present invention can be applied to other file formats.

In the above embodiments, image data having a copyright undergoes an image process such as a noise superposing process and the like. However, the present invention is not limited to a copyrighted image, and can be applied to all kinds of images which must be protected from being used without permission. That is, when information that inhibits output without permission or the like is appended to the extended property information of a given image, the image can undergo the same process as that for the above-mentioned copyright image.

Also, the present invention can be applied when it is achieved by combining the aforementioned embodiments.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the aforementioned flow charts.

What is claimed is:

1. An image processing apparatus comprising:
   input means inputting image data which complies with a hierarchical data format that hierarchically stores image data of a plurality of resolutions;
   determination means determining if the image data is a specific image, wherein said determination means determines the specific image when the image data has a copyright; and
   output means for, when said determination means determines that the image data is the specific image, selecting and outputting image data in a lowest resolution layer,
   wherein said output means enlarges the image data in the lowest resolution layer to a predetermined size, and outputs the enlarged data.

2. The apparatus according to claim 1, wherein said output means enlarges the image data in the lowest resolution layer to a size of image data in a highest resolution layer, and outputs the enlarged data.

3. An image processing method comprising:
an input step, of inputting image data which complies with a hierarchical data format that hierarchically stores image data of a plurality of resolutions;
an determination step, of determining if the image data is a specific image, wherein
said determination means determines the specific image when the image data has a copyright; and
an output step, in which, when it is determined in said determination step that
the image data is the specific image, image data in a lowest resolution layer is selected and outputted,
wherein said output step includes enlarging the image data in the lowest resolution layer to a predetermined size, and outputting the enlarged data.

4. A computer readable storage medium that stores a program of an image process, said program having at least:

code for an input step, of inputting image data which complies with a hierarchical data format that hierarchically stores image data of a plurality of resolutions;
code for a determination step, of determining if the image data is a specific image, wherein said determination means determines the specific image when the image data has a copyright; and
code for an output step, in which, when it is determined in said determination step that the image data is the specific image, image data in a lowest resolution layer is selected and outputted,
wherein said output step includes enlarging the image data in the lowest resolution layer to a predetermined size and outputting the enlarged data.

* * * * *

UNITED STATES PATENT AND TRADEMARK OFFICE
CERTIFICATE OF CORRECTION

PATENT NO. : 6,972,865 B1
APPLICATION NO. : 09/516969
DATED : December 6, 2005
INVENTOR(S) : Mizuki Muramatsu Page 1 of 1

It is certified that error appears in the above-identified patent and that said Letters Patent is hereby corrected as shown below:

COLUMN 4:
Line 60, "PREFERRED" should read -- PREFERRED EMBODIMENTS --.

COLUMN 5:
Line 54, "Summary info." should read -- Summary Info. --

COLUMN 6:
Line 65, "property" should read -- Property --.

COLUMN 9:
Line 38, "bus-(not" should read -- bus (not --; and
Line 42, "later)" should read -- later). --.

COLUMN 13:
Line 61, "denotes" should read -- denote --.

COLUMN 25:
Line 5, deleted the paragraph break before "As can"; and
Line 6, "output" (second occurrence) should read -- input --.

COLUMN 27:
Line 5, "an determination" should read -- a determination --.

Signed and Sealed this

Tenth Day of October, 2006

JON W. DUDAS
*Director of the United States Patent and Trademark Office*